(12) United States Patent
Alward et al.

(10) Patent No.: US 7,574,796 B2
(45) Date of Patent: *Aug. 18, 2009

(54) NONWOVEN COMPOSITES AND RELATED PRODUCTS AND METHODS

(75) Inventors: Gordon S. Alward, Del Mar, CA (US); Robert A. Dichiara, Jr., Carlsbad, CA (US)

(73) Assignee: GEO2 Technologies, Inc., Woburn, MA (US)

(*) Notice: Subject to any disclaimer, the term of this patent is extended or adjusted under 35 U.S.C. 154(b) by 842 days.

This patent is subject to a terminal disclaimer.

(21) Appl. No.: 11/305,988

(22) Filed: Dec. 19, 2005
(Under 37 CFR 1.47)

(65) Prior Publication Data
US 2006/0188416 A1 Aug. 24, 2006

Related U.S. Application Data

(63) Continuation of application No. 10/833,298, filed on Apr. 28, 2004, which is a continuation-in-part of application No. 10/281,179, filed on Oct. 28, 2002, now Pat. No. 6,946,013.

(51) Int. Cl.
*B21D 51/16* (2006.01)
*B01D 53/46* (2006.01)

(52) U.S. Cl. ......................... 29/890; 423/210
(58) Field of Classification Search ............ 29/890; 423/210; 55/486; 428/285; 422/180
See application file for complete search history.

(56) References Cited

U.S. PATENT DOCUMENTS

| | | | |
|---|---|---|---|
| 1,924,472 A | 8/1933 | Miller |
| 2,120,133 A | 6/1938 | Kohler |
| 2,390,262 A | 12/1945 | Mazer |
| 2,847,314 A | 8/1958 | Fisher |
| 2,930,407 A | 3/1960 | Conley et al. |
| 3,077,413 A | 2/1963 | Campbell |
| 3,090,094 A | 5/1963 | Schwartzwalder |
| 3,094,394 A | 6/1963 | Innes |
| 3,112,184 A | 11/1963 | Hollenbach |
| 3,141,206 A | 7/1964 | Stephens |
| 3,159,235 A | 12/1964 | Young |
| 3,311,481 A | 3/1967 | Sterry |
| 3,549,473 A | 12/1970 | LeBlanc |
| 3,702,279 A | 11/1972 | Ardary |

(Continued)

FOREIGN PATENT DOCUMENTS

DE 3931976 8/2001

(Continued)

OTHER PUBLICATIONS

Anderson, Ultra Thin Wall Mat Design and Optimization with Hybrid Mats, SAE Technical Paper Series 2004-01-0145, Mar. 2004.

(Continued)

*Primary Examiner*—Tom Duong

(57) ABSTRACT

A filtering catalytic substrate including a non-woven fibrous refractory body, a plurality of channels formed in the body, a washcoat layer at least partially coating the channels, and a catalyst material at least partially coating the washcoat. The body is substantially composed of interlocking fibers fabricated using methods of forming a rigid matrix of ceramic fibers to provide a porous substrate for filtration applications.

14 Claims, 22 Drawing Sheets

U.S. PATENT DOCUMENTS

| | | |
|---|---|---|
| 3,752,683 A | 8/1973 | Hawthorne |
| 3,788,935 A | 1/1974 | Shyne |
| 3,795,524 A | 3/1974 | Sowman |
| 3,827,238 A | 8/1974 | Hayashi |
| 3,869,267 A | 3/1975 | Gaylor |
| 3,916,057 A | 10/1975 | Hatch |
| 3,920,404 A | 11/1975 | Gandhi |
| 3,927,152 A | 12/1975 | Kyrias |
| 3,929,671 A | 12/1975 | Nakamura et al. |
| 3,935,060 A | 1/1976 | Blome |
| 3,945,803 A | 3/1976 | Musall |
| 3,952,083 A | 4/1976 | Fletcher |
| 3,953,646 A | 4/1976 | Fletcher |
| 3,956,185 A | 5/1976 | Yagi et al. |
| 3,957,445 A | 5/1976 | Foster |
| 3,969,095 A | 7/1976 | Kurahashi |
| 3,978,567 A | 9/1976 | Vroman |
| 4,001,996 A | 1/1977 | Byrd, Jr. |
| 4,004,649 A | 1/1977 | Shimada |
| 4,007,539 A | 2/1977 | Nishio |
| 4,012,485 A | 3/1977 | Meguerian |
| 4,014,372 A | 3/1977 | Dichiara |
| 4,020,896 A | 5/1977 | Mold |
| 4,038,175 A | 7/1977 | Bhasin |
| 4,039,292 A | 8/1977 | Morini |
| 4,041,199 A | 8/1977 | Cartwright |
| 4,041,592 A | 8/1977 | Kelm |
| 4,056,654 A | 11/1977 | Kompanek |
| 4,065,046 A | 12/1977 | Roberts |
| 4,092,194 A | 5/1978 | Green |
| 4,094,644 A | 6/1978 | Wagner |
| 4,094,645 A | 6/1978 | Bailey |
| 4,098,580 A | 7/1978 | Shimizu |
| 4,148,962 A | 4/1979 | Frosch |
| 4,156,533 A | 5/1979 | Close |
| 4,192,402 A | 3/1980 | Nakagawa |
| 4,195,063 A | 3/1980 | Iwaoka et al. |
| 4,206,177 A | 6/1980 | Otsubo |
| 4,208,374 A | 6/1980 | Foster |
| 4,239,733 A | 12/1980 | Foster |
| 4,276,071 A | 6/1981 | Outland |
| 4,290,501 A | 9/1981 | Tanaka |
| 4,297,328 A | 10/1981 | Ritscher |
| 4,319,556 A | 3/1982 | Schwartz |
| 4,324,572 A | 4/1982 | Erdmannsdorfer |
| 4,329,162 A | 5/1982 | Pitcher, Jr. |
| 4,335,023 A | 6/1982 | Dettling |
| 4,338,368 A | 7/1982 | Lovelace |
| 4,343,074 A | 8/1982 | Bailey |
| 4,345,430 A | 8/1982 | Pallo |
| 4,348,362 A | 9/1982 | Foss |
| 4,349,055 A | 9/1982 | Dichiara |
| 4,358,480 A | 11/1982 | Ecord |
| 4,379,109 A | 4/1983 | Simpson |
| 4,398,931 A | 8/1983 | Shevlin |
| 4,404,992 A | 9/1983 | Sasaki |
| 4,410,427 A | 10/1983 | Wydeven |
| 4,415,342 A | 11/1983 | Foss |
| 4,417,908 A | 11/1983 | Pitcher, Jr. |
| 4,427,418 A | 1/1984 | Kogiso |
| 4,456,457 A | 6/1984 | Nozawa |
| 4,457,895 A | 7/1984 | Prigent |
| 4,483,108 A | 11/1984 | Howard |
| 4,495,399 A | 1/1985 | Cann |
| 4,508,256 A | 4/1985 | Radel |
| 4,529,718 A | 7/1985 | Dupin |
| 4,550,034 A | 10/1985 | Shimrock |
| 4,554,195 A | 11/1985 | Ormiston |
| 4,557,773 A | 12/1985 | Bonzo |
| 4,584,003 A | 4/1986 | Oda |
| 4,601,868 A | 7/1986 | Radel |
| 4,608,108 A | 8/1986 | Goll |
| 4,609,563 A | 9/1986 | Shimrock |
| 4,647,477 A | 3/1987 | DeLuca |
| 4,650,775 A | 3/1987 | Hill |
| 4,671,911 A | 6/1987 | Garnier |
| 4,682,470 A | 7/1987 | Shaff |
| 4,686,128 A | 8/1987 | Gentilman |
| 4,696,711 A | 9/1987 | Greszczuk |
| 4,710,487 A | 12/1987 | Koch |
| 4,711,009 A | 12/1987 | Cornelison |
| 4,722,920 A | 2/1988 | Kimura |
| 4,732,593 A | 3/1988 | Kondo |
| 4,732,879 A | 3/1988 | Kalinowski |
| 4,735,756 A | 4/1988 | Rausch |
| 4,737,326 A | 4/1988 | Wirth |
| 4,749,671 A | 6/1988 | Saito et al. |
| 4,761,323 A | 8/1988 | Muhlratzer |
| 4,818,625 A | 4/1989 | Lavendel |
| 4,828,774 A | 5/1989 | Andersson |
| 4,847,506 A | 7/1989 | Archer |
| 4,849,399 A | 7/1989 | Joy, III |
| 4,858,117 A | 8/1989 | Dichiara |
| 4,865,877 A | 9/1989 | Yamaguchi |
| 4,885,679 A | 12/1989 | Webster, Jr. |
| 4,890,285 A | 12/1989 | Dichiara |
| 4,894,070 A | 1/1990 | Keidel |
| 4,915,981 A | 4/1990 | Traskos |
| 4,916,897 A | 4/1990 | Hayashi |
| 4,925,561 A | 5/1990 | Ishii |
| 4,928,645 A | 5/1990 | Berneburg |
| 4,928,714 A | 5/1990 | Shannon |
| 4,929,429 A | 5/1990 | Merry |
| 4,934,142 A | 6/1990 | Hayashi |
| 4,935,178 A | 6/1990 | Esposito |
| 4,940,523 A | 7/1990 | Takeshima |
| 4,942,020 A | 7/1990 | Whittenberger |
| 4,952,896 A | 8/1990 | Dawson, Jr. |
| 4,955,164 A | 9/1990 | Hashish |
| 4,957,773 A | 9/1990 | Spencer |
| 4,968,383 A | 11/1990 | Volkmann |
| 4,970,035 A | 11/1990 | Baarsch |
| 4,976,760 A | 12/1990 | Helferich |
| 4,976,929 A | 12/1990 | Cornelison |
| 4,988,290 A | 1/1991 | Forster |
| 5,006,021 A | 4/1991 | Wheetley |
| 5,007,475 A | 4/1991 | Kennedy |
| 5,008,086 A | 4/1991 | Merry |
| 5,013,405 A | 5/1991 | Izard |
| 5,015,610 A | 5/1991 | Dwivedi |
| 5,021,369 A | 6/1991 | Ackerman |
| 5,024,979 A | 6/1991 | Debaig-Valade |
| 5,028,397 A | 7/1991 | Merry |
| 5,043,244 A | 8/1991 | Cairncross |
| 5,053,062 A | 10/1991 | Barris |
| 5,062,911 A | 11/1991 | Hampton |
| 5,063,029 A | 11/1991 | Mizuno |
| 5,065,757 A | 11/1991 | Dragisic |
| 5,066,432 A | 11/1991 | Gabathuler |
| 5,070,591 A | 12/1991 | Quick |
| 5,075,160 A | 12/1991 | Stinton |
| 5,079,082 A | 1/1992 | Leiser |
| 5,087,272 A | 2/1992 | Nixdorf |
| 5,089,236 A | 2/1992 | Clerc |
| 5,106,397 A | 4/1992 | Jaroszczyk |
| 5,114,901 A | 5/1992 | Tsang |
| 5,117,939 A | 6/1992 | Noguchi |
| 5,124,302 A | 6/1992 | Lachman |
| 5,151,819 A | 9/1992 | Stephens |
| 5,154,373 A | 10/1992 | Scott |
| 5,154,894 A | 10/1992 | MacFarlane |
| 5,154,901 A | 10/1992 | Yoshida |
| 5,167,934 A | 12/1992 | Wolf |
| 5,168,085 A | 12/1992 | Addiego |

| | | | | | |
|---|---|---|---|---|---|
| 5,171,341 A | 12/1992 | Merry | 5,589,143 A | 12/1996 | Mori |
| 5,173,349 A | 12/1992 | Yavuz | 5,593,647 A | 1/1997 | Kirby |
| 5,174,969 A | 12/1992 | Fischer | 5,599,510 A | 2/1997 | Kaminsky |
| 5,179,061 A | 1/1993 | Haerle | 5,601,259 A | 2/1997 | Dichiara |
| 5,180,409 A | 1/1993 | Fischer | 5,611,832 A | 3/1997 | Suzuki |
| 5,186,903 A | 2/1993 | Cornwell | 5,614,155 A | 3/1997 | Abe |
| 5,194,078 A | 3/1993 | Yonemura | 5,618,500 A | 4/1997 | Wang |
| 5,195,319 A | 3/1993 | Stobbe | 5,626,951 A | 5/1997 | Hogenson |
| 5,196,120 A | 3/1993 | White | 5,629,067 A | 5/1997 | Kotani |
| 5,210,062 A | 5/1993 | Narula | 5,629,186 A | 5/1997 | Yasukawa |
| 5,231,409 A | 7/1993 | Astier | 5,632,320 A | 5/1997 | Atmur |
| 5,232,671 A | 8/1993 | Brunson | 5,637,399 A | 6/1997 | Yoshikawa |
| 5,238,386 A | 8/1993 | Cunningham | 5,656,048 A | 8/1997 | Smith |
| 5,244,852 A | 9/1993 | Lachman | 5,660,778 A | 8/1997 | Ketcham |
| 5,248,481 A | 9/1993 | Bloom | 5,666,804 A | 9/1997 | Sekiya |
| 5,248,482 A | 9/1993 | Bloom | 5,670,443 A | 9/1997 | Irite et al. |
| 5,250,094 A | 10/1993 | Chung | 5,674,802 A | 10/1997 | Sheppard |
| 5,258,150 A | 11/1993 | Merckel | 5,686,039 A | 11/1997 | Merry |
| 5,258,164 A | 11/1993 | Bloom | 5,686,368 A | 11/1997 | Wong |
| 5,260,125 A | 11/1993 | Copes | 5,687,046 A | 11/1997 | Mathews |
| 5,262,129 A | 11/1993 | Terada | 5,687,787 A | 11/1997 | Atmur |
| 5,266,548 A | 11/1993 | Koradia | 5,691,736 A | 11/1997 | Hunn |
| 5,270,551 A | 12/1993 | Kamimura | 5,692,373 A | 12/1997 | Atmur |
| 5,271,906 A | 12/1993 | Yuuki | 5,702,494 A | 12/1997 | Tompkins |
| 5,272,125 A | 12/1993 | Weible | 5,702,761 A | 12/1997 | Dichiara, Jr. |
| 5,279,737 A | 1/1994 | Sekhar | 5,705,118 A | 1/1998 | Hayes |
| 5,290,350 A | 3/1994 | Besnard | 5,705,129 A | 1/1998 | Takahashi |
| 5,294,409 A | 3/1994 | Cohen | 5,705,444 A | 1/1998 | Tompkins |
| 5,294,411 A | 3/1994 | Breuer | 5,721,188 A | 2/1998 | Sung |
| 5,298,046 A | 3/1994 | Peisert | 5,723,403 A | 3/1998 | Durand et al. |
| 5,303,547 A | 4/1994 | Mieville | 5,730,096 A | 3/1998 | Atmur |
| 5,304,520 A | 4/1994 | Dwivedi | 5,732,555 A | 3/1998 | Gracyalny |
| 5,334,570 A | 8/1994 | Beauseigneur | 5,736,107 A | 4/1998 | Inomata |
| 5,338,903 A | 8/1994 | Winberg | 5,742,254 A | 4/1998 | Bassaler |
| 5,339,629 A | 8/1994 | Winberg | 5,744,763 A | 4/1998 | Iwasa |
| 5,376,598 A | 12/1994 | Preedy | 5,749,223 A | 5/1998 | Kreucher |
| 5,380,580 A | 1/1995 | Rogers | 5,750,026 A | 5/1998 | Gadkaree |
| 5,380,621 A | 1/1995 | Dichiara | 5,766,458 A | 6/1998 | Sekhar |
| 5,391,428 A | 2/1995 | Zender | 5,772,154 A | 6/1998 | Stewart |
| 5,393,499 A | 2/1995 | Bagley | 5,773,143 A | 6/1998 | Vermilion |
| 5,401,614 A | 3/1995 | Dichiara | 5,780,126 A | 7/1998 | Smith |
| 5,408,827 A | 4/1995 | Holtermann | 5,783,515 A | 7/1998 | Sakurai |
| 5,409,669 A | 4/1995 | Smith | 5,795,456 A | 8/1998 | Friedman |
| 5,429,780 A | 7/1995 | Prin | 5,801,806 A | 9/1998 | Dichiara |
| 5,436,216 A | 7/1995 | Toyao | 5,814,397 A | 9/1998 | Cagliostro |
| 5,449,654 A | 9/1995 | Prin | 5,827,577 A | 10/1998 | Spencer |
| 5,451,444 A | 9/1995 | DeLiso | 5,830,250 A | 11/1998 | Shirk |
| 5,453,116 A | 9/1995 | Fischer | 5,842,342 A | 12/1998 | Strasser |
| 5,455,594 A | 10/1995 | Blasing | 5,844,200 A | 12/1998 | Leader |
| 5,456,965 A | 10/1995 | Machida | 5,849,375 A | 12/1998 | Smith |
| 5,458,944 A | 10/1995 | Austin | 5,849,406 A | 12/1998 | Daws |
| 5,463,206 A | 10/1995 | Abe | 5,851,647 A | 12/1998 | Foster |
| 5,466,917 A | 11/1995 | Matsuki | 5,853,675 A | 12/1998 | Howorth |
| 5,482,538 A | 1/1996 | Becker | 5,853,684 A | 12/1998 | Fang |
| 5,482,817 A | 1/1996 | Dichiara | 5,856,263 A | 1/1999 | Bhasin |
| 5,486,399 A | 1/1996 | Brydon | 5,866,210 A | 2/1999 | Rosynsky |
| 5,487,865 A | 1/1996 | Hampton | 5,872,067 A | 2/1999 | Meng |
| 5,501,842 A | 3/1996 | Rajnik | 5,876,529 A | 3/1999 | Grant |
| 5,504,281 A | 4/1996 | Whitney | 5,879,640 A | 3/1999 | Atmur |
| 5,511,747 A | 4/1996 | Parrot | 5,882,608 A | 3/1999 | Sanocki |
| 5,516,580 A | 5/1996 | Frenette | 5,883,021 A | 3/1999 | Beer |
| 5,519,191 A | 5/1996 | Ketcham | 5,884,864 A | 3/1999 | Sunne |
| 5,523,059 A | 6/1996 | Langer | 5,907,273 A | 5/1999 | Ross, Jr. |
| 5,526,462 A | 6/1996 | Kondo | 5,910,095 A | 6/1999 | Strasser |
| 5,536,562 A | 7/1996 | Tran | 5,925,156 A | 7/1999 | Motoki |
| 5,540,981 A | 7/1996 | Gallagher | 5,928,448 A | 7/1999 | Daws |
| 5,551,239 A | 9/1996 | Feeley | 5,928,775 A | 7/1999 | Dichiara, Jr. |
| 5,552,360 A | 9/1996 | Farrauto | 5,932,496 A | 8/1999 | Morris |
| 5,553,455 A | 9/1996 | Craig | 5,939,141 A | 8/1999 | Cagliostro |
| 5,554,485 A | 9/1996 | Dichiara | 5,943,857 A | 8/1999 | Ansell |
| 5,567,536 A | 10/1996 | Lintz | 5,948,146 A | 9/1999 | Thomaides |
| 5,569,441 A | 10/1996 | Engler | 5,948,257 A | 9/1999 | Custer |
| 5,582,805 A | 12/1996 | Yoshizaki | 5,955,177 A | 9/1999 | Sanocki |

| | | | | | | |
|---|---|---|---|---|---|---|
| 5,972,810 | A | 10/1999 | Gabrisch | 6,495,207 | B1 | 12/2002 | Prociw |
| 5,976,997 | A | 11/1999 | Meaney | 6,497,390 | B1 | 12/2002 | Fischer |
| 5,980,837 | A | 11/1999 | Umin | 6,502,289 | B1 | 1/2003 | Kane |
| 5,980,980 | A | 11/1999 | Dichiara | 6,509,088 | B2 | 1/2003 | Baxter |
| 5,983,628 | A | 11/1999 | Borroni-Bird | 6,511,355 | B1 | 1/2003 | Woodward |
| 5,987,882 | A | 11/1999 | Voss | 6,513,526 | B2 | 2/2003 | Kwok |
| 5,987,885 | A | 11/1999 | Kizer | 6,514,040 | B2 | 2/2003 | Lewis |
| 5,989,476 | A | 11/1999 | Lockard | 6,521,321 | B2 | 2/2003 | Kahlbaugh |
| 6,013,599 | A | 1/2000 | Manson | 6,531,078 | B1 | 3/2003 | Laine |
| 6,019,946 | A | 2/2000 | Castillo | 6,531,425 | B2 | 3/2003 | Golden |
| 6,029,443 | A | 2/2000 | Hirota | 6,533,930 | B1 | 3/2003 | Kool |
| 6,051,193 | A | 4/2000 | Langer | 6,533,976 | B1 | 3/2003 | Strasser |
| 6,058,918 | A | 5/2000 | Noetzlin | 6,548,446 | B1 | 4/2003 | Koermer |
| 6,074,699 | A | 6/2000 | Dichiara, Jr. | 6,550,573 | B2 | 4/2003 | Wagner |
| 6,077,600 | A | 6/2000 | Atmur | 6,551,386 | B2 | 4/2003 | Weiler |
| 6,099,671 | A | 8/2000 | Pearson | 6,551,951 | B1 | 4/2003 | Fay |
| 6,101,714 | A | 8/2000 | Schmitt | 6,555,211 | B2 | 4/2003 | Moody |
| 6,112,746 | A | 9/2000 | Kwok | 6,558,785 | B1 | 5/2003 | Rawal |
| 6,121,169 | A | 9/2000 | Carpenter | 6,559,094 | B1 | 5/2003 | Korotkikh |
| 6,152,722 | A | 11/2000 | Sick | 6,584,768 | B1 | 7/2003 | Hecker |
| 6,153,291 | A | 11/2000 | Strasser | 6,601,385 | B2 | 8/2003 | Verdegan |
| 6,156,698 | A | 12/2000 | Iida | 6,607,851 | B2 | 8/2003 | Dichiara, Jr. |
| 6,157,349 | A | 12/2000 | Crouch | 6,607,998 | B1 | 8/2003 | Lambert |
| 6,166,283 | A | 12/2000 | Bharadwaj | 6,613,255 | B2 | 9/2003 | Dichiara, Jr. |
| 6,171,556 | B1 | 1/2001 | Burk | 6,622,482 | B2 | 9/2003 | Knight |
| 6,174,565 | B1 | 1/2001 | Daws | 6,630,115 | B1 | 10/2003 | Kaneeda |
| 6,197,180 | B1 | 3/2001 | Kelly | 6,632,110 | B2 | 10/2003 | Kato |
| 6,200,483 | B1 | 3/2001 | Cutler | 6,632,412 | B2 | 10/2003 | Peltola |
| 6,200,523 | B1 | 3/2001 | Quick | 6,632,540 | B2 | 10/2003 | Dichiara, Jr. |
| 6,200,538 | B1 | 3/2001 | Bruck | 6,641,795 | B2 | 11/2003 | Abe |
| 6,200,706 | B1 | 3/2001 | Ashida | 6,652,446 | B1 | 11/2003 | Bove |
| 6,210,786 | B1 | 4/2001 | Atmur | 6,652,950 | B2 | 11/2003 | Barney |
| 6,214,072 | B1 | 4/2001 | Kappeler | 6,660,115 | B2 | 12/2003 | Butler |
| 6,227,699 | B1 | 5/2001 | Wight, Jr. | 6,663,051 | B2 | 12/2003 | Okuyama |
| 6,228,117 | B1 | 5/2001 | De Bruijn | 6,663,839 | B2 | 12/2003 | Platvoet |
| 6,228,478 | B1 | 5/2001 | Kliwer | 6,669,265 | B2 | 12/2003 | Tilton |
| 6,237,587 | B1 | 5/2001 | Sparling | 6,669,913 | B1 | 12/2003 | Haberkamp |
| 6,238,467 | B1 | 5/2001 | Azarian | 6,673,136 | B2 | 1/2004 | Gillingham |
| 6,238,618 | B1 | 5/2001 | Brundage | 6,676,077 | B1 | 1/2004 | Dichiara, Jr. |
| 6,242,712 | B1 | 6/2001 | Prust | 6,676,745 | B2 | 1/2004 | Merkley |
| 6,247,304 | B1 | 6/2001 | Kim | 6,698,193 | B2 | 3/2004 | Duerr |
| 6,248,684 | B1 | 6/2001 | Yavuz | 6,699,342 | B2 | 3/2004 | Dichiara, Jr. |
| 6,248,689 | B1 | 6/2001 | Manson | 6,699,555 | B2 | 3/2004 | Dichiara, Jr. |
| 6,251,498 | B1 | 6/2001 | Fukushima | 6,712,318 | B2 | 3/2004 | Gubert |
| 6,270,216 | B1 | 8/2001 | Dichiara | 6,726,884 | B1 | 4/2004 | Dillon |
| 6,277,016 | B1 | 8/2001 | Koide | 6,770,584 | B2 | 8/2004 | Barney et al. |
| 6,279,857 | B1 | 8/2001 | Roth | 2001/0002287 | A1 | 5/2001 | Kar |
| 6,296,667 | B1 | 10/2001 | Johnson | 2001/0037729 | A1 | 11/2001 | Machida |
| 6,324,758 | B1 | 12/2001 | Huang | 2001/0043891 | A1 | 11/2001 | Adiletta |
| 6,340,360 | B1 | 1/2002 | Lyles | 2002/0004450 | A1 | 1/2002 | Gaffney |
| 6,355,591 | B1 | 3/2002 | Kuvettu | 2002/0087042 | A1 | 7/2002 | Schmidt |
| 6,365,092 | B1 | 4/2002 | Backa | 2002/0149128 | A1 | 10/2002 | Dichiara, Jr. |
| 6,393,835 | B1 | 5/2002 | Stoll | 2002/0150526 | A1 | 10/2002 | Hopkins |
| 6,397,603 | B1 | 6/2002 | Edmondson | 2002/0157358 | A1 | 10/2002 | Noda |
| 6,410,161 | B1 | 6/2002 | Li | 2002/0192512 | A1 | 12/2002 | Dichiara, Jr. |
| 6,419,189 | B1 | 7/2002 | Dichiara, Jr. | 2003/0003232 | A1 | 1/2003 | Rosynsky |
| 6,419,890 | B1 | 7/2002 | Li | 2003/0022783 | A1 | 1/2003 | Dichiara, Jr. |
| 6,440,192 | B2 | 8/2002 | Guerin | 2003/0032545 | A1 | 2/2003 | Dichiara, Jr. |
| 6,441,341 | B1 | 8/2002 | Steibel | 2003/0036477 | A1 | 2/2003 | Nordquist |
| 6,441,793 | B1 | 8/2002 | Shea | 2003/0068153 | A1 | 4/2003 | Suzuki |
| 6,444,006 | B1 | 9/2002 | Haberkamp | 2003/0082414 | A1 | 5/2003 | Dichiara, Jr. |
| 6,444,271 | B2 | 9/2002 | Wittenauer | 2003/0115859 | A1 | 6/2003 | Deeba |
| 6,449,947 | B1 | 9/2002 | Liu | 2003/0138585 | A1 | 7/2003 | Dichiara, Jr. |
| 6,453,937 | B1 | 9/2002 | Tobias | 2003/0152432 | A1 | 8/2003 | Meece |
| 6,454,622 | B2 | 9/2002 | Mashiko | 2003/0165638 | A1 | 9/2003 | Louks |
| 6,455,122 | B1 | 9/2002 | Igashira | 2003/0183008 | A1 | 10/2003 | Bang |
| 6,465,742 | B1 | 10/2002 | Hiraoka | 2003/0205310 | A1 | 11/2003 | Dichiara, Jr. |
| 6,479,104 | B1 | 11/2002 | Dichiara, Jr. | 2004/0001781 | A1 | 1/2004 | Kumar |
| 6,484,723 | B2 | 11/2002 | Haas | 2004/0001782 | A1 | 1/2004 | Kumar |
| 6,489,001 | B1 | 12/2002 | Cazzato | 2004/0028587 | A1 | 2/2004 | Twigg |
| 6,494,936 | B1 | 12/2002 | Peacock | 2004/0031643 | A1 | 2/2004 | Wagner |
| 6,494,979 | B1 | 12/2002 | Dichiara, Jr. | 2004/0056151 | A1 | 3/2004 | Dichiara, Jr. |
| 6,495,168 | B2 | 12/2002 | West | 2004/0091699 | A1 | 5/2004 | Denham |

| | | | |
|---|---|---|---|
| 2004/0091736 A1 | 5/2004 | Dichiara, Jr. | |
| 2004/0096619 A1 | 5/2004 | Dichiara, Jr. | |
| 2004/0132607 A1 | 7/2004 | Wood | |
| 2004/0176246 A1 | 9/2004 | Shirk | |

FOREIGN PATENT DOCUMENTS

| | | |
|---|---|---|
| EP | 0044716 | 1/1982 |
| EP | 0047525 | 3/1982 |
| EP | 0187256 | 7/1986 |
| EP | 0278597 | 8/1988 |
| EP | 0358522 | 3/1990 |
| EP | 0244109 | 9/1990 |
| EP | 0412315 | 2/1991 |
| EP | 0124863 | 4/1991 |
| EP | 0421159 | 4/1991 |
| EP | 0433582 | 6/1991 |
| EP | 0202733 | 7/1991 |
| EP | 0441401 | 8/1991 |
| EP | 0251150 | 12/1991 |
| EP | 0471590 | 2/1992 |
| EP | 0500154 | 8/1992 |
| EP | 0554104 | 8/1993 |
| EP | 0561019 | 9/1993 |
| EP | 0236071 | 10/1993 |
| EP | 0345795 | 11/1993 |
| EP | 0570698 | 11/1993 |
| EP | 0588182 | 3/1994 |
| EP | 0668252 | 2/1995 |
| EP | 0431648 | 3/1995 |
| EP | 0648535 | 4/1995 |
| EP | 0380634 | 8/1995 |
| EP | 0600971 | 11/1995 |
| EP | 0704241 | 4/1996 |
| EP | 0618353 | 7/1996 |
| EP | 0727567 | 8/1996 |
| EP | 0734757 | 10/1996 |
| EP | 0737859 | 10/1996 |
| EP | 0750971 | 1/1997 |
| EP | 0769822 | 4/1997 |
| EP | 0692995 | 7/1997 |
| EP | 0790216 | 8/1997 |
| EP | 0819459 | 1/1998 |
| EP | 0599595 | 4/1998 |
| EP | 0687805 | 5/1998 |
| EP | 0473715 | 8/1998 |
| EP | 0884459 | 12/1998 |
| EP | 0705134 | 4/1999 |
| EP | 0830201 | 1/2000 |
| EP | 1052010 | 11/2000 |
| EP | 0835368 | 1/2001 |
| EP | 0835367 | 3/2001 |
| EP | 1085352 | 3/2001 |
| EP | 1125704 | 8/2001 |
| EP | 1163970 | 12/2001 |
| EP | 1180390 | 2/2002 |
| EP | 0906496 | 3/2002 |
| EP | 0958874 | 5/2002 |
| EP | 1205228 | 5/2002 |
| EP | 0856645 | 7/2002 |
| EP | 1254715 | 11/2002 |
| EP | 1222661 | 5/2003 |
| EP | 1326012 | 7/2003 |
| EP | 1331118 | 7/2003 |
| EP | 0912820 | 8/2003 |
| EP | 1342889 | 9/2003 |
| EP | 1032755 | 11/2003 |
| EP | 1366801 | 12/2003 |
| WO | WO9303262 | 2/1993 |
| WO | WO9416134 | 7/1994 |
| WO | WO9620787 | 7/1996 |
| WO | WO9701599 | 1/1997 |
| WO | WO9927206 | 6/1999 |
| WO | WO9955459 | 11/1999 |
| WO | WO0008315 | 2/2000 |
| WO | WO0021903 | 4/2000 |
| WO | WO0070915 | 11/2000 |
| WO | WO0071863 | 11/2000 |
| WO | WO0154801 | 8/2001 |
| WO | WO0172663 | 10/2001 |
| WO | WO0173126 | 10/2001 |
| WO | WO0183956 | 11/2001 |
| WO | WO0194760 | 12/2001 |
| WO | WO0197952 | 12/2001 |
| WO | WO03053542 | 7/2003 |
| WO | WO03068362 | 8/2003 |
| WO | WO03069595 | 8/2003 |
| WO | WO2004011783 | 2/2004 |
| WO | WO2004011785 | 2/2004 |
| WO | WO2004001807 | 3/2004 |

OTHER PUBLICATIONS

Ogunwumi et al., Aluminum Titanate Compositions for Diesel Particulate Filters, SAE Technical Paper Series 2005-01-0583, Apr. 2005.
Cutler et al., A New High Temperature Ceramic Material for Diesel Particulate Filter Applications, SAE Technical Paper Series 2000-01-2844, Oct. 2000.
Chant et al., Aluminum Clad Ferritic Stainless Steel Foil for Metallic Catalytic Converter Substrate Applications, SAE Technical Paper Series 960556, Feb. 1996.
Brogan et al., Recent Progress in NOx Trap Technology, SAE Technical Paper Series 980933, Feb. 1998.
Gulati, Physical Durability of Thin Wall Ceramic Substrates, SAE Technical Paper Series 982635, Oct. 1998.
Dou et al., Investigation of NOx Adsorber Catalyst Deactivation, SAE Technical Paper Series 982594, Oct. 1998.
Aaronson et al., Diesel Odor and the Formation of Aromatic Hydrocarbons During the Heterogeneous Combustion of Pure Cetane in a Single-Cylinder Diesel Engine, Thirteenth Symposium on Combustion, Aug. 1970.
Bascom et al., Design Factors that Affect Diesel Emissions, SAE Technical Paper Series 710484, Feb. 1971.
Cooper et al., Role of NO in Diesel Particulate Emission Control, SAE Technical Paper Series 890404, Feb. 1, 1989.
Ilurn, Air Pollution and the Compression-Ignition Engine, Twelfth Symposium on Combustion, Jul. 1968.
Cooke, Inorganic Fibers—A Literature Review, Journal of the American Ceramic Society, Oct. 1, 1991.
Fernando et al., Improving an Alumina Fiber Filter Membrane for Hot Gas Filtration Using an Acid Phosphate Binder, Journal of Materials Science, Nov. 2001.
Diesel Filter Materials, www.DieselNet.com, Jan. 2003.
Ceramic Catalyst Substrates, www.DieselNet.com, Apr. 1997.
Khair, Air-to-Air Intercooling of the Ford 7.8L Mid-Range Truck Diesel Engine, SAE Technical Paper Series 870534, Feb. 1987.
Khan et al., Progress of Diesel Combustion Research, CIMAC 9th International Congress on combustion Engines, May 1971.
Lavoie et al., Experimental and Theoretical Study of Nitric Oxide Formation in Internal Combustion Engines, Combustion Science and Technology, Feb. 1970.
McCarthy, Diesel Fuel Property Effects on Exhaust Emissions from a Heavy Duty Diesel Engine that Meets 1994 Emissions Requirements, SAE Technical Paper Series 922267, Oct. 1992.
Merrion, Effect of Design Revisions on Two Stroke Cycle Diesel Engine Exhaust, SAE Technical Paper Series 680422, Feb. 1, 1968.
Nakatsuji et al., Highly Durable NOx Reduction System and Catalysts for NOx Storage Reduction System, SAE Technical Paper Series 980932, Feb. 1998.
Miyamoto et al., Description of Diesel Emissions by Individual Fuel Properties, SAE Technical Paper Series 922221, Oct. 1992.
Komiyama et al., Predicting NOx Emissions and Effects of Exhaust Gas Recirculation in Spark-Ignition Engines, Society of Automotive Engineers, May 1973.

Marshall et al., Factors Influencing Diesel Emissions, Society of Automotive Engineers, Inc., Aug. 1968.

Newhall et al., Direct Spectroscopic Determination of Nitric Oxide in Reciprocating Engine Cylinders, Society of Automotive Engineers, Inc., Jan. 1967.

Olson, Diesel Emission Control Devices—Design Factors Affecting Mounting Mat Selection, SAE Technical Paper Series 2004-01-1420, Mar. 2004.

Page, Optimization of the Air/Fuel Ratio for Improved Engine Performance and Reduced Emissions, SAE Technical Paper Series 961714, Aug. 1995.

Perez et al., Exhaust Emission Characteristics of Precombustion Chamber Engines, SAE Technical Paper Series 680421, Feb. 1, 1968.

Tuomola et al., A New Metallic Catalyst, SAE Technical paper Series 2002-01-0357, Mar. 2002.

Pischinger, The Diesel Engine for Cars—Is There a Future?, ICE Fall Technical Conference, Oct. 1996.

Wright et al., A Novel Electrostatic Method of Ultrafine PM Control Suitable for Low Exhaust Temperature Applications, SAE Technical Paper Series 2003-01-0771, Mar. 2003.

Watts et al., Air Motion and Fuel Distribution Requirements in High-Speed Direct Injection Diesel Engines, The Institution of Mechanical Engineers, 1969-70, April 1970.

Ullman et al., Effects of Fuel Aromatics, Cetane Number, and Cetane Improver on Emissions from a 1991 Prototype Heavy-Duty Diesel Engine, SAE Technical Paper Series 902171, Oct. 1990.

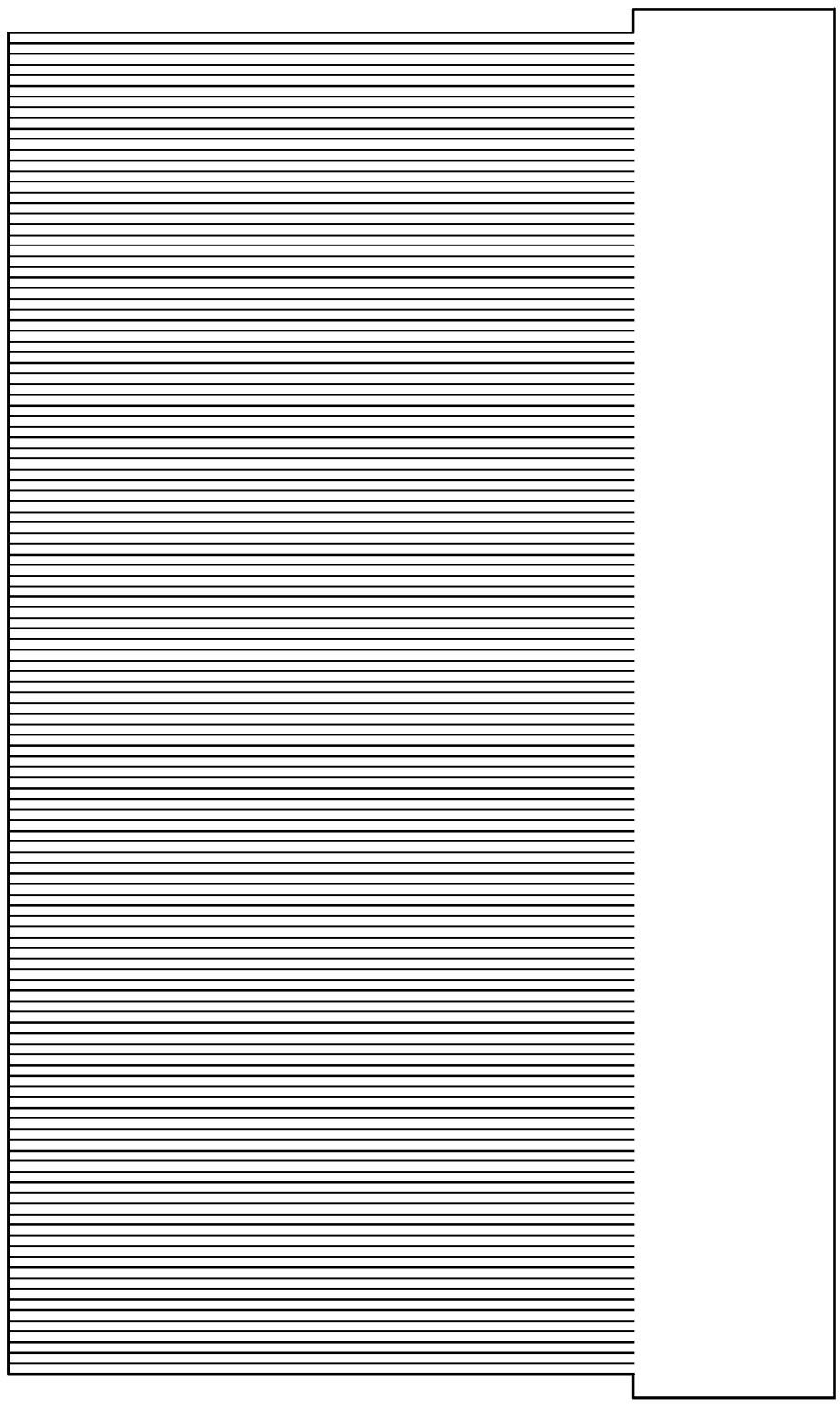

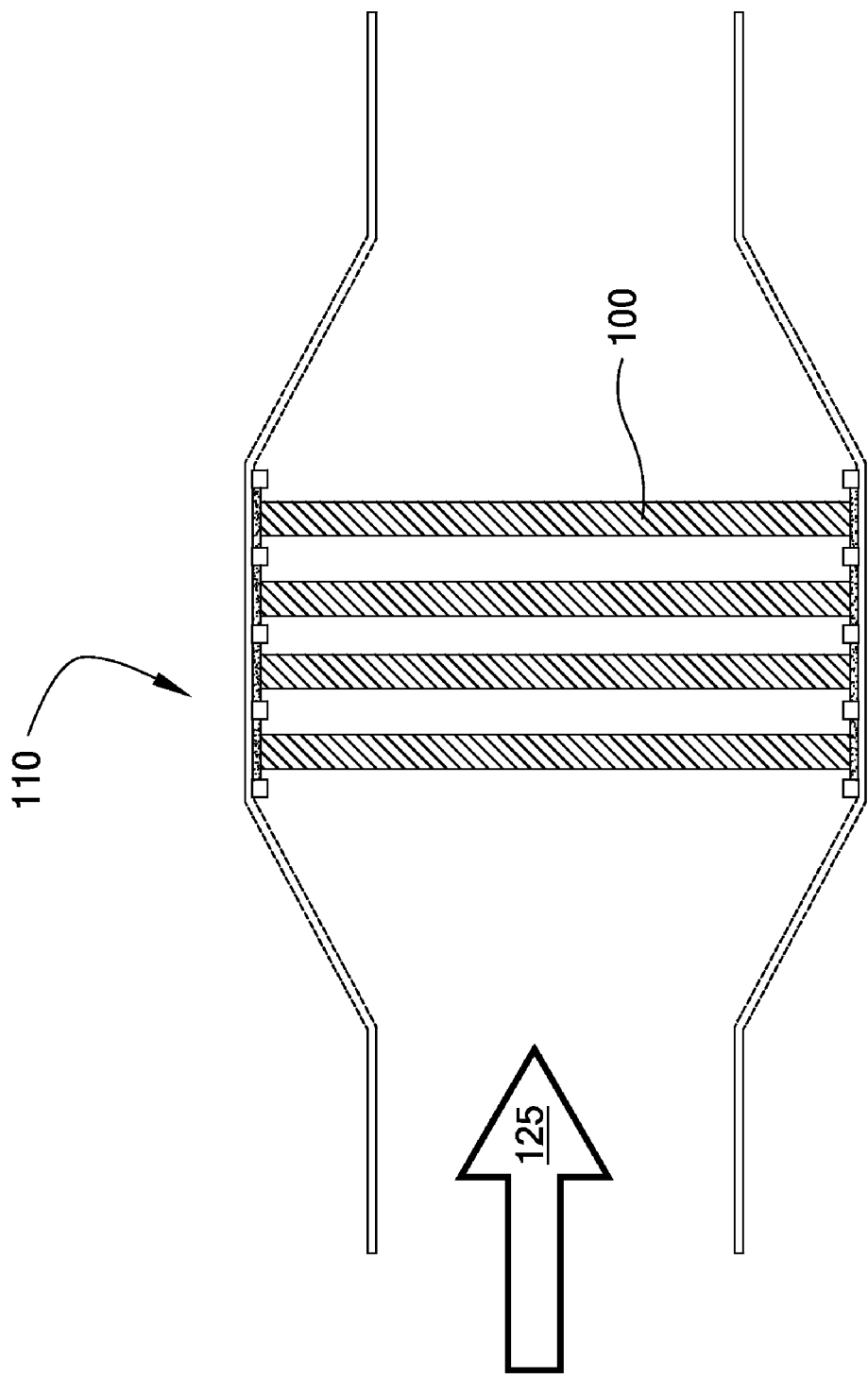

NONWOVEN COMPOSITES AND RELATED PRODUCTS AND METHODS

CROSS-REFERENCE TO RELATED APPLICATIONS

This application is a continuation of U.S. patent application Ser. No. 10/833,298, filed Apr. 28, 2004, which is a continuation-in-part to U.S. patent application Ser. No. 10/281,179, filed Oct. 28, 2002 now U.S. Pat. No. 6,946,013.

TECHNICAL FIELD OF THE INVENTION

This invention relates generally to ceramics, and, more particularly, to refractory ceramic substrates for catalyzing particular reactions and for filtering particulate matter.

BACKGROUND OF THE INVENTION

It is believed that embodiments of the invention described herein materially enhance the quality of the environment of mankind by contributing to the restoration or maintenance of one or more basic life-sustaining natural elements, including air, water, and/or soil. The invention and certain embodiments thereof are more fully described below.

Exhaust, Industry, and Pollution

Engines produce much of the power and mechanical work used across the globe. The internal combustion engine (ICE) is the most common engine type. The ICE burns fuel within a confined space to generate motion and power. The ICE is ubiquitous, being found in motor vehicles, locomotives, air- and marine-craft, tractors, generators, power plants, manufacturing facilities, industrial equipment and the like. Fuels used to power ICEs include gasoline, natural gas, diesel, ethanol, and vegetable oil. Inherent inefficiencies in both engine mechanics and the fuels themselves result in incomplete burning of fuel, leading to the production and emission of various pollutants. Thus, while a great innovation and convenience, the millions of engines currently in use represent a substantial source of air pollution.

The pollution produced by ICEs may be characterized as being either particulate or nonparticulate. Particulate pollution is generally characterized by the presence of small solid and/or liquid particles, such as carbonaceous soot and ash, dust, and the like. Nonparticulate pollutants include gases such as carbon monoxide, oxides of nitrogen and sulfur, ozone, and the like, as well as unburned hydrocarbons and volatile organic compounds. Particulate pollutants can be filtered from the exhaust and either discarded or further oxidized into less egregious gaseous products. Nonparticulate pollutants may likewise be converted to nonpollutants. Significant nonpollution emissions from ICEs include nitrogen gas ($N_2$), carbon dioxide ($CO_2$), and water vapor ($H_2O$). These emissions are generally benign to humans (although excess levels of atmospheric $CO_2$ are believed to contribute to global warming).

Air pollution poses a serious health risk to people and can damage the environment. Ozone ($O_3$), for example, is a respiratory irritant and can cause coughing, irritation in the throat, reduction of lung function, feelings of chest tightness, wheezing, shortness of breath, and the aggravation of asthma. Ozone may also contribute to the formation of smog. Likewise, microscopic solid particles or liquid droplets may work their way deep into the lungs; these particles may be irritants or, worse, carcinogens. When exposed to such particles, people may also experience nose and throat irritation, bronchitis, pneumonia, as well as increased risk of heart and/or lung disease, headaches, nausea, allergic reactions, chronic respiratory disease, lung cancer, heart disease, neurological damage, and damage to organs such as the liver and kidneys. Continual exposure to air pollution may have adverse effects on the lungs of growing children and may aggravate or complicate medical conditions in the elderly.

Medical conditions arising from exposure to air pollution may be very expensive to the individual. Further, in aggregate these medical conditions represent a drain on the economy, both in terms of direct loss of productivity as well as in tax dollars spent on healthcare. Such expenses amount to billions of dollars annually. Reducing the adverse health effects of pollution by reducing the amount of airborne pollutants would not only enhance the overall respiratory health of the population but would also decrease the substantial burden borne by the healthcare system and the drain on the economy as a whole.

To this end, government and industry have committed to reducing the level of air pollution. Government agencies set emissions standards and implement pollution regulations. The Kyoto Protocol is an example of inter-governmental cooperation in calling for worldwide reductions in greenhouse gases.

The chief U.S. regulatory agency is the Environmental Protection Agency (EPA), created by the 1970 amendments to the Clean Air Act (CAA) of 1963. The CAA is the comprehensive Federal law that regulates air emissions from area, stationary, and mobile sources. The EPA has set regulations for various pollutants. These "criteria pollutants" include: (1) ozone ($O_3$); (2) lead (Pb); (3) nitrogen dioxide ($NO_2$); (4) carbon monoxide (CO); (5) particulate matter (PM); and (6) sulfur dioxide ($SO_2$). Further, a 1990 amendment to the CAA was made to address problems such as acid rain, ground-level ozone, stratospheric ozone depletion, and air toxics. As a result, the EPA issued 175 new regulations to reduce automotive emissions, gasoline reformation, the use of ozone depleting chemicals, and the like.

Ground-level ozone is a primary constituent of smog. Ozone is generally not directly emitted into the air, but instead is formed by the reaction of volatile organic compounds (VOCs) or reactive organic gases (ROGs) with nitrogen oxides (NOx) in the presence of heat and sunlight. VOCs/ROGs are emitted from a various sources, including ICE combustion byproducts, solvents, petroleum processing, and pesticides. Nitrogen oxides are likewise produced as ICE combustion products. Since 1997, the national ambient air quality standards for ozone are an 8-hour 0.08 ppm standard.

Nitrogen dioxide ($NO_2$) is a reactive gas that can be formed by the oxidation of nitric oxide (NO). Nitrogen oxides (NOx) play a major role in the formation of ozone and smog. The major sources of man-made NOx emissions are high-temperature combustion processes.

Carbon monoxide (CO) is a colorless, odorless, and potentially deadly that can be produced by the incomplete combustion of carbon in fuels. Motor vehicle exhaust contributes about 60% of CO emissions in the U.S. In cities, as much as 95% of the CO in the air is generated by automobile exhaust.

Particulate matter includes microscopic airborne solid particles and/or liquid droplets. PM can be further classed as "fine" (particles have diameters of less than 2.5 microns, hereinafter 'PM-2.5') and "coarse" (particles have diameters in excess of 2.5 micrometers). Fine particles result primarily from fuel combustion in motor vehicles, power generation, industrial facilities, and from residential fireplaces and wood stoves. Coarse particles 107 are typically generated by such sources as vehicles traveling on unpaved roads, materials handling equipment, and crushing and grinding operations.

(See FIG. 5). Some PM is emitted directly from the source (such as smokestacks and automobiles) while other PM is generated through the interaction of gases such as $SO_2$, NOx, VOC and other airborne compounds to form fine particles. The chemical and physical compositions of the particles vary.

Sulfur dioxide can be formed when fuel containing sulfur (such as coal and oil) is burned, for example, during metal smelting and other industrial processes.

ICEs are directly effected by these regulations, since the engines emit both criteria pollutants and air toxics. ICEs typically run on one of two types of petroleum fuel, either gasoline or diesel. Each type of fuel contains complex mixtures of hydrocarbon compounds as well as traces of many other materials, such as sulfur. While other types of fuel can also be used, such as ethanol/petroleum fuel mixtures, vegetable oils, and the like, all known fuels produce some degree of emissive pollution when burned. In addition, lubricants are often added to the fuel mix to enhance engine performance and durability.

In order to reduce emissions, ICEs are increasingly designed to carefully control the amount of fuel burned. In gasoline engines, the air-to-fuel ratio is maintained very close to the stoichiometric point, the calculated ideal ratio of oxygen to fuel. At the stoichiometric point, all of the fuel introduced into the engine will theoretically be burned using all of the oxygen available from the air introduced into the engine. In practice, the fuel-to-air ratio actually varies from the ideal stoichiometric ratio quite a bit during driving, since the oxygen content of the air is not necessarily a constant, air density fluctuates with temperature (which is also not a constant), the engine valve settings may vary with temperature, vibration and impact effects are random, and the like. Sometimes the mixture is lean (the air-to-fuel ratio is relatively high) and other times the mixture is rich (the air-to-fuel ratio is low). These deviations tend to be uncontrolled and thus result in the generation of various pollutants.

Motorcycles represent another type of mobile, on-road vehicle and include both two and three-wheeled motorcycles designed for on-road use. Motorcycles primarily use gasoline fuel. Emissions control technologies for motorcycles include conversion of 2-stroke engines to 4-stroke, advanced injection systems (injection timing, injection pressure, rate shaping, common rail injection, and electronic controls), pulse air systems, changed combustion chamber design (higher compression ratios, piston geometry, and injector location), and the use of catalytic converters. Limitations in motorcycles' emissions control technologies are different than those in light or heavy-duty vehicles. With motorcycles, the focus is more on the appearance, placement, and heat generation and removal of aftertreatment devices, as there are fewer places to "hide" aftertreatment devices and the passenger is in much closer proximity to the exothermic oxidation reaction. Additionally, the vibratory accelerations experienced in motorcycles by the aftertreatment devices are generally more damaging in motorcycles than in automobiles.

Diesel engines also contribute to the criteria pollutants. These engines use hydrocarbon fractions that auto-ignite when compressed sufficiently in the presence of oxygen. In general, diesel combusting within a cylinder produces greater amounts of particulate matter and the pollutants nitrogen and sulfur oxides (NOx and SOx respectively) than does gasoline combustion. Even so, diesel mixtures are generally lean, with relatively abundant amounts of oxygen present. Consequently, the combustion of the smaller hydrocarbons is usually more complete, producing less carbon monoxide than gasoline. Longer chain hydrocarbons are more difficult to burn completely and typically result in the formation of significant amounts of particulate residues, such as carbon "soot."

Due to the importance of improving air quality and complying with relevant laws and regulations, substantial time, money and effort have been invested in developing technologies for reducing engine emissions. Emission reduction technologies may be classified as follows: engine improvements, fuel improvements, and after-treatments. These classifications are for convenience and are not mutually exclusive. Engine improvements technologies include advanced injection systems, exhaust gas recirculation, electronic sensors and fuel controls, combustion chamber designs, advanced turbocharging, and variable valve timing. Fuel improvement technologies include fuel formulations, such as high octane, low aromatic, low sulfur, fuel borne catalysts, liquefied petroleum gas (LPG), oxygenation of fuels, compressed natural gas (CNG) and biodiesels. After-treatment technologies include catalytic converters (2, 3, and 4-way), particulate traps, selective catalytic reduction, NOx adsorbers, HC adsorbers, NOx reduction catalysts, and many others. Some systems incorporate various pieces of these and other technologies. For example, catalyzed diesel particulate traps traverse the categories as set forth above.

One notable emission control device is the catalytic converter. Catalytic converters operate by providing a site where the potential barrier for the conversion of a pollutant species into a nonpollutant species is significantly lowered. Catalytic converters enjoy widespread use in cars and light-duty vehicles. Recent improvements in converters (such as somewhat increased substrate geometric surface area, lower thermal mass, optimized washcoating, reduced catalyst loading but higher reactive surface area, etc.) have yielded incremental improvements in emissions control. To meet the increasingly strict requirements imposed automobiles, manufacturers will likely increase catalyst loading or the number of substrates per vehicle. Other emissions control technologies include advanced injection systems (injection timing, injection pressure, rate shaping, common rail injection, electronic controls), exhaust gas recirculation, changes in combustion chamber design (higher compression ratios, piston geometry, and injector location), advanced turbo charging, conventional catalytic converters, and catalytic exhaust mufflers.

Diesel engine emissions control technologies are similar to those used on gasoline vehicles and include advanced injection systems (injection timing, injection pressure, rate shaping, common rail injection, electronic controls), exhaust gas recirculation, changes in combustion chamber design (higher compression ratios, piston geometry, and injector location), advanced turbo charging, ACERT, diesel particulate filters, NOx adsorbers, DPNR systems, selective catalytic reduction, fuel reformers, fuel-borne catalysts, catalytic exhaust mufflers, and diesel oxidation catalysts. Exhaust gas recirculation (EGR) has been problematic due to its tendency increase the generation of particulate pollution. EGR also requires cooling of the recirculated gasses, which necessitates a larger radiator, and thus a larger nose on the vehicle, creating aerodynamic and fuel economy constraints.

Exhaust gas recirculation (EGR) directs a portion of the exhaust gas stream back into the air intake of the engine. The recirculated exhaust gas has a higher specific heat and can absorb some of the heat generated during combustion, hence lowering the temperature of combustion. EGR does not require regular maintenance and works well in combination with high swirl-high turbulence combustion chambers. EGR drawbacks include reduced fuel efficiency and engine life, greater demands on the vehicle's cooling system, limitation to decreasing only NOx, emissions and a requirement of control algorithms and sensors. Thus, there is a limit to the amount of EGR that can be applied to any engine, and EGR is often used in parallel with another control technology.

The technology used to control emissions from stationary sources varies widely, but examples include filters, scrubbers, sorbents, selective catalytic reduction (SCR), precipitators, zero-slip catalysts, catalysts for turbines, or oxidation catalysts.

Reformulating or using different fuels is another emissions control technique applicable to both mobile and stationary engines, since some fuels inherently pollute more than others and other fuels tend to degrade catalysts that could otherwise function to clean the exhaust air. For instance, although the shift from leaded to unleaded fuel was driven be the degradatory effect of lead on catalytic converters, the removal of lead from fuels also greatly decreased lead emissions. Lowering the sulfur content in fuel reduces SOx emissions and increases the efficiency of many catalytic converters, as sulfur can also degrade catalysts.

Use of aftertreatment devices to remove pollutants from post-combustion exhaust gasses is very common. Perhaps the most common aftertreatment device is the catalytic converter. Catalytic converters designs vary widely, but in general function to remove combustible pollutants from the exhaust stream via catalysis of further combustion reactions. The composition and placement of the catalyst(s), and the substrate(s) used to support them, vary with converter design.

A two-way catalytic converter performs oxidation of gas-phase pollution, such as the oxidation of HC and CO to $CO_2$ and $H_2O$. While two-way converters are effective at controlling HC and CO and require little maintenance, they can actually increase NOx emissions and tend to be degraded by lead and sulfur.

A three-way catalytic converter performs both oxidation (conversion of CO and HC to $CO_2$ and $H_2O$) and reduction (conversion of NOx to $N_2$ gas) reactions. Further performance improvements by these devices are limited by a number of factors, such as the temperature range and surface area of their substrates and by the susceptibility of the catalyst to further degradation.

Particulate traps or filters are another type of aftertreatment device commonly used in diesel applications, as the combustion of diesel fuel generates a considerable amount of particulate matter. In a diesel particulate trap (DPT), also sometimes called the diesel particulate filter or soot filter, the exhaust stream is directed through a filter for collection of airborne particles. The removal of accumulated particulate matter from the trap at a later time is commonly referred to as "regeneration" and can be accomplished in a number of ways. One method of regeneration applies externally generated heat to "burn off" the trapped particulates. Alternately, small amounts of diesel fuel may be released into the exhaust stream to ignite upon contact with the filter to raise the filter temperature sufficiently to completely burn the trapped particulate matter. Still alternately, fuel borne catalysts may be supplied to facilitate regeneration. Yet alternately, the filter may include a catalyst to reduce the temperature necessary for the PM to burn off ("catalyzed diesel particulate filter or catalyzed soot filter (CSF)"). Still alternately, an oxidation catalyst may be placed upstream of the filter to facilitate burn off of the PM. Diesel particulate traps can reduce PM emissions by as much as 85%. Traps utilizing a catalyst can reduce the emissions of other, non-PM pollutants (e.g., HC, CO, and PM) for even cleaner emissions. Diesel particulate traps include a number of different types of filter configurations, including, powder ceramic monolithic, fiber-wound, knitted fiber, woven fiber, sintered metal fiber and filter paper, among others. The drawbacks of particulate traps include impedance of the exhaust stream when the traps become clogged with particulates (soot, ash, and the like) thus increasing exhaust back pressure and making the engine work harder. Further, some trapped particulates, such as ash, may degrade catalysts used in the catalyzed versions. Some traps also cannot survive the large thermal gradients experienced during regeneration. Moroever, particulate traps inherently add cost and weight to vehicles.

Selective catalytic reduction (SCR) is another example of an aftertreatment system for reducing the amount of NOx in the exhaust stream. In SCR, a chemical capable of acting as a reducing agent (such as urea) is added to the exhaust stream before the exhaust reaches the catalyst chamber. The reducing agent hydrolyzes to form ammonia, which then reacts with NOx in the exhaust gas to reduce the NOx to yield nitrogen ($N_2$) gas, thereby decreasing NOx emissions. Alternately, ammonia may be directly injected in to the exhaust stream. An oxidation catalyst is often used in parallel with SCR to reduce CO and HC. Unfortunately, while SCR is effective in reducing NOx with low catalyst deterioration and good fuel economy, it requires an additional tank for the reducing agent and an infrastructure for refilling the tank and dispersing the agent. SCR is also dependent on end user compliance (i.e., keeping the reducing agent supply filled) in order to maintain the emissions control.

NOx adsorbers are materials that store NOx under lean conditions and release and catalytically reduce the stored NOx under fuel rich conditions (typically every few minutes). This technology is viable in both gasoline and diesel applications, and some engines provide a better fuel rich, high temperature environment. NOx adsorbers reduce the levels of HC, NOx, and CO, but have little to no effect on PM. NOx adsorbers have the advantage of functioning under a wide range of temperatures. Conversely, NOx adsorbing capacity decreases with decreasing temperature and thus requires the installation of engine controls and sensors. Further, NOx adsorbers tend to be degraded by high sulfur content in fuel. There are additional constraints in diesel applications, including the quantity of oxygen present in the exhaust, the HC utilization rate, the temperature range, and smoke or particulate formation.

An NOx reduction catalyst can also be used to control emissions. This is accomplished by actively injecting reductant into the system upstream of the catalyst and/or using a washcoat (such as with zeolite) that adsorbs HC and thus creates an oxidizing region conducive to reducing NOx. While this technology can reduce NOx and PM emissions, it is relatively expensive and can lead to poor fuel economy and/or the generation of sulfate particulates.

HC adsorbers are designed to trap VOCs while cold and then release the VOCs when heated. HC adsorbers may be coated directly onto the catalytic converter substrate, allowing for minimal system changes but less control. Alternately, the HC adsorbers may be located in a separate, but connected, exhaust pipe upstream of the catalytic converter with a valve in place for redirecting the exhaust stream once the converter is heated. Still alternately, the HC adsorbers may be positioned downstream of the catalytic converter. The last two options require a cleaning option for the adsorber. While this technology reduces cold start emissions, it is difficult to control and adds cost.

Since no technology yet exists to single-handedly reduce all types of emissions, individual emissions control technologies are often combined in an exhaust system. Examples of combination systems include a DeNOx and DPT combination, a catalytic converter placed in the muffler, SCR integrated with the muffler, a catalyzed diesel particulate filter, and the like. Another example of a system incorporating multiple emissions control technologies is ACERT, which targets four areas—intake air handling, combustion, electronics, and exhaust aftertreatment. Key components include single and series turbocharging for cooling intake air, variable valve actuation for improving fuel burns, electronic multiplexing for integrating computer control, and catalytic conversion for reducing tailpipe particulate emissions. Working in concert, these subsystems allow for an increase in fuel efficiency.

Catalytic Converters

The catalytic converter operates to change some of the pollutants in the exhaust stream into less harmful compounds, commonly occurring molecules such as $N_2$, $H_2O$, and $CO_2$. Basically, the catalytic converter provides a surface on which reactions are encouraged that convert pollutants into the relatively harmless reaction products mentioned above.

Typical pollutants in combustion exhaust include nitrogen oxides (NOx), unburned hydrocarbons, carbon monoxide, and the particulate matter. The nitrogen oxides can be reduced to form nitrogen. When a NO or $NO_2$ molecule contacts an appropriate catalyst material, the catalyst facilitates removal of nitrogen from the molecule, freeing oxygen in the form of $O_2$. Nitrogen atoms adhering to the catalyst then react to form $N_2$ gas: $2\ NO => N_2 + O_2$ and $2\ NO_2 => N_2 + 2\ O_2$. The carbon monoxide, unburned hydrocarbons, and particulate matter can be further oxidized to form relative nonpollutants. For example, carbon monoxide is reacted as shown: $2\ CO + O_2 => 2\ CO_2$. The overall result of the catalytic converter is to substantially complete the combustion of fuel into relative nonpollutants.

Conventional catalytic converters have a number of limitations to their effectiveness of eliminating pollutants. For example, if the converter is located too close to an engine, it may crack from thermal stresses brought about by rapid local heating. Accordingly, the filters used in conventional catalytic converters are typically not placed immediately adjacent or inside an engine exhaust manifold, an otherwise optimal location to take advantage of the in situ high exhaust gas temperatures. Moreover, engine vibration and large temperature gradients near and within the exhaust manifold can cause conventional filter material to degrade and fatigue, substantially decreasing the life of the filters. In addition, some catalysts applied to conventional filters work less efficiently or even cease to function at high temperatures, i.e., above 500 degrees Celsius. Accordingly, catalytic converter filters are usually positioned remote from the engine.

Structures of Catalytic Converters and Particulate Filters

The components of a catalytic converter are shown in FIGS. 1, 3 and 4. The catalyst substrate is held within the converter shell or canister by a packaging mat, typically made of ceramic fibers. The shell is fluidically connected to the exhaust stream, such that exhaust gasses generated by the engine are directed through the converter on their way to the atmosphere. Catalytic converters, especially those found in gasoline engine applications, may be also equipped with heat shielding to protect adjacent vehicle components from exposure to excessive temperatures.

Generally, a catalytic converter is composed of five main components: 1) a substrate; 2) a catalytic coating; 3) a washcoat; 4) a matting; and 5) a housing canister.

Substrate

The substrate is a solid surface on which the pollutants can be converted to relative nonpollutants. Physically, a substrate provides the interface for several molecular species to react with each other. The substrate generally defines a large surface area to provide a platform on which pollutants may be converted to relative nonpollutants.

Typical substrate configurations include woven or pleated fibrous papers, honeycomb monoliths and beads. A honeycomb structure typically contains numerous channels, usually running parallel to each other along the length of the substrate, to provide high surface area for reactions. (See FIG. 1) These channels further function to direct the flow of exhaust gas from the engine through the catalytic converter and out through exhaust pipe. In the bead structure, the substrate is made of a collection of small beads filling an enclosure (similar to putting a bunch of jelly beans in a tube). The exhaust flows around the beads and the pollutants are converted to nonpollutants on the bead surfaces. Similarly, the woven fiber structure exposes a large amount of fiber surface area to the exhaust gas pollutants upon which reactions may occur. Substrate compositions include ceramic metal oxides, foamed ceramics/glasses, reticulated foams, power ceramics, nanocomposites, metals, and fiber mat-type substrates. The most commonly used substrate material is cordierite.

Catalytic Coating

Catalytic coating of the substrate provides the surface upon which the conversion of pollutants to non-pollutants may be done at reduced temperatures or with reduced energy input. The catalyst influences the rate of a chemical reaction but does not take part in the reaction, i.e., it is not consumed or altered in the reaction. In other words, catalysts facilitate reactions which are otherwise too slow or which would otherwise require high temperatures to be efficient. As used in catalytic converters, the catalysts allow more complete combustion of HC pollutants at lower temperatures.

Since catalysts provide the ability to enable or accelerate certain chemical reactions between exhaust gas components, solid catalysts are particularly useful in the catalysis of gas phase reactions. The catalytic effect is maximized by good contact between the gas phase and the solid catalyst. In catalytic reactors, this is usually realized by providing finely dispersed catalyst on high specific surface area substrate support.

The catalytic material is typically added to the substrate as a coating after formation. Different catalyst compositions are selected depending upon the chemical reaction to be catalyzed. Other factors influencing catalyst selection include the chemical environment, temperature conditions, economic factors (i.e., catalyst cost) and the like. A number of metal catalysts are known, the most common being platinum, palladium, rhodium and alloys of the same. As noble metal catalysts are both rare and expensive, much effort has gone into the development of other, less rare catalyst compositions.

The rates of chemical reactions, including catalyzed reactions, generally increase with increasing temperature. A strong dependency of conversion efficiency on temperature is a characteristic feature of almost all emission control catalysts. A typical relationship between the catalytic conversion rate of an exhaust gas constituent and the temperature is shown as the solid line in FIG. 2. The conversion rate, near-zero at low temperatures, increases slowly at first and then more rapidly with increasing reaction temperature, and reaches a plateau at high temperatures. When discussing combustion reactions, the term light-off temperature is commonly used to characterize this behavior. The catalyst light-off temperature is generally taken to be the minimum temperature necessary to initiate the catalytic reaction. More precisely, the light-off temperature may be taken to be the temperature at which conversion reaches 50%, or $T_{50}$. When comparing the activities of different catalysts, the most active catalyst will be characterized by the lowest light-off temperature for a given chemical reaction.

In some catalyst systems, increasing the temperature may only increase the conversion efficiency up to a certain point, as illustrated by the dashed line in FIG. 2. Further temperature increase, despite increasing reaction rates, causes a decrease in the catalyst conversion efficiency. The declining efficiency is generally considered to arise from other competing reactions which deplete the concentrations of reactants, by thermodynamic reaction equilibrium constraints, and/or by thermal agitation of gas molecules at the catalyst surface preventing the gas molecules from contacting the catalyst long enough to be catalyzed.

The temperature range corresponding to the high conversion efficiency is frequently called the catalyst temperature window. This type of conversion curve is typical for selective catalytic processes.

Another important variable influencing the conversion efficiency is the size of the reactor. The gas flow rate through a catalytic reactor is commonly expressed, relative to the size of the reactor, as space velocity (SV). The space velocity is defined as the volume of gas, measured at standard conditions (STP), per unit time per unit volume of the reactor, as follows: (3) $SV=V/V_r$, where V is the volumetric gas flow rate at STP, $m^3/h$; $V_r$ is the reactor volume, $m^3$, and SV has the dimension of reciprocal time which is commonly expressed in 1/h or $h^{-1}$.

Wash Coat

In most cases, the catalytic coating includes a wash coat. The washcoat is an intermediate layer applied to the surface of the substrate, thereby increasing its effective surface area and providing a surface to which the catalyst adheres. Metal catalyst may thus be impregnated on this porous, high surface area layer of inorganic carrier. Additionally, the washcoat can physically separate and prevent undesired reactions between components of a complex catalytic system. Washcoat materials include inorganic base metal oxides such as $Al_2O_3$, $SiO_2$, $TiO_2$, $CeO_2$, $ZrO_2$, $V_2O_5$, $La_2O_3$ and zeolites. Some of these materials primarily serve as catalyst carriers, while others are added to the washcoat as promoters or stabilizers. Still other washcoat materials exhibit catalytic activity of their own. Good washcoat materials are characterized by high specific surface area and thermal stability.

Canister

FIG. 3 illustrates a typical prior art catalytic converter. The substrate is packaged into a canister, such as a steel shell, to form a catalytic converter. The canister performs a number of functions, including housing the catalyzed substrate and protecting the substrate from the external environment. The canister may be dedicated to the converter or may perform another function, such as housing a muffler. Additionally, the canister directs the flow of exhaust gas through and/or over the catalyzed substrate. The catalyzed substrate is usually placed inside the canister having a configuration made according to one of several methods, including: clamshell, tourniquet, shoebox, stuffing, and swaging, as shown in FIG. 4.

Matting

In addition to the canister, a matting material is often used to package the catalytic substrate in the canister. The packaging mats, usually made of ceramic fibers, protects the substrate and evenly distribute the pressure from the shell. The mats often include vermiculite, which expands at high temperatures, thus compensating for the thermal expansion of the shell and providing adequate holding force under a wide range of operating conditions.

Heat Insulation

In many applications, the catalytic converter is heat insulated to avoid damage to surrounding vehicle components (e.g., plastic parts, fluid hoses) and/or to prevent an increase of engine compartment temperature. One method of managing the heat output of the converter is the employment of a refractory heat shield positioned around the converter body.

Particulate Trap

DPTs are relatively effective at removing carbon soot from the exhaust of diesel engines. The most widely used DPT is the wall-flow filter which filters the diesel exhaust by capturing the soot on the porous walls of the filter body. The wall-flow filter is designed to provide for nearly compete filtration of soot without significantly hindering the exhaust flow.

As the layer of soot collects on the surfaces of the inlet channels of the filter, the lower permeability of the soot layer cause a pressure drop across the filter and a gradual rise in the back pressure of the filter against the engine, causing the engine to work harder, thus reducing engine operating efficiency. Eventually, the pressure drop becomes unacceptable and removal of the trapped particulates from the filter (i.e., filter regeneration) becomes necessary. In conventional systems, the regeneration process involves heating the filter to initiate combustion of the trapped carbon soot. In certain circumstances, the regeneration is accomplished under controlled conditions of engine management whereby a slow burn is initiated and maintained for a number of minutes, during which the temperature in the filter rises from about 400-600° C. to a maximum of about 800-1200° C.

In certain applications, the highest temperatures reached during regeneration tend to occur near the exit end of the filter due to the cumulative effects of the wave of soot combustion that progresses from the entrance face to the exit face of the filter as the exhaust flow carries the heated combustion gasses down the filter. Further, a so-called "uncontrolled regeneration" can occur when the onset of combustion coincides with, or is immediately followed by, high oxygen content and low flow rates in the exhaust gas (such as engine idling conditions). During an uncontrolled regeneration, the combustion of the soot may produce temperature spikes within the filter that can thermally shock and crack, or even melt, portions of the filter. The most common temperature gradients observed are radial temperature gradients (wherein the temperature of the center of the filter is hotter than the rest of the substrate) and axial temperature gradients (wherein the exit end of the filter is hotter than the rest of the substrate).

In addition to capturing the carbon soot, the filter also traps metal oxide "ash" particles that are carried by the exhaust gas. Usually, these ash deposits are derived from uncombusted lubrication oil that sometimes accompanies the exhaust gas. These particles are not combustible and, therefore, are not removed during regeneration. However, if temperatures during uncontrolled regenerations are sufficiently high, the ash may eventually sinter to the filter or even chemically react with the filter, resulting in localized melting of the filter.

It is desirable to obtain a filter which offers improved resistance to melting and thermal shock damage so that the filter not only survives numerous controlled regenerations over its lifetime, but also (hopefully) survives the less frequent but more severe uncontrolled regenerations.

Continuous Regeneration Trap

Several conventional methods exist for controlling regeneration of DPTs. An application of catalyst to the filter can reduce the oxidation temperature of particulate matter. Likewise, the filter can be preceded with a chamber containing oxidation catalyst that creates $NO_2$, to help burn off particulate matter. Also, utilize fuel-borne catalysts may be provided. Additionally, an external source of heat may be provided to burn off trapped soot and the like (with or without catalysts). In any event, regeneration leaves behind ash residue that requires maintenance to clean the filter.

Some filter designs include diesel oxidation catalysts (DOCs). DOCs catalyze the oxidation of CO and hydrocarbons. Hydrocarbon activity extends to the polynuclear aromatic hydrocarbons (PAHs) and the soluble organic fraction (SOF) of particulate matter. Catalyst formulations have been developed that selectively oxidize the SOF while minimizing oxidation of sulfur dioxide or nitric oxide. However, DOCs may produce sulfuric acid byproducts and increase the emission of $NO_2$ as byproducts of the oxidation of hydrocarbons.

The main refractory component of conventional filters is a ceramic (typically cordierite or SiC) wall-flow monolith. The porous walls of the monolith are coated with an active catalyst. As the diesel exhaust aerosol permeates through the walls, the soot particles are deposited within the wall pore network, as well as over the inlet channel surface. The catalyst facilitates diesel particulate matter (DPM) oxidation by the oxygen present in exhaust gas.

Pressure Drop

The flow of exhaust gas through a conventional catalytic converter is accompanied by a substantial amount of backpressure. The management of backpressure buildup in a system equipped with a catalytic converter is important. If the catalytic converter is partially or wholly clogged, it will create a significant restriction in the exhaust system, resulting in a drop in engine performance (e.g., horsepower and torque) and thus decrease fuel economy and may even cause the engine to stall.

High filtration efficiencies of wall-flow filters are obtained at the expense of a relatively high pressure drop which increases with the accumulation of soot in the filter (soot load). As the soot and ash particles start depositing within the pores in the monolith walls (depth filtration) of a clean filter, the pressure drop across the filter increases non-linearly over time.

Limitations of Current Substrates

While catalytic converter and particulate matter filter technology is integral to the reduction of emission pollution, there still remain certain drawbacks. One important limitation of catalytic converter technologies is the relatively low melting temperature of cordierite, which limits the placement of cordierite devices in an engine system and makes the devices susceptible to melting during uncontrolled regeneration events. Accordingly, an improved substrate for use in a catalytic converter or particulate filter would be significant advance in the fundamental physical and chemical attributes of the materials used as catalyst substrates in the catalytic converter.

The conventional monolithic catalytic converter substrate is generally formed from a powder-based ceramic slurry through an extrusion process. The traditional extrusion process is limited as to how small the channels may be made within the material and still maintain quality control. This, in effect, places a limit on the geometric surface area that can be achieved in cordierite honeycomb substrates. The extrusion process also limits the shapes of the catalytic converters to cylinders or parallelograms, or shapes that have sides parallel to the extrusion axis. The honeycomb configuration is formed using an extrusion process in which long channels with their major axes parallel to the extrusion action are created. The opening of these channels faces the incoming exhaust airflow.

Decreasing the wall thickness increases the surface area by allowing for more walls per unit volume. For example, by decreasing wall thickness from 0.006 inches to 0.002 inches, a 54% increase in surface area may be achieved. By increasing the surface area, more particulate matter may be deposited in the same volume. FIG. 1 shows a prior art honeycomb configuration formed within a ceramic filter element configured to increase the surface area for a catalytic converter.

However, the physical limitations of this material have been approached. Because of the physical characteristics of ceramics, and, in particular cordierite, use of cordierite substrates with even thinner walls is not practical. The thinner-walled material is not able to meet other necessary characteristics (e.g., durability, heat resistance) requisite for survival in the operating conditions experienced by catalytic converters.

Diesel filters, in part because of their larger sizes, often have thicker walls than their automotive counterparts. Because diesel wall flow filters generally have thicker walls, there are physical limitations on the number of channels per square inch these filters can have. Generally, there are no commercially available diesel wall flow filters having more than 200 channels per square inch.

Another limitation of currently available substrates is their decreased catalytic efficiency at lower temperatures. When a converter system is cold, such as at engine start up, temperatures are not sufficiently high to commence the catalyzed reactions. The cordierite, silicon carbide, and various metal substrates employed in currently available catalytic converters are fashioned from very tough, dense materials with excellent mechanical strength and tolerances for thermal shock and vibration. However, these materials require a long time to absorb heat after start-up to reach temperatures sufficient for catalytic reactions. Due to the delay in the catalysis reaction start-up, it is estimated that approximately 50% of all of the emissions from modern engines are released to the atmosphere during the first 25 seconds of engine operation. Even a small improvement during these critical "cold start" seconds could drastically reduce the amount of pollutants emitted annually. While effort has been made to address this problem, there remains a need for a catalytic converter that can reduce emissions during this critical cold start period.

To more quickly achieve reaction temperatures, attempts have been made to move the converters closer to the engine exhaust manifold where higher temperatures are more quickly available and also serve to drive reactions more vigorously during operation. Because usable space near the engine of a vehicle is limited, the size of converter systems, and therefore the amount of throughput that can be successfully treated, is likewise limited. Current substrates cannot be effectively used in the very high temperature environments of the engine compartments of vehicles. Moreover, adding additional weight to the engine compartment is undesirable, and many current substrates are dense with limited porosity (roughly 30% or less), requiring systems that are both heavy and voluminous to treat large scale exhaust output. Additionally, substrates such as cordierite are susceptible to melting under many operating conditions, thereby causing clogs and increased back pressure.

Other methods of compensating for cold starts include elaborate adsorption systems to store NOx and/or hydrocarbons temporarily so that they might be treated once the converter has reached critical temperatures. Some of these systems require parallel piping and elaborate adsorption surfaces, additional valves and control mechanisms, or multiple layers of differing washcoats for adherence of catalysts to substrates and segregation of reaction environments. This problem is especially challenging in diesel engines where large volumes of soot particulates, NOx, and SOx may need to be trapped. In some large industrial diesel engines, rotating banks of diesel particulate traps are used to collect, store, and treat particles. (In still other systems, NOx is stored and used as an oxidizing agent to convert CO into $CO_2$ while it is reduced to $N_2$).

Another inherent limitation of conventional systems is the typical "regeneration time" required to burn off particulates. Given the large volume of exhaust gas throughput and the speed at which the gas must flow, a converter should be capable of rapid light off. Thus, a substrate capable of rapid burn-off/light-off, of enduring extreme thermal and vibrational shocks, and capable of rapid internal temperature build up during cold starts, is desirable. If the substrate were also lightweight, it would also result in improved mileage statistics on new vehicles. Thus, there remains a need for an improved lightweight, tough and durable catalyst substrate with a high melting point, high porosity and permeability, thermal shock resistance, and ability to hold a catalyst. The present invention addresses this need.

BRIEF SUMMARY OF THE INVENTION

The present invention relates to a nonwoven fibrous refractory emission gas filter apparatus and a method for making the same. One object of the present invention is to provide an improved nonwoven fibrous refractory emission gas filter. Related objects and advantages of the present invention will be apparent from the following description.

BRIEF DESCRIPTION OF THE DRAWINGS

FIG. 8A is an illustration of a broaching comb used to form channels in substrates of the present invention.

FIG. 25 schematically illustrates another embodiment particulate filter system of the present invention.

DETAILED DESCRIPTION OF EMBODIMENTS OF THE INVENTION

Figure 1:
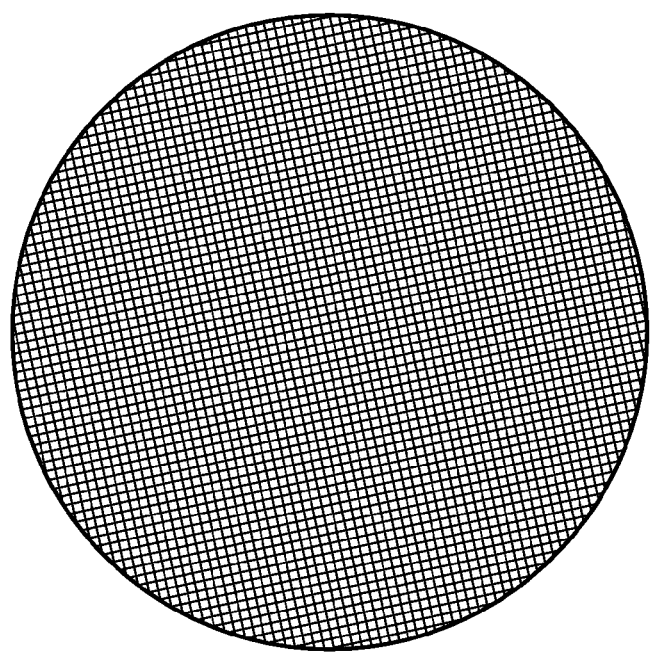
FIG. 1 is a cross-sectional view of a prior art cordierite substrate with a honeycomb structure.
Figure 2:
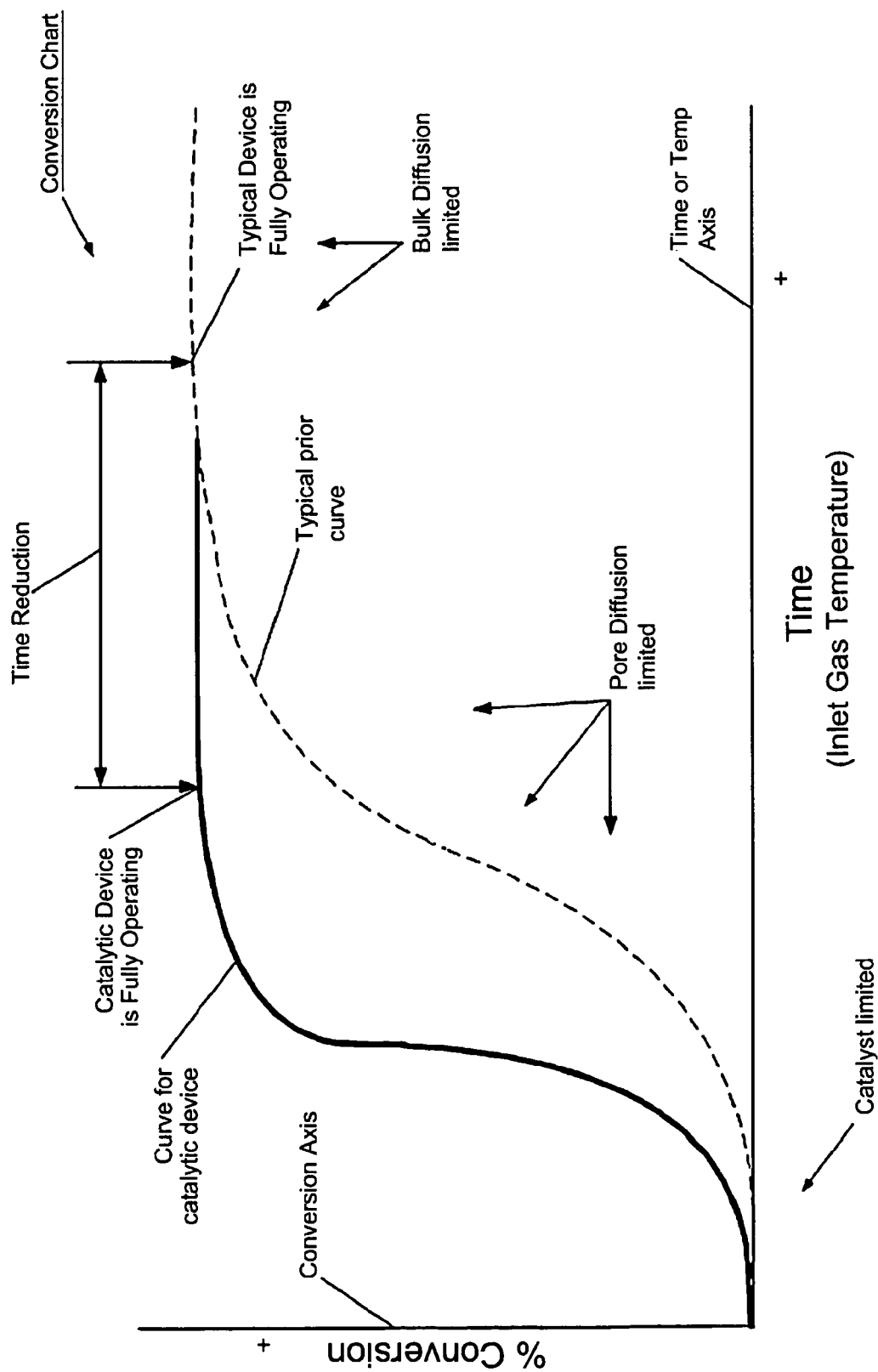
FIG. 2 is a graph of conversion or reaction rate as a function of inlet gas temperature and/or time.
Figure 3:
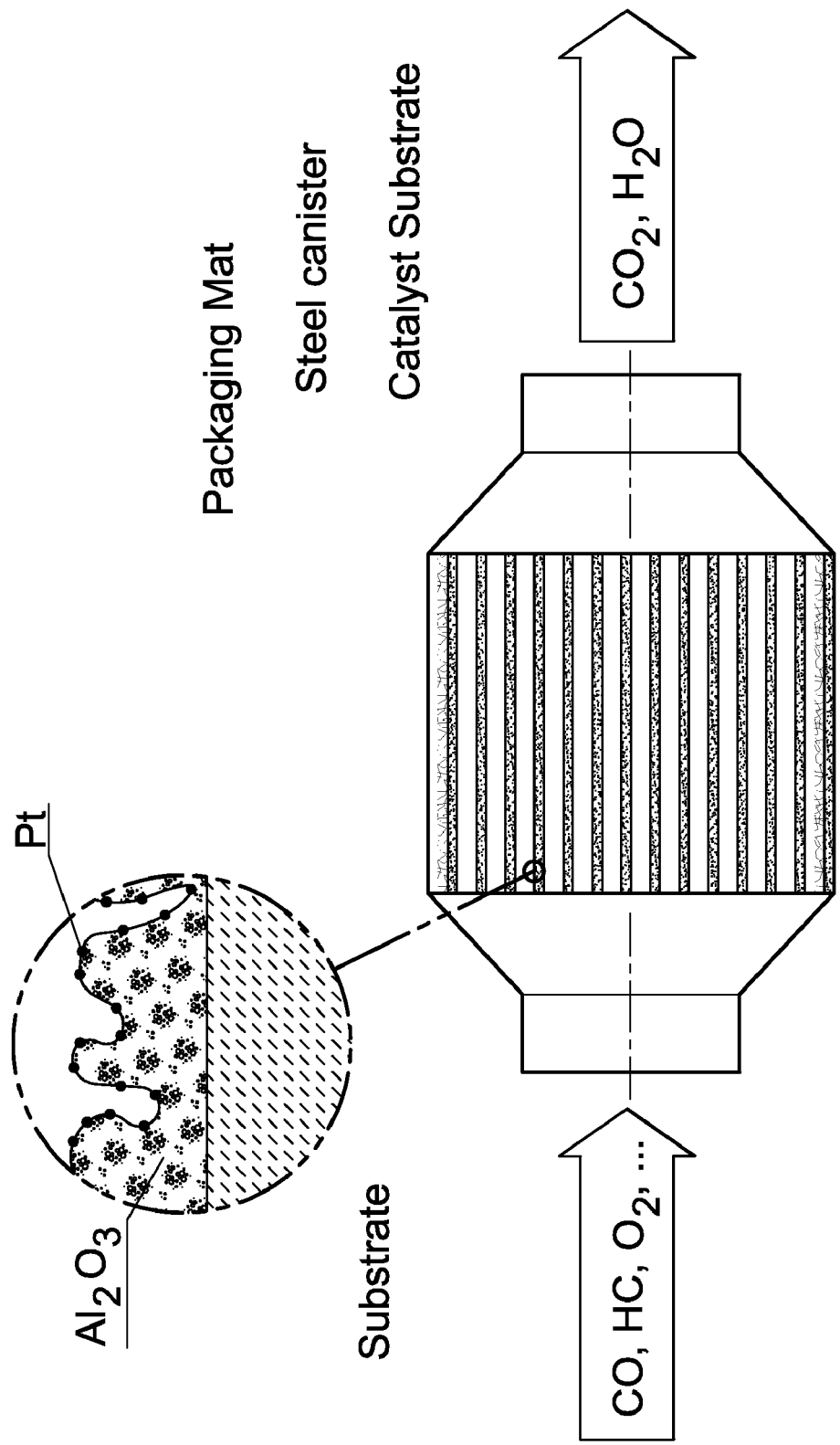
FIG. 3 is a longitudinal cross-sectional view of a prior art catalytic converter.
Figure 4:
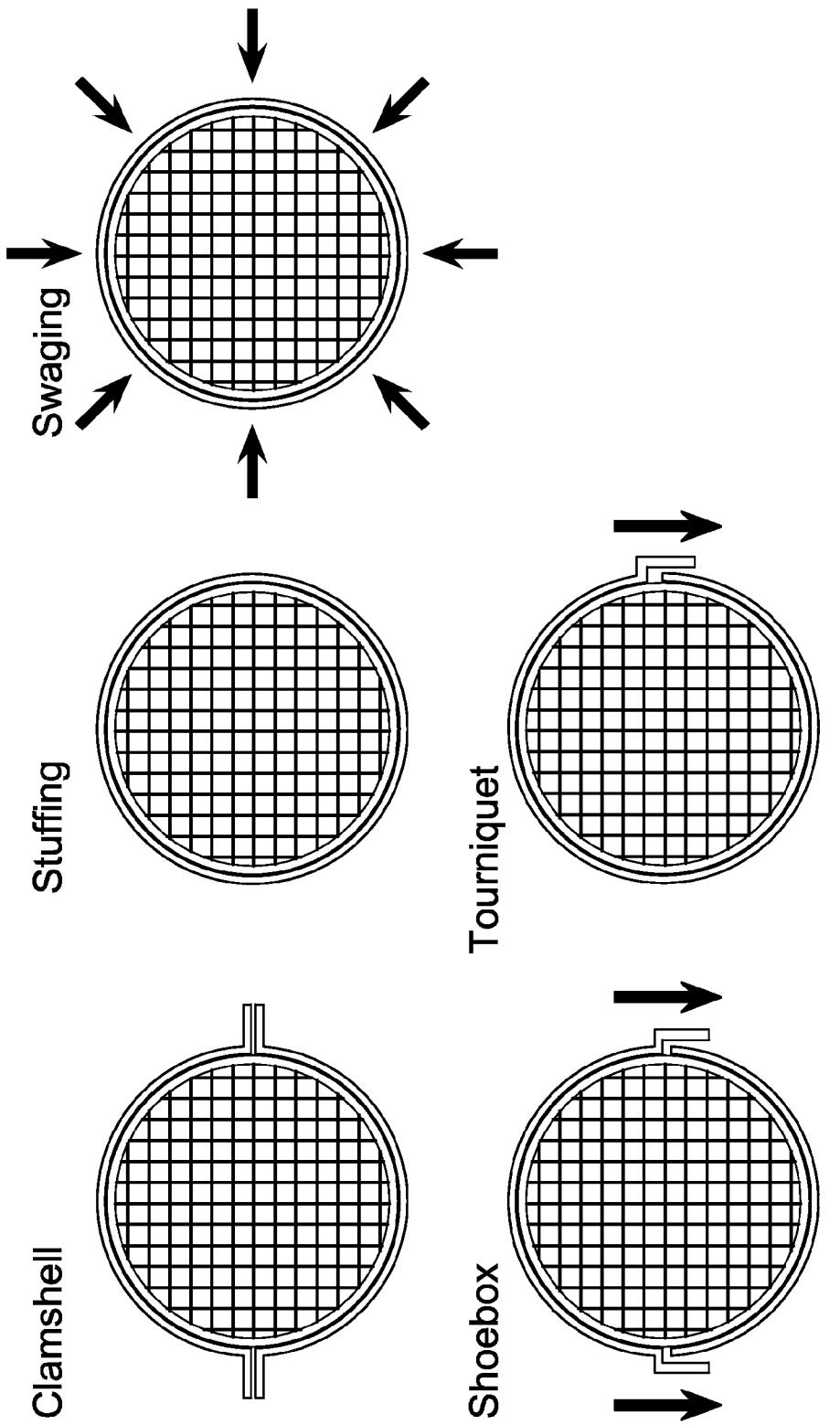
FIG. 4 schematically illustrates several prior art catalytic converter designs.

For the purposes of promoting an understanding of the principles of the invention and presenting its currently understood best mode of operation, reference will now be made to the embodiments illustrated in the drawings and specific language will be used to describe the same. It will nevertheless be understood that no limitation of the scope of the invention is thereby intended, with such alterations and further modifications in the illustrated device and such further applications of the principles of the invention as illustrated therein being contemplated as would normally occur to one skilled in the art to which the invention relates.

Overview

The present invention relates to a catalytic substrate suitable for use in a catalytic converter and/or as a particulate filter for removal of pollutants from the exhaust stream of ICEs. The catalytic/filtering substrate provides improvements in removing pollutants from an exhaust gas, including faster light-off period, increased depth filtration of PM, less back pressure, reduced clogging, increased versatility regarding placement location in the exhaust system, high probability of catalytic reaction, increased conversion of NOx, HC, and CO, faster burnoff of PM, reduction of catalyst material used, reduced weight of the after-treatment exhaust system, and/or the like.

In certain embodiments, the present invention also relates to a process of making and/or preparing the catalytic/filtering substrate, catalytic converters, particulate filters, catalytic mufflers, and exhaust systems.

Catalytic Substrate

Figure 5:
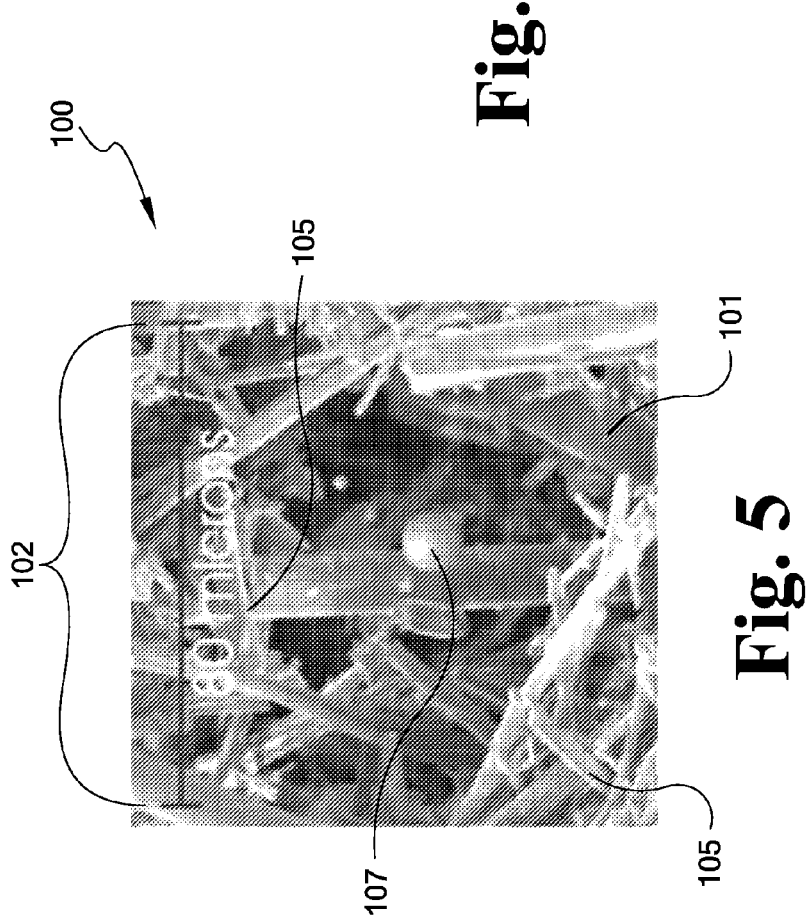
FIG. 5 is a photomicrograph of a first embodiment of a substrate of the present invention.

As illustrated in FIG. 5, one embodiment of the present invention relates to a catalytic substrate 100 consisting of a non-woven Sintered Refractory Fibrous Ceramic (nSiRF-C) monolith useful in catalytic converters, particulate filters, and related devices. Typically, the substrate 100 supports a catalyst material 148 (see FIG. 10). The nSiRF-C monolith 100 can be shaped into a variety of desired configurations.

Typically, the nSiRF-C monolith 100 is substantially rigid, defining a predetermined three-dimensional shape. The fibers 101 of the nSiRF-C monolith 100 are typically randomly oriented. More typically, the nSiRF-C material defines a substantially fibrous matrix 102, with relatively short, chopped fibers 101 tangled and interconnected and/or bonded together at their contact points 105.

The nSiRF-C substrate 100 is typically a sintered monolith, although the fibers 101 may alternately be interconnected via other means, such as by a glass phase segregated at the contact points 105. Typically, the sintered ceramic monolith is defined by a cohesive mass of interconnected and tangled fibers 101 held together by sintered bonds at the interconnections or fiber touch-points.

The sintered monolith is typically defined by tangled (nonwoven) refractory fibers 101, such as mullite fibers 101, alumina-silica fibers 101, mixtures of alumina and silica fibers 101, alumina enhanced thermal barrier ("AETB") material (made from aluminoborosilicate fibers 101, silica fibers 101, and alumina fibers 101) or the like. AETB is attractive for use in catalytic converter/filter applications as it has a high melting point, low heat conductance, and low coefficient of thermal expansion, the ability to withstand thermal and vibrational shock, low density, and very high porosity and permeability. Alternately, the catalytic substrate 100 may be made of ceramic tiles, such as alumina enhanced thermal barrier (AETB) with toughened unipiece fibrous insulation (TUFI) and/or reaction cured glass (RCG) coatings. Still alternately, the catalytic substrate 100 comprises Fibrous Refractory Ceramic Insulation (FRCI).

In one embodiment, a sintered monolith 100 is made of ceramic fibers 101, wherein the ceramic fibers 101 have a composition ranging from about 95 to about 97 weight percent alumina and about 3 to about 5 weight percent silica. Alternately, the ceramic fibers 101 could include 90%, 92% and 94% alumina with the remainder being primarily silica. Still alternately, the ceramic fiber composition may be of 99% or greater alumina content. Substrate fibers 101 may be produced by any convenient processes such as extrusion, spinning or the like. In certain embodiments, the average fiber diameter ranges from about one to about six microns, although larger and smaller diameter fibers 101 are also suitable for other embodiments. For example, the fiber diameters in some embodiments range from 1-50 microns, typically 1-25 microns, and more typically 1-10 microns.

In some embodiments, a second component of the AETB material is silica fiber 101. Silica fiber typically contains over 99.5 weight percent amorphous silica with very low impurity levels. Alternately, silica fibers 101 of lower purities, e.g., 90%, 95%, and 97%, may also be used. In certain embodiments, amorphous silica fibers 101 having relatively low density (e.g., 2.1 to 2.2 g/cm$^3$), high refractoriness (1600 degrees Celsius), low thermal conductivity (about 0.1 W/m-K), and near zero thermal expansion, may be attractive.

In some embodiments, the AETB composition includes aluminoborosilicate fibers 101 in addition to alumina and silica fibers 101. In one particular embodiment, the aluminoborosilicate fibers 101 ($3Al_2O_3.2SiO_2.B_2O_3$) are 62.5 weight percent alumina, 24.5 weight percent silica, and 13 weight percent boria. Alternate aluminoborosilicate compositions include variations of the relative amounts of the alumina, silica and boria fiber constituents. In some alternate compositions, a portion of the alumina and silica in the fibers 101 have reacted to form mullite.

Other alternate substrate materials include High Temperature Protection (HTP) and Orbital Ceramics Thermal Barrier (OCTB). Still other suitable substrate compositions include AETB-12 (having a composition of about 20 weight percent $Al_2O_3$ fibers 101, about 12 weight percent (14 weight percent $B_2O_3$.72 weight percent $Al_2O_3$.14 weight percent $SiO_2$) fibers 101 and about 68 weight percent $SiO_2$ fibers 101); AETB-8 (having a composition of about 20 weight percent $Al_2O_3$, about 12 weight percent (14 weight percent $B_2O_3$.72 weight percent $Al_2O_3$.14 weight percent $SiO_2$) fibers 101, 68 weight percent $SiO_2$ fibers 101); FRCI-12 (having a composition of about 78 weight percent silica and 22 weight percent aluminoborosilicate (62 weight percent $Al_2O_3$.24 weight percent $SiO_2$.14 weight percent $B_2O_3$)); and FRCI-20 (having a composition of about 78 weight percent silica ($SiO_2$) and about 22 weight percent aluminoborosilicate (62 weight percent $Al_2O_3$.24 weight percent $SiO_3$.14 weight percent $B_2O_3$).

Typically, the components of the refractory fibers 101 consist of fibrous silica, alumina fiber, and aluminoborosilicate fiber. In one embodiment, the fibrous silica comprises from about 50 to about 90 weight percent of the refractory fiber mix, alumina fiber comprises from about 0 to about 50 weight percent of the refractory fiber, and aluminoborosilicate fiber comprises from about 10 to about 25 weight percent of the refractory fiber mix. The fibers 101 comprising the substrate 100 may be crystalline, amorphous (glassy), or a combination of both.

Other suitable fibers 101 include aluminoborosilicate fibers 101 typically made from aluminum oxide precursors in amounts ranging from about 55 to about 75 percent by weight, silicon oxide precursors in amounts ranging from less than about 45 to greater than zero (typically, less than 44 to greater than zero) percent by weight, and boron oxide precursors in finite, non-zero amounts ranging less than about 25 (typically, from about 1 to about 5) percent by weight (calculated on a theoretical oxide basis as $Al_2O_3$, $SiO_3$, and $B_2O_3$ respectively).

Additional suitable fibers 101 include aluminosilicate fibers 101, comprising aluminum oxide in the range from about 67 to about 77 (e.g., 69, 71, 73 and 75) percent by weight and silicon oxide in the range from about 33 to about 23 (e.g., 31, 29, 27 and 25) percent by weight. In other embodiments, the fibers 101 used to prepare the substrate 100 of the present invention comprise $\alpha$-$Al_2O_3$ with $Y_2O_3$ and $ZrO_2$ additions, and/or $\alpha$-$Al_2O_3$ with $SiO_2$ added (forming $\alpha$-$Al_2O_3$/mullite).

Alternately, the substrate 100 may be substantially composed of refractory silica fibers 101 and refractory aluminumborosilicate fibers 101. Still alternately, the substrate 100 may be substantially composed of silica fibers 101, alumina fibers 101, and a binding agent, typically such as boron oxide or boron nitride.

Yet alternately, the substrate 100 may be substantially composed of a combination of consisting of aluminosilicate fibers 101 and silica fibers 101 in a weight ratio within the range of from about 19:1 to about 1:19, and about 0.5 to 30 weight percent boron oxide. Alternately, the weight ratio of aluminosilicate fibers 101 to silica fibers 101 maybe selected from 16:1, 14:1, 12:1, 10:1, 8:1, 6:1, 4:1, 2:1, 1:1, 1:2, 1:4, 1:6, 1:10, 1:12, 1:14, and 1:16. The boron oxide is present in amounts of about 5%, 10%, 15%, 20%, 25% or 30%. The boron oxide and aluminosilicate fibers 101 may be present in the form of aluminoborosilicate fibers 101. Still alternately, the catalytic substrate 100 may be substantially composed of a nSiRF-C monolith wherein the aluminosilicate fiber to silica fiber ratio ranges from 1:9 to 2:3 and the boron oxide content is about 1 to 6% of the fiber weight.

The substrate 100 maybe made from ceramic suitable combinations of $Al_2O_3$, $SiO_2$, and $B_2O$-containing fibers 101 and characterized is typically characterized by a melting point of from about 1600° C. to about 2000° C. (typically about 1800° C.), a density of from about 2 to about 4 g/cc (typically about 2.7 to about 3 g/cc ), a refractive index of about 1.5 to about 1.8, more typically selected from 1.56, 1.60, 1.61, 1.67, and 1.74; 4) a filament tensile strength (25.4 mm gauge) of from about 100 to about 35 pp Mpa (more typically from about 150 to about 200 or from about 2000 to about 3,000, such as 150, 190, 193, 2100, or 3100), a thermal expansion in the temperature range of about 100 to about 1100° C.) from about 2 to about 10 (typically from about 3 to about 9, more typically from 3, 4, 5.3, 6, and 8; 6) and a surface area of less than about 0.4 m²/g (more typically less than about 0.2 m²/g). Typically, the dielectric constant of a fiber that is suitable for use in preparing the substrate 100 has a value of from about 5 to about 9 (at 9.375 GHz). Specifically, the dielectric constant of constituent fibers 101 may be selected from the group 5.2, 5.4, 5.6, 5.7, 5.8, 6, 7, 8, and 9.

Typically, the substrate 100 is substantially "shot-free", i.e., substantially free of particulate ceramic matter from the fiber manufacture process. More typically, the nSiRF-C monolith is substantially rigid or nonflexible.

The diameters of the fibers 101 making up the substrate monolith 100 may vary.

Typically, the average fiber diameter is from about 1 to about 50 microns, typically 1 to about 20 microns. More typically, the fiber diameter may be about 6, 7, 8, 9, 10, 11, 12, 13, 14, or 15 microns. For aluminoborosilitate fibers 101, the average diameter may be from about ten to about twelve microns. Typically, the aspect ratio of the fibers 101 is typically from about 1:1 (length to diameter) to about 60:1.

The catalytic substrate 100 may include a binding agent, such as boron oxide or boron nitride. Boron nitride may be added to in addition to or instead of aluminoborosilitate fiber. In other words, a substrate fiber composition including silica and/or alumina may include boria or boron oxide or nitride may be added in sufficient concentrations to react with the alumina and/or silica fibers 101 to result in the above-mentioned compositions. For example, the substrate 100 may be formed from silica fiber 101, alumina fiber 101, and a boron binder. Of course, the substrate 100 may also include small amounts of other material such as organic binders, inorganic binders and some fibrous or non-fibrous impurities. Typically, the substrate 100 does not contain an organic binder (even if one was used during the substrate formation process, the organic components are substantially eliminated during calcining/sintering). Furthermore, inorganic binders are typically materially changed or eliminated during the fabrication process.

The substrate 100 may also include fibers 101 formed from amorphous silica and/or alumina fibers 101, typically with 2 to 12 weight percent additions of boron nitride. Typically, the refractory fibers 101 making up the substrate 100 have an average tensile strength greater than about 700 Mpa (100,000 psi), typically greater than about 1200 Mpa (200,000 psi), more typically greater than about 1800 Mpa (300,000 psi), and still more typically, greater than about 2100 Mpa (350,000 psi).

During preparation of the substrate 100 from a fibrous slurry precursor, thickeners and/or dispersants are typically added. These additives, and other minor impurities from various sources, do not substantially affect the strength, porosity, and/or other relevant properties of the resultant monolithic substrate 100.

Catalyst

Figure 10:
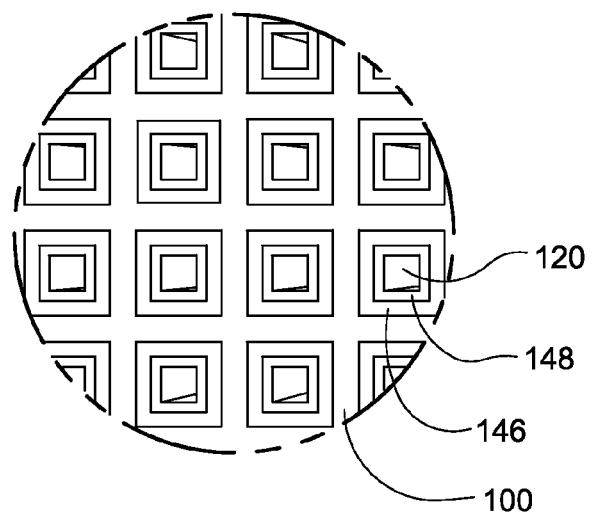
FIG. 10 is an enlarged partial sectional view of a portion of FIG. 9.
Figure 11:
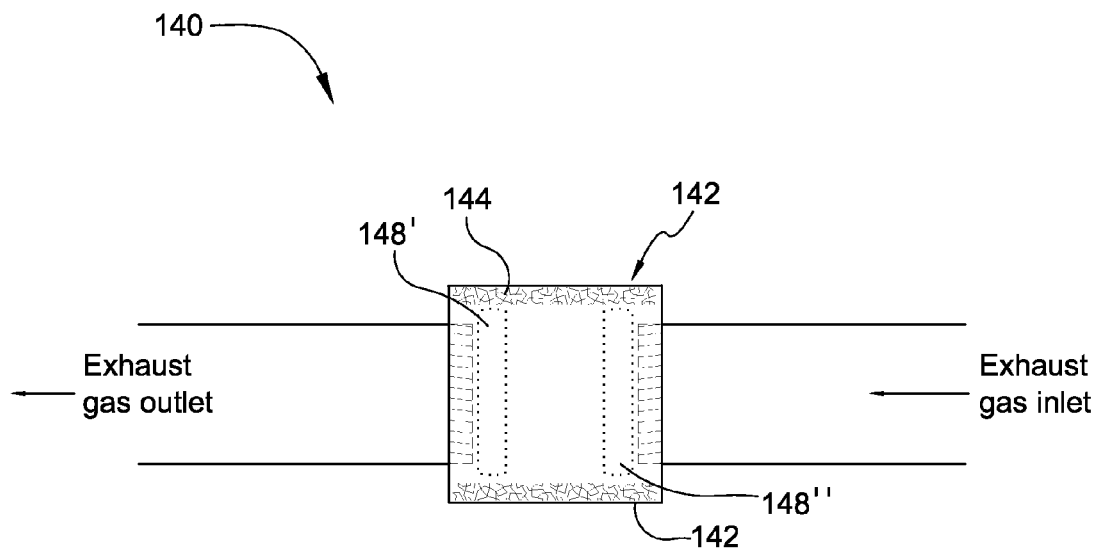
FIG. 11 illustrates a second embodiment catalytic converter/exhaust gas filter system of the present invention.

Referring to FIG. 10, typically, the substrate 100 supports a catalyst layer 148. Catalyst 148 is adhered to the pore surfaces and/or inside the core of the substrate 100, such as to the individual fiber surfaces 101. Typically, catalyst 148 is deposited only on the interior wall surfaces of the channels 120 and does not penetrate inside the channel walls (i.e., into the porosity of the substrate 100), although catalyst 148 may be deposited on the ingress channel walls, on the egress channel walls, within the walls, or the like as desired. In one embodiment, ther catalyst substantially penetrates the wall of the catalyst substrate to increase the catalyzed surface area. In one substrate configuration, a first catalyst material 148' coats a first portion of the channel 120 while a second catalyst material 148" coats a second portion of the channel 120 (see FIG. 11). Additionally, a third catalyst material 148 may be coated onto a third portion of the channel wall, and/or a portion of the substrate 100 may be intentionally left catalyst-free. For example, a catalytic substrate 100 may include an oxidation catalyst 148 in one zone which contains the front surface of the substrate 100, and a reducing catalyst 148 in another zone which contain the rear surface.

The catalyst material 148 is typically chosen from materials capable of catalyzing the desired pollutant elimination reaction (such as more complete oxidation of HCs) and that may be adhered to the substrate 100. Such catalyst materials 148 include platinum, palladium, and rhodium (either alone or as alloys or combinations) and oxides thereof, chromium, nickel, rhenium, ruthenium, silver, osmium, iridium, vanadium, gold, binary oxides of palladium and rate earth metals/oxides (such as $Sm_4PdO_7$, $Nd_4PdO_7$, $Pr_4PdO_7$ and/or $La4PdO_7$). Other suitable catalysts 148 include non-metallics, organics, base metals, precious metals, and noble metals.

Still referring to FIG. 10, the washcoat 146 may be prepared from particulate precursors as follows. The alumina powder and/or other precursor oxides are milled to a predetermined particle size/particle size distribution (PSD). The PSD of the washcoat precursor powder effects the surface area, mechanical strength of the finished washcoat 146 and its adhesion to the substrate 100, and the rheological attributes of the precursor slurry during the washcoating process.

After milling, the precursor powders are typically dispersed, such as in an acidified water in a tank with a high-shear mixer. The solid content in the slurry is typically between about 30-50%. After mixing, the washcoat precursor suspension is typically a stable colloidal suspension or slurry.

The amount of washcoat 146 deposited on the substrates 100 is a function of the rheological attributes (viscosity) of the slurry. The slurry is typically a non-Newtonian fluid that changes its viscosity with time and with the amount of mechanical energy supplied to the system (shear rate). At any steady sheer rate, the viscosity of the slurry is a function of its pH; thus, the slurry viscosity can be controlled by pH adjustment.

The washcoat slurry is typically applied to the substrates 100 any convenient process, such as by dipping, spraying, pouring or the like. Excess slurry is typically cleared from channels, such as with flowing air. The substrates 100 are typically dried and calcined to facilitate bonding the washcoat 146 to the monolith walls.

Typically, the washcoat 146 is applied in one layer; more typically, the washcoat 146 is applied in two or more layers. Each layer is typically dried and/or calcined before the application of the next layer. Typical thickness of a washcoat layer is 20-40 µm but values outside of the range may also be selected. Typically, the specific surface area of catalyst washcoat materials 146 is between 100 and 200 m²/g, although the washcoat 146 may be applied to any desired thickness and specific surface area.

Segregated washcoat technologies have been developed to physically separate noble metals by fixing them on a particular base metal oxide of the washcoat 146 before the washcoat is applied to the substrate 100. Through the use of washcoat 146 layers with different oxides and/or noble metals, the components of a catalytic system can be separated. For example, multiple washcoats 146 may be applied to a substrate 100, with platinum, palladium and rhodium respectively layered between washcoat 146 layers to prevent the formation of a palladium-rhodium alloy which might otherwise contribute to catalyst deactivation.

In certain embodiments, the washcoat may be deposited from an aqueous solution or via a sol-gel technique. This allows for the washcoat to be uniformly coated inside the walls of the catalyst substrate.

Alumina is typically used as the basic material for emission control catalyst washcoat 146 and is attractive because of the high surface area of its gamma crystalline structure (y-Al2O3). Other washcoat materials include ceria and ceria stabilized alumina, zirconia, titania, zeolites and combinations of the same. Increased thermal stability can be achieved by the use of a wide range of dopants including La, Si, Ce, and Y.

Typically, catalyst 148 is deposited on or impregnated into the washcoat 146, typically as individual crystals. More typically the catalysts 148 are impregnated onto the washcoat 146 to yield a colony of individual crystals. This can be visualized as salt crystals on a pretzel. It is advantageous to avoid completely coating the substrate 100, since precious metal catalyst 148 is expensive; typically, sufficient catalyst 148 is applied to the substrate 100 to maximize pollutant removal with a minimum amount of catalyst. The catalyst 148 may be applied to the substrate 100 fibers 101 prior to any substrate formation steps, during the slurry stage of the substrate formation process, after the substrate 100 has been fired, or even after any necessary machining steps.

If the substrate 100 is intended for a flow through application, the catalyst 148 is typically applied to the surfaces of the channels. If the substrate 100 is machined or otherwise formed into a wall flow configuration, then it is preferable for the catalyst 148 to be distributed evenly, although not necessarily continuously, throughout the substrate 100, as exhaust gases will likely travel through all of the substrate 100 rather than merely through the channels.

In one contemplated application, the substrate 100 is used with a catalyzed diesel particulate filter (CDPF). A CDPF utilizes catalyst 148 deposited directly onto the substrate 100. A CDPF can experience exhaust temperatures of during 325-420° C. for regeneration, depending on engine technology (PM emissions) and fuel quality (sulfur content). CDPF filters typically have platinum loadings of 50-75 g/ft$^3$. More typically, the substrate 100 includes a catalyst 148 coating in the amounts of about 1 to about 100, about 1 to about 50, about 1 to about 30, or about 10 to about 40 g/ft$^3$. For a combination of platinum and rhodium, the catalyst 148 is typically present in a ratio of about 5:1 and an amount of about 30 g/ft$^3$.

Filtering Substrate

One contemplated application of the NSiRF-C substrate 100 is as a component of a particulate filter 110. The NSiRF-C substrate 100 is typically fashioned into predetermined shapes, sizes, and configurations that are useful for filtering particulate matter. The NSiRF-C substrate 100 is particularly useful for filtering particulate matter under extreme temperature, pressure, and chemical environments (such as filtering a flow of exhaust gas 125 from an engine).

Typically, the catalytic substrate 100 enables the reaction of (total or specific) pollutants to nonpollutants with great efficiency. Typically, the catalytic substrate 100 enables conversion of pollutants to nonpollutants at an efficiency of greater than 50%; more typically, the conversion efficiency is greater than 60%; still more typically, the conversion efficiency is selected from the group consisting of greater than 70%, 80%, 90%, 91%, 92%, 93%, 94%, 95%, 96%, 97%, 98%, 99%, and 99.9%.

Surface Area

One characteristic of the substrate 100 relevant to its facility for filtration and/or catalyzation is its available surface area. Typically, such a substrate 100 has a relatively high geometric surface area (GSA) available for reactions to take place upon. The high GSA is the total surface area that catalyst 148 materials can be adhered to and relates to maximum reaction probability. A large open frontal area (OFA) allows for substantial amount of gas to pass through without obstruction or an increase in back-pressure. Open frontal area (OFA) is defined as the part of the total substrate cross-section area which is available for the flow of gas (i.e., the cross-section area of the filter inlet channels). It is typically expressed relative to the total substrate cross-section.

Surface area may be thought of as the sum amount of surface that exhaust emissions must pass across when traveling through an exhaust filter. Increased surface area translates into an increased opportunity for chemical reactions to take place between pollutants via catalytic and thermal processes, making a catalytic converter process quicker and more efficient and less prone to clogging.

An NSiRF-C substrate 100 has a much higher geometric surface area than a conventional substrate, such as monolithic cordierite and SiC. Likewise, gross wall volume is calculated as the sum of each wall surface area multiplied by its respective thickness.

Typically, the gross wall volume of the catalytic substrate 100 is from about 0.5 to about 0.1, more typically from about 0.4 to about 0.2, and still more typically from about 0.3 in$^3$/in$^3$ (cubic inches per cubic inch). In one configuration the gross wall volume is typically about 0.25 to about 0.28, more typically about 0.27, more typically about 0.272 in$^3$/in$^3$. A lower gross wall volume means less catalyst 148, such as palladium, is required to enable the catalyzed reaction than with a prior art (i.e., cordierite) catalytic filter 110/140 of a similar size.

Porosity and Permeability

The pore structure of the substrate 100 influences the substrate's mechanical and thermal characteristics. Generally, porosity is inversely proportional to mechanical strength. In other words, substrates 100 of the same material and having smaller pore size and/or lower porosity tend to be stronger than those of higher porosity and/or larger pore size. Thermal characteristics, such as specific heat capacity and thermal conductivity tend to decrease with increasing porosity.

Figure 9:
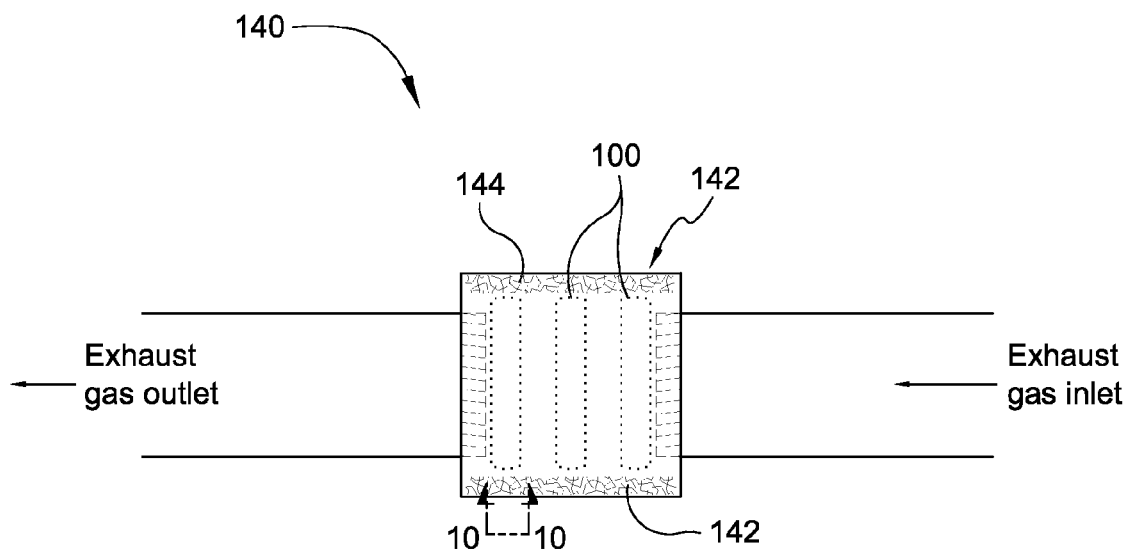
FIG. 9 schematically illustrates a first embodiment catalytic converter/exhaust gas filter system of the present invention.

In known wall-flow monolith filter systems, filtration efficiency may be increased by decreasing the channel size (typically to within the range of about 10-15 μm). Non-catalyzed filters, such as those used in fuel additive regenerated systems, have a focus on high soot holding capacity and thus have a porosity between about 40-45% with pore sizes between about 10-20 μm. Catalyzed filters 140 (as shown in FIGS. 9 and 10) generally require more porosity and/or larger pore size to enable coating by catalyst 148 systems (which may include a washcoat material). These substrates 100 should have acceptably low pressure loss after being coated with catalyst/washcoat systems 148/146 at about 50 g/dm$^3$ loading, and thus the substrates have a slightly higher porosity of about 45-55%. Filter/NOx adsorber devices, such as the DPNR system or CRT (continuous regeneration trap) incorporate NOx storage/reduction systems and require high washcoat loadings, sometimes exceeding 100 g/dm$^3$.

The NSiRF-C substrate 100 is characterized by its high porosity, typically upward from about 60%, 70%, 80%, or 90%, depending upon substrate composition. Typically, the substrate 100 may have a porosity of about 91%, 92%, 93%, 94%, 95%, 96%, 97%, 98%, or 99%. One aluminosilicate substrate composition is characterized by a porosity of approximately 97.26%. In contrast, cordierite monoliths have a porosity of between about 18-42%. Put into perspective, the NSiRF-C substrate 100 includes only about 2.74% solid material to obstruct the flow of exhaust gas. This fine web of substrate material 101 efficiently traps particulate matter for burns off. Due to the trapping of particulates in depth and not only along channel walls, considerable PM surface buildup does not readily occur. Substrate properties such as volume percent porosity, size distribution, structure, and interconnectivity influence the substrate's 100 ability to trap and eliminate PM. Additionally, if gas molecules can diffuse into a porous substrate 100, the probability of a catalytic reaction increases dramatically. Together with the cellular geometry, porosity characteristics also influence the monolith's hydraulic resistance to flow and its specific pressure drop. Some attributes which are desired for high filtration efficiency (e.g., low porosity and small pore size) are opposite to those required for low pressure drop. Others, such as good pore interconnectivity and absence of closed, "dead end" pores, are desired for both low pressure drop and high efficiency. The NSiRF-C substrate 100 provides both high filtration efficiency and low pressure drop. Thus, high substrate porosity generally results in more effective interaction between pollutants and the catalyzed (or non-catalyzed) substrate surface. At the same time, gas flow buildup can be released laterally as well as along the intended gas flow direction. Due to its high porosity, the nSiRF-C substrate 100 is more efficient at NOx reduction, hydrocarbon and CO oxidation, and particulate matter trapping.

Referring to FIG. 5, an nSiRF-C substrate 100 is shown. Substrate 100 is approximately ninety-seven percent porous. In contrast, conventional cordierite and silicon carbide substrates are substantially less porous/denser. Particulate matter (PM) impurities can much more readily penetrate into the porous, fibrous substrate 100 then they can the conventional cordierite or silicon carbide substrates, as the density of the substrate 100 is substantially less than the conventional substrates.

Emissivity and Heat Conductance

Emissivity is the tendency of an object to radiate or emit heat, and thus substrate emissivity is relevant to its utility as a catalytic filter material, especially at high temperatures. A good substrate design takes into consideration an operating temperature that (1) relates to the fastest ramp-up to high conversion efficiency; (2) is safest from thermal harm (e.g., due to thermal shock or due to high-temperature melting/cracking of substrate 100 ); (3) uses a minimal amount of auxiliary energy; and (4) is inexpensive to produce. Increasing operating temperature requires additional energy and expense.

High emissivity allows the catalyst substrate 100 to minimize heat transfer out of the system, thereby enabling more rapid heating of the gas inside the catalytic converter or particulate filter. Typically, the substrate 100 is characterized by an emissivity of between about 0.5 to 1.0. More typically, emissivity of the substrate 100 is between about 0.3 and 0.7. In some embodiments, the emissivity may be about 0.8, 0.82, 0.84, 0.86, 0.88, or about 0.9. Still more typically, substrate emissivity is selected from the set including 0.81, 0.83, 0.85, 0.87, 0.89, 0.90, 0.92, 0.94, 0.96, or 0.98. Reflectivity of heat allows the gaseous material in the pores to heat up much faster since little heat is retained and conducted away by the nSiRF-C substrate material itself, thus resulting in quicker lightoff and little temperature rise of the outside of the substrate 100. The thermal conductivity of the substrate 100 is the quantity of heat that passes in unit time through unit area when its opposing faces are subject to unit temperature gradient (e.g., one degree temperature difference across a thickness of one unit); the substrate 100 typically has a low thermal conductivity, typically less than about 0.1, 0.2, 0.3, 0.4, 0.5, 0.6, 0.7, 0.8, or 0.9. More typically, the thermal conductivity of the substrate 100 is less than about 0.01, 0.02, 0.03, 0.04, 0.05, 0.06, 0.07, 0.08, or 0.09. Still more typically, the thermal conductivity of the substrate 100 is from about 0.1 to about 0.01, from about 0.2 to about 0.02, from about 0.3 to about 0.03, from about 0.4 to about 0.04, from about 0.5 to about 0.05, from about 0.6 to about 0.06, from about 0.7 to about 0.07, from about 0.8 to about 0.08, or from about 0.9 to about 0.09. In one specific AETB substrate formulation, the thermal conductivity of the substrate 100 is approximately 0.0604 W/m-K. In contrast, cordierite has a thermal conductivity of between about 1.3 to 1.8 W/m-K. Dopants may be used that allow fine tuning of the thermal properties of the substrate 100 (such as emissivity enhancing agents and the like).

It is also desirable for the substrate material to withstand a high range of temperatures so that it does not melt during normal use or even during uncontrolled regeneration. Additionally, if the substrate material can withstand high temperatures, it can be used in applications positioned closer to the engine. Related physical properties include low thermal mass and heat capacity. A material that has a low thermal mass and heat capacity allows for less heat energy to be wasted in raising the temperature of the catalyst substrate 100. If the catalyst substrate 100 heats up quickly, more of the heat energy coming via the exhaust gas is used to trigger the light-off of the pollutant components. The thermal characteristics of the catalyst filter (such as thermal conductivity, resistance to thermal shock, melting point, and the like) can be adjusted by the ceramic composition of the non-woven refractory composite matrix.

Specific heat relates to the energy required to raise the temperature of a unit amount of a substance (typically one gram) a unit amount of temperature (typically one degree Celsius). A substrate 100 with a high specific heat will reflect ambient heat, e.g. from an exhaust or an auxiliary source, back into the pore space where combustion or catalytic reduction and oxidation processes require the heat. For instance, under extreme conditions, e.g., the Arctic, it will take longer to heat up a low specific heat filter and cool hot filters, increasing the chance for external heat damage. A lower specific heat substrate 100 is thus desirable because it reaches operating temperature faster and with less energy.

Typically, the nSiRF-C substrate 100 has a relatively high melting point. For some compositions, the melting point is greater than about 900° C. More typically, the melting point is greater than about 1000° C. Still more typically, the melting point is greater than about 1200° C. Yet more typically, the melting point of the substrate 100 is between about 2000° F. to about 4000° F. Still more typically, the melting point of the substrate 100 is between about 3000° F. to about 4000° F. Still more typically, the melting point of the substrate 100 is from about 3000° F. to about 3100° F., from about 3100° F. to about 3200° F., from about 3200° F. to about ° F. 3300, from about 3300° F. to about 3400° F., from about 3400° F. to about 3500° F., from about 3500° F. to about 3600° F., from about 3600° F. to about 3700° F., from about 3700° F. to about 3800° F., from about 3800° F. to about 3900° F., and from about 3900° F. to about 4000° F. For one specific high alumina-silica fiber substrate composition (polycrystalline mullite), the melting point is approximately 1800 degrees Celsius.

The specific heat of one AETB nSiRF-C substrate composition is approximately 640 J/kg-K. For cordierite, the specific heat is about 750 J/kg-K. Although the cordierite has a greater specific heat, cordierite filters have a substantially greater mass to heat up, resulting in more energy required to reach operating temperature and rendering the cordierite substrate less energy efficient.

A multiple use temperature limit is the maximum temperature to which a substance can be repeatedly cycled without substantial degradation. The higher the temperature at which a substrate 100 can continue to operate without micro-fractures or spallation, the lower the likelihood of the substrate 100 breaking or cracking over time. Thus, a higher multiple use temperature limit is preferred. A typical multiple use temperature limit for the substrate 100 is selected from the group including about 2000° C., 2100° C., 2200° C., 2300° C., 2400° C., 2500° C., 2600° C., 2700° C., 2800° C., 2900° C., 3000° C., and 3100° C. One specific substrate composition has a multiple use temperature limit of 2,980 degrees Celsius, in contrast to that of about 1,400 degrees Celsius for cordierite.

The coefficient of thermal expansion (CTE) for a typical AETB substrate 100 is approximately $2.65 \times 10^{-6}$ W/°C. Cordierite has a CTE of about $2.5 \times 10^{-6}$ W/°C.

In one embodiment, a catalytic or filtering substrate 100 of the present invention, compared to certain prior art substrates such as cordierite, has an increased resistance to damage by thermal or mechanical stress, a lower risk of clogging with soot and/or ash, is more tolerant to additive ash accumulation when used with fuel additive regeneration, and has good efficiency for particle number reduction.

Density

For catalytic converters or diesel particulate filter applications 140/110, the substrate 100 should have a relatively low density to reduce the weight of device, and hence reduce the weight added to the vehicle. Additionally, a low density is complimentary to the desired properties of high porosity and permeability, and less dense substrates require less energy to achieve operating temperatures, thus reducing the amount of time to come up to operating temperature, such as for catalytic light off. The density of some materials currently used as substrates or filters are relatively high, such as about 2.0 to 2.1 g/cm³ for cordierite. The density of the NSiRF-C substrate 100 is relatively low, typically in the range from about 0.03 to 0.80 g/cm³. In a preferred embodiment, the density of the substrate 100 is in the range of about 0.08 to about 0.50 g/cm³, and, more typically, from about 0.13 to 0.25 g/cm³. Other preferred embodiments include catalytic substrate 100 that has a density of about 0.05, 0.10, 0.15, 0.20, 0.30, 0.35, 0,40, or 0.45 g/cm³. A substrate 100 characterized by a relatively low density and relatively high strength and toughness is desired.

One AETB substrate composition relates to a substrate 100 with a density of typically between about 0.13 g/cm³ to about 0.35 g/cm³, more typically from about 0.20 to about 0.25 g/cm³. Alternately, substrates 100 made substantially from AETB-8 and AETB-16 fibers 101 have densities of about 0.13 g/cm³ and about 0.25 g/cm³, respectively.

Physical Properties

High-strength substrates 100 are desirable for robust catalytic converter systems 140 and particulate filters 110. The strength of the substrate material may be influenced by the type of intra- and intercrystalline bonding, the porosity, pore size distribution, and flaw population. Additionally, substrates 100 can be strengthened by the application of chemical/material coatings. The strength of the substrate 100 is also influenced by its dimensions, cross-sectional symmetry, and microstructure, such as pore density, grain size, grain size distribution, channel geometry, and wall thickness. Substrate strength ideally should exceed the anticipated stress to which the material will be exposed during both packaging and operation to avoid degradation.

Tensile strength is indicative of the strength and toughness of a material. Substrates 100 having high tensile strengths should be able to withstand the force generated by violent, exhaust gas flow and pressure. The NSiRF-C substrate 100 typically has a relatively high tensile strength, such as about 2.21 MPa (axially). Other typical substrate tensile strengths include about 1, 2, 3, 4, 5, 6, 7, 8, 9 and about 10 MPa.

Filter Device Parameters: Reduction of Pollutants

Catalytic filters 110/140 typically reduce CO emissions from an exhaust gas stream by at least about 50%. More typically, the catalytic filter 110/140 reduces CO emission from an exhaust gas by at least about 60%, 70%, 80%, or 90%. Still more typically, the catalytic filter 140/110 reduces CO emission by at least 91%, 92%, 93%, 94%, 95%, 96%, 97%, 98%, 99%, 99.5%, 99.9%, or 100 %. Depending upon the catalyst choice and combinations, catalytic filters 140/110 may additionally reduce NOx, HC, VOC, PM-10 and/or PM-2.5 emission from an exhaust gas stream by at least about 50%, respectively. Further, the catalytic filter(s) 140/110 may reduce NOx, HC, VOC, PM-10 and/or PM-2.5 emission from an exhaust gas by at least about 60%, 70%, 80%, or 90%, respectively. Still further, the catalytic filter 140/110 reduces NOx, HC, VOC, PM-10 and/or PM-2.5 emission by at least 91%, 92%, 93%, 94%, 95%, 96%, 97%, 98%, 99%, 99.5%, 99.9%, or 100%, respectively. The concentration of the particualte matter (PM) may be measured gravimetrically or in number density.

Acoustical Attributes

Typically, a filter 110 operates to acoustically attenuate, or dampen acoustic energy, in an engine exhaust. The substrate 100 in the filter 110 may compliment, or partially or even completely replace, an engine's muffler assembly, thus simultaneously decreasing exhaust noise and exhaust system costs. Likewise, the porosity, density and size of the substrate 100 may be varied to 'fine tune' the acoustical attenuation for desired applications.

Flow-Through

The substrate 100 may be used as part of a flow-through filter 110. Channels (and/or pores) in the substrate 100 are aligned more or less parallel to each other substantially across the length of the substrate 100. Generally, flowing gas enters the substrate 100 at one end follows the channels through the substrate 100 to exit at the other side. In one configuration, the substrate 100 includes a plurality of substantially parallel channels that extend fully through the length of the substrate 100. In another configuration, the walls of the channels are not parallel to the lateral or surface of the substrate 100.

Wall-Flow

Alternately, the substrate 100 (either catalytic or filtering) may be used in a wall-flow filter 110 configuration. The wall flow filter substrate 100 may include a catalyst 148, a washcoat, an oxygen-storing oxide, and/or an emissivity enhancer. Typically, the substrate 100 may be characterized by a channel wall thickness from about 2 mils to about 6 mils. Alternately, the channel wall thickness may range from about 10 mils to about 17 mils. Still alternately, the channel wall thickness may be selected from the following values: 2, 3, 4, 5, 6, 7, 8, 9, 10, 11, 12, 13, 14, 15, 16,17, 18, 19, and 20 mils. Yet alternately, the substrate may be made about 30 mils thick (a currently popular substrate thickness) to replace existing substrates with a lighter and more efficient material.

Typically, the cell density of a wall-flow substrate 100 is about 400 cpsi (cells per square inch) with a wall thickness of about 6 mils; more typically, the cell density is about 900 cpsi with a channel wall thickness of about 2 mils. Alternately the cell density may be selected from the following set of values: about 50, 100, 150, 200, 250, 300, or 350 cpsi.

Ceramic wall-flow monoliths, which are derived from the flow-through cellular supports used for catalytic converters, are common diesel filter substrates, due to their high surface area per unit volume and high filtration efficiencies. Monolithic diesel filters typically consist of many small parallel channels, typically of square cross-section, running axially through the part. Diesel filter monoliths are made from the flow-through monoliths by selectively plugging channels. Adjacent channels are alternatively plugged at each end in order to force the diesel aerosol through the porous substrate walls which act as a mechanical filter. To reflect this flow pattern, the substrates 100 are referred to as the wall-flow monoliths. Wall-flow monoliths are most commonly available in cylindrical shapes, although oval cross-section parts are also possible for space constrained applications.

Wall-flow filter walls have a distribution of fine pores; thus porosity control is an important manufacturing parameter. The filtration mechanism operating in monolith wall-flow filters is a combination of cake and depth filtration. Depth filtration is the dominant mechanism on a clean filter as the particulates are deposited in the inside of pores. As the soot load increases, a particulate layer develops at the inlet channel walls and cake filtration becomes the prevailing mechanism. Certain conventional monolith filters have filtration efficiencies of about 70% of total particulate matter (TPM). High efficiencies can be observed for solid PM fractions, such as elemental carbon and metal ash.

When used in a wall flow filter design, the substrate 100 is typically sufficiently porous such that gas may pass easily therethrough. The gas passing through the pores interacts with catalysts 148 present on the pore walls/fiber surfaces and pollutant-eliminating reactions are thus catalyzed. Additionally, the highly porous walls allow for depth filtration of PM. Thus, all of the exhaust gasses from the engine are filtered through the substrates 100 in a wall flow filter applications 140 and exposed to the catalysts 148 thereon for pollutant reduction/elimination. Pore characteristics (size, percent porosity, pore connectivity, open vs closed pores, etc.) thus influence the physical interaction between gas and filter/catalyst material 148 and contribute to filtration efficiency and pressure drop. The durability of the substrate 100 depends on both physical strength and toughness as well as upon resistance to chemical attack by exhaust gas components.

Typical considerations in designing the exact geometry of a wall-flow monolith 100 include cell density, repeat distance (even distribution of pressure drop over the entire wall flow filter), wall thickness, open frontal area, specific filtration area, and mechanical integrity factor.

Typically, half of the channels blocked at one end and the other half are blocked at the opposite end to force escaping exhaust gas to diffuse through the porous walls. Typically, a channel blocking wall is located at the beginning or end of a channel. Alternately, the blocking wall is located at the middle of a channel, or alternatively is located anywhere between the beginning and end of a channel. Further, any percentage of the channels may be blocked in a wall flow configuration, e.g., 10%, 25%, 50%, 75%, 90%, 95%, etc.

Channels and Channel Openings

Alternately, the catalytic or filtering substrate 100 may be made without channels extending completely, or even partially, therethrough. Typically, the catalytic or filtering substrate 100 has sufficient porosity and permeability that channels are not requisite for the substrate 100 to function as a gas filter. Potential back pressure is obviated by the inherent porosity/permeability. However, if the substrate 100 is sufficiently thin, such as a membrane, insertion into a high gas flow-rate environment might result in physical damage to the substrate 100, resulting in its failure.

Figure 8B:
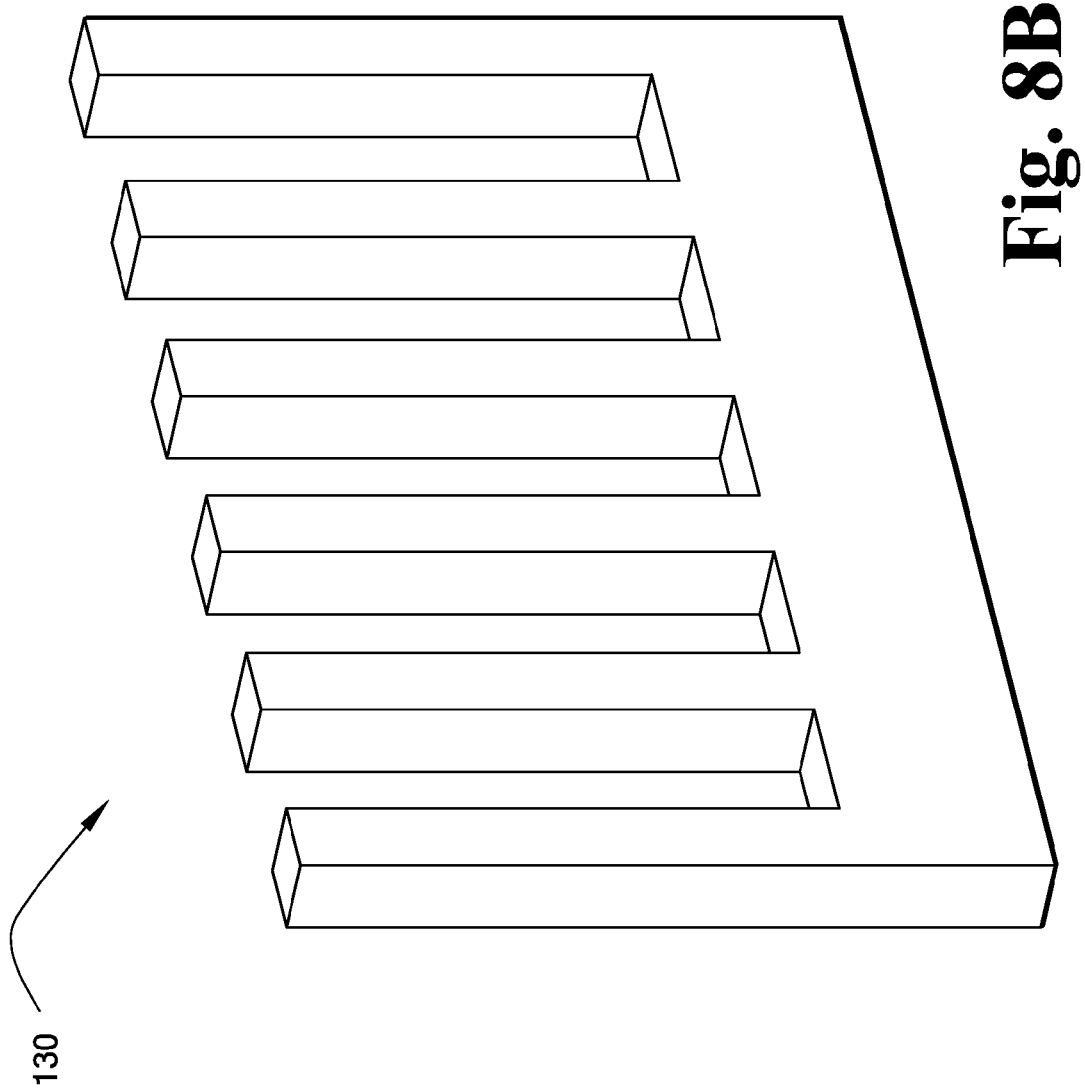
FIG. 8B shows enlarged perspective views of the comb of FIG. 8A.

Typically, the substrate 100 is formed with a plurality of channels 120 extending longitudinally through at least a portion of thereof (see FIG. 8A). The channels 120 allow a fluid medium to flow into the substrate 100. Typically, the channels 120 extend from the front surface towards the rear surface, although other channels 120 may extend from the rear surface to the front surface. Optionally, the channels 120 may extend through the entire length of the substrate 100. Typically, however, a given channel 120 extends only partially through the substrate 100. Channels 120 may extend through about 99%, 97%, 95%, 90%, 85%, 80%, 70%, 60%, 50% or less of the substrate 100.

The channel holes or openings can take any convenient shape. Typically, the openings take a circular, triangular, square, or hexagonal shape. More typically, the channels 120 are formed such that the thickness of the substrate material between adjacent channels 120 is substantially uniform throughout the substrate 100. Variation in wall thickness may be from about 1% to about 50%. More typically, the channels are arranged so that the walls of adjacent channels 120 are parallel to each other. The diameter or cross-sectional distance of the channels 120 vary with intended application. Typically, channels 120 have a diameter or cross-sectional distance of about 0.5 cm to about 100 nm. More typically, channels 120 have diameters of about 100 nanometers. Other suitable values include a distance or diameter selected from about 1, 2, 3, 4, 5, 6, 7, 8, 9, 10, 11, 12, 13, 14, 15, 16, 17, 18, 19 and 20 mils. Typical ranges include from about 1 to about 500 mils, from about 1 to about 100 mils, and from about 1 to about 10 mils.

A channel 120 may vary in size along its length. For example, the channel 120 may be about 0.10 cm. across at its opening but then gradually decrease in size approaching either the end wall or point of the channel 120 or the opening at the end of the channel 120. In one embodiment, the channel 120 has a square cross-sectional shape with a cross-section of about 0.03 cm. The channel 120 extends through the length of the substrate 100 and has a second square opening on the rear surface with a cross-section of about 0.01 cm.

Alternately, the channel cross-sectional distance can be about 5 cm, 4 cm, 3 cm, 2 cm, or 1 cm. Substrates 100 having channels of larger diameter or cross-sectional distance are preferred for larger exhaust systems which may have exhaust pipes of one or more feet in diameter. The thickness of the channel wall may vary as well. For example, the channel wall may be less than 1 mil thick. Other suitable values for the channel wall thickness include 1, 2, 3, 4, 5, 6, 7, 8, 9 and 10 mils.

Membrane Configuration

The substrate 100 may be made sufficiently thin to effectively be a membrane. A longer travel length for exhaust through a substrate 100 corresponds to a build up of backpressure in certain conventional catalytic converters and particulate filters; by using membrane substrates 100, backpressure problems may be minimized and the exhaust gas may move through the filter system with less effort. This reduction in backpressure results in the associated engine running more efficiently with better fuel mileage and more available power.

Typically, a thin layer substrate 100 is about five centimeters in diameter and about 0.16 cm. thick, and characterized by about 400 times the surface area of a conventional cordierite filter measuring 10 cm. in diameter with a 15 cm. length.

This allows for a reduction in size of the canister and a reduction in weight of the system. Alternatively, the substrate 100 can be housed in the exhaust manifold. If the substrate 100 is thin enough to be thought of as a membrane (i.e., with a diameter to width ratios of about 20:1, 19:1, 18:1, 17:1, 16:1, 15:1, 14:1, 13:1, 12:1, 11:1, 10:1, 9:1, 8:1, 7:1, 6:1, or 5:1), even less weight and size is required. Moreover, a number of catalytic or filtering membranes 100 (having the same or different catalyst compositions and functions) can be stacked together. For example, a plurality of catalytic or filtering substrates 100 having a cylinder (or disc) shape with a diameter of about 2.5 cm and a thickness of length of about 0.5 cm may be stacked together to form a substrate pile about 2.5 cm thick. Of course, membranes 100 do not support a number of channels 120 running therethrough; due to the short gas travel distance, the high porosity of the membrane, and the low associated pressure drop, it is possible to form a substrate pile comprising a plurality of catalytic substrate membranes 100.

Zonation of Substrate

The catalytic substrate 100 may feature different zones with different attributes. In other words, one or more physical characteristics or attributes of the catalytic substrate 100 are not uniform, or the same, throughout the entire of the substrate 100. For example, different zones or regions of the substrate 100 may have different densities, different catalyst compositions, different channel configurations, different porosities, different permeabilities, different thermal attributes, and/or the like. For example, a catalytic substrate 100 may include a substantially fibrous alumnosilicate monolith defining a least a first and a second zone, with a first catalyst 148' applied to the first zone and a second catalyst 148" applied to the second zone (see FIG. 11). Likewise, a substrate 100 may have different degrees of structural integrity through the body of the substrate 100, such as from non-homogenous densification, a coating added to the surface of the substrate 100 to increase hardness, or the like.

The filter substrate 100 may include a washcoat 146 for supporting a catalyst 148 and/or for inherently providing catalytic activity. The washcoat composition may be silica, titania, unimpregnated zirconia, zirconia impregnated with a rare earth metal oxide, ceria, co-formed rare earth metal oxide-zirconia, and combinations thereof.

Oxygen-Storing Oxide

The filter substrate 100 may include an oxygen-storing material, typically an oxide. The oxygen-storing oxide (for example, $CeO_2$) has an oxygen storing capacity ("OSC"), allowing it to occlude gaseous oxygen and then release the occluded oxygen. For example, $CeO_2$ is added to allow control of the oxygen concentration of the gaseous atmosphere, so that excess oxygen in the gaseous atmosphere is occluded into the crystalline structure of $CeO_2$ in an oxygen-rich or fuel-lean environment for assisting the catalytic converter in reducing Nox to N2, and releasing the occluded oxygen into the gaseous atmosphere in CO— and/or HC-rich or fuel-rich environments for assisting the catalytic converter in oxidizing CO and HC to $CO_2$ and $H_2O$. Thus, the catalytic activity of the catalytic substrate 100 is enhanced by the addition of $CeO_2$. Other oxygen-storing oxides include $Pr_6O_{11}$ and the like.

SOx oxidation

In the presence of certain metals, especially platinum, sulfur present in the fuel is converted to SOx which can then take part in the generation of harmful airborne sulfuric compounds, such as sulfuric acid. Most sulfates are typically formed over platinum at relatively high exhaust temperatures of about 350-450 degrees C. A catalytic substrate 100 may address these problems by, for example, having an improved thermal profile and thereby reducing thermal breakdown of the catalyst 148.

Catalyst degradation occurs when substances present in exhaust gases chemically react with the catalyst 148 or cause fouling of the catalytic surface. Such substances may be derived from lube oil components or from the fuels themselves. Interactions between different catalyst species or between catalyst species and carrier components are another temperature-induced mode of catalyst degradation, such as reactions between rhodium and $CeO_2$. The filter substrate 100 addresses this issue by using alternative carriers and washcoats to separate the reacting components. In addition to zonally separating reactive chemicals, the filter 110 may be formed as stacked membrane with incompatible components in separate membrane substrate 100s.

The catalytic/filtering substrate 100 may further include a protective coating to prevent degradation of the catalyst 148 and/or to provide other benefits, such as enhancing the emissivity of the filter 110 (especially at high temperatures), providing structural reinforcement, and/or providing thermal and/or mechanical shock resistance.

Specific Embodiments

In one embodiment, the nSiRF-C substrate 100 comprises a nSiRF-C monolith having a porosity of between about 96% and about 99%; a density of between about 10 and about 14 lb/ft3, a plurality of channels having a wall-flow configuration, and, optionally, a catalyst 148.

In one embodiment, the nSiRF-C substrate 100 of the invention comprises an nSiRF-C monolith comprising aluminoborosilitate fibers 101, silica fibers 101, and alumina fibers 101 having a porosity of about 96% to about 99%, a density of about 0.16 to about 0.26 $gm/cm^3$, a plurality of channels extending partially through the monolith (wall-flow), and, optionally, a catalyst 148 coating applied to the walls of the pores. In other embodiments, the substrate 100 further comprises a washcoat 146.

The nSiRF-C substrate 100 may typically have a tensile strength of from about 100 to about 150 psi (more typically from about 130 to about 140 psi), thermal conductivity of about 0.5 to about 0.9 (more typically about 0.7 to about 0.8, still more typically about 0.770 BTU/(hr ft° F.)), a coefficient of thermal expansion of about 1 to about 5×10−6 (in the range of from about 25° C. to about 500° C.); and an average density of from about 0.24 to about 0.27, more typically about 0.24 to about 0.25. Alternately, the substrate 100 typically has a tensile strength of about 50 to 70 (more typically about 60 to about 65 and still more typically about 63 psi, thermal conductivity of between about 0.5 to about 0.9 (more typically about 0.7 to about 0.8, still more typically about 0.770 BTU/hr ft° F.)), a coefficient of thermal expansion of about 1 to about 5×10−6 (in the range of from about 25° C. to about 500° C.), and an average density of from about 7 to 9 (more typically about 8.2 to about 8.6 and still more typically about 8.40/lb/ft3). Still alternately, the substrate 100 typically has tensile strength of about 60 to about 80 more typically about 70 to about 79 and still more typically about 74 psi), a thermal conductivity of between about 0.5 to about 0.9 (more typically between about 0.7 to 0.8 and still more typically about 0.765 BTU/hr ft° F.)), a coefficient of thermal expansion of between about 1 to about 5×10−6 (more typically between about 1 to about 3×10−6 and still more typically about 1.84×10−6 (in the range of from about 25° C. to about 500° C.), and an average density of from about 9 to about 11 (more typically between about 9.5 to about 10.5 and still more typically about 10 lb/ft3.

Yet alternately, the nSiRF-C substrate 100 typically includes a carrier pre-doped with copper oxide (CuO), at least one precious metal catalyst 148 at least partially coating pores and selected from the group consisting of Pt, Pd, Rh, and Re, at least another catalyst 148 at least partially coating the pores and selected from the group consisting of $Sb_2O_3$, $Bi_2O_3$, $SnO_2$, and mixtures thereof, wherein the at least one metal oxide is doped on the surface of the pre-doped carrier.

Methods of Catalyzing a Reaction and Filtering

Another aspect of the present invention is directed to a method of filtering or otherwise removing pollutants from an exhaust gas stream 125, and more typically to catalyzing a pollutant elimination reaction by providing a fibrous, porous refractory monolithic substrate 100 and directing a flow of a exhaust fluid 125 over and/or through the substrate 100, more typically at a temperature sufficient to catalyze the reaction(s). Typically, the catalyzed reaction converts pollutants to non-pollutants. For example, the catalytic substrate 100 may lower the threshold temperature of the conversion of carbon monoxide and oxygen to carbon dioxide.

The catalysis method is performed using a nonwoven fibrous refractory monolithic substrate 100 as described in detail above. Typically, the substrate 100 supports an at least partial coating of catalyst materials, more typically adhered onto pore walls and/or fibers 101. Alternately, the substrate 100 may merely support filtration of PM from the exhaust gas. More typically, the method involves trapping particulate matter and later oxidizing the same to yield carbon dioxide gas and water vapor.

Once the filter entraps PM, it is then substantially completely combusted through heating in the presence of oxygen. Combustion of PM may be accomplished by utilizing the existing temperature of the exiting exhaust and/or by providing an auxiliary source of heat. A shorter residence time of particulates in the substrate pores translates into less opportunity for pore-clogging build up that can decrease gas flow therethrough and increase backpressure.

Process of Preparing a Catalytic or Filtering Substrate

In another aspect, the present invention is directed to a process of preparing any one of the substrates 100 (catalytic or filtering) as described hereinabove, such as for use in a diesel particulate filter 110. One method of preparing such a substrate 100 includes machining a billet of nSiRF-C is machined into a suitable shape, form, and size. A brick of nSiRF-C material is machined into a desired shape (such as by cutting or sawing and then sanding, turning or otherwise machining into the final desired shape); this step is typically done while the brick is in the green state, although it may be performed after the brick is fired. Machining operations may include turning, sawing, drilling, sanding, or any other convenient method of machining. More typically, the billet is cast into a shape and size approximating the desired final shape and size, such that any additional machining operations amount to little more than finishing.

Figure 6:
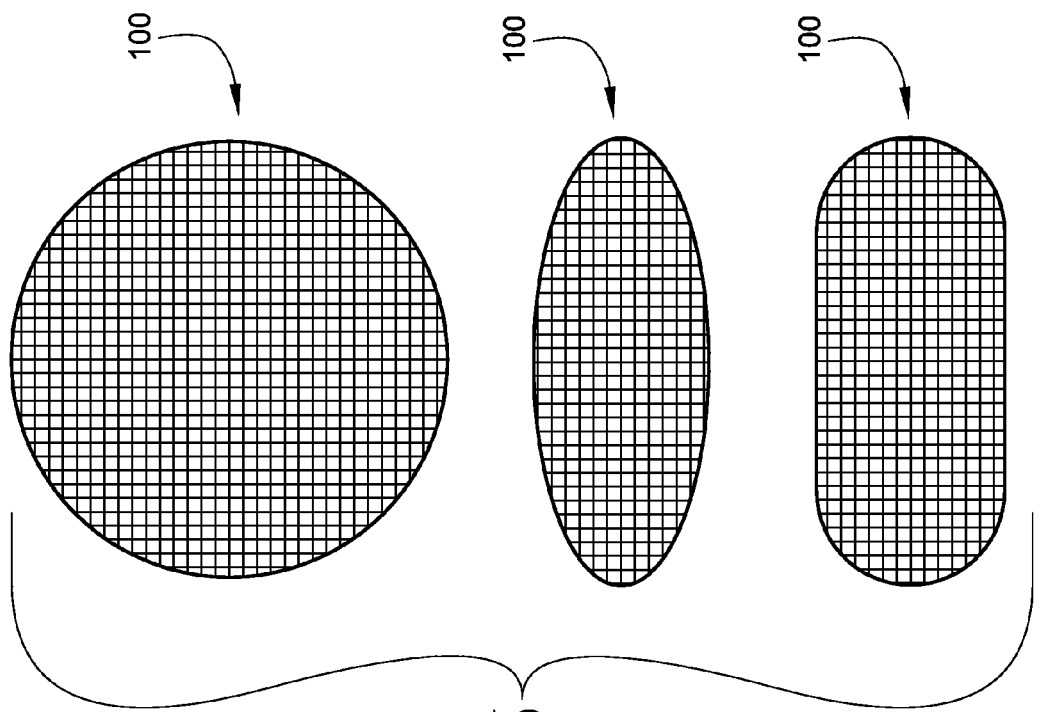
FIG. 6 illustrates several optional cross-sectional shapes of the substrate of FIG. 5.

Typically, the sectional shape of the substrate 100 is circular, oval, or racetrack (see FIG. 6). Three-dimensionally, the substrates 100 may be in the form of a cylinder or a substantially flat disc. The billet (or substrate 100) may be prepared via any convenient process. For example, a billet may be prepared by heating a plurality of refractory silica fibers 101, refractory alumina fibers 101, and refractory aluminoborosilicate fibers 101, mixing the fibers 101, washing the fibers 101, chopping the fibers 101 to one or more predetermined lengths, blending or mixing the chopped fibers 101, adding sufficient water to the mixed fibers 101 to form a slurry, adjusting the viscosity of the slurry (such as by adding thickening agent), adding a dispersant, pouring the slurry to a mold, removing water from the slurry to form a green billet, removing the green billet from the mold, drying the green billet (typically drying at a temperature of between about 85° C. and about 120° C.), and controlledly firing the green billet (typically to about 1100-1500° C.).

Channels may be formed in the substrate 100. The channels 120 are typically formed via broaching, although such channels 120 may also be formed in situ, such as by injection molding. A washcoat 146 may be added to the substrate 100, sufficient to coat the channels or even the pores. A catalyst 148 may be adhered to the substrate 100, more typically onto the washcoat 146. The substrate 100 may alternately include an oxidation or reduction catalyst 148 pre-applied to the fibers 101 during the formation process.

If the slurry is too thin, a thickening agent may be added. Typically, the thickening agent and dispersant used in the slurry-making process are substantially removed from the substrate 100 during a subsequent heating operations. For example, the thickening agent and dispersant may be combusted during the sintering process.

In one embodiment, the catalytic or filtering substrate 100 of the present invention comprises an nSiRF-C, and a coating made from a mixture of silicon dioxide powder in an amount of from 23.0 to 44.0 weight percent or colloidal silicon dioxide in an amount from 25.0 to 45.0 weight percent, water (or ethanol) in an amount from 19.0 to 39.0 weight percent, boron nitride or boron oxide in an amount from about 3 to about 6 weight percent, and one or more emittance agents (such as silicon tetraboride, silicon hexaboride, silicon carbide, molybdenum disilicide, tungsten disilicide and zirconium diboride), wherein the protective coating has a solids content of from 45 to 55 weight percent.

A partial list of substrate fiber compositions includes: about 20% $Al_2O_3$ fiber, about 12% (14% $B_2O_3$, 72% $Al_2O_3$, 14% $SiO_2$) fiber and about 68% $SiO_2$ fiber; about 20% $Al_2O_3$ fiber, about 12% (14% $B_2O_3$, 72% $Al_2O_3$, 14% $SiO_2$) fiber and about 68% $SiO_2$ fiber; about 78% silica fiber and about 22% aluminoborosilicate (62% $Al_2O_3$, 24% $SiO_2$, 14% $B_2O_3$) fiber; and about 78% silica and about 22% aluminoborosilicate (62% $Al_2O_3$, 24% $SiO_2$, 14% $B_2O_3$) fiber (all compositions are given in weight percent).

In some substrate compositions, the precursor fibers 101 include $\alpha$-$Al_2O_3$ with $Y_2O_3$ and $ZrO_2$ additions and/or $\alpha$-$Al_2O_3$ with $SiO_2$ added (forming $\alpha$-$Al_2O_3$/mullite).

In one composition, the fibrous component of the substrate 100 is a mixture of 64% amorphous silica, 21% alumina, and 15% aluminoborosilitate fiber, with trace amounts, e.g., 0.3 to 1.0 mg/m², of a surface active agent employed to aid in the dispersion of bulk fiber in the slurry prior to and during casting. Likewise, alumina-silica-zirconia fibers 101 may be added to the inorganic fiber mix as a fourth component or replacement component for other fibers 101.

Typically, the fibers 101 are then chopped to size. Suitable lengths of the fibers 101 include, but are not limited to, about 0.1, 0.2, 0.3, 0.4, 0.5, or 0.6 inches. Other suitable lengths include ⅛", ¼" and ½". Typically, the fibers 101 are chopped relatively uniform in size. In another embodiment, the fibers 101 that compose the catalytic substrate 100 or the filtering substrate 100 are an average ¼ inch in length and about one to 12 microns in diameter, alternatively, one to six, or 10 to 12 microns with a median fiber diameter of three microns. In one embodiment, PM is not added as it may clog pore space.

Drying the Green Billet (Sintering)

Once formed, the green billet is typically heat dried, although the green billet may be allowed to dry at ambient temperatures for extended periods of time. Typically, the temperature is incrementally increased over one or more hours, typically several hours, until the desired temperature is reached. Typically, the sintering vessel is pre-warned and incrementally heated to approximately 1100-1500° C., although other sintering time-temperature profiles may be exploited.

Typically, the billet is dried by holding or soaking the billet at about 100 degrees Celsius for about four hours and then slowly increasing the temperature to about 1100 to about 1500 degrees Celsius over about a five hour period. After achieving and Maintaining the maximum desired temperature, the billet is cooled to result in a rigid inorganic fiber billet. The temperatures, length of time to soak and/or cure, the cooling temperature, the cooling period, and the heating rate may all be varied to control the properties of the resultant body.

Sintering supplies the necessary energy to bond the fibers 101 at the fiber-to-fiber contact points, thereby strengthening and hardening the substrate 100. Increasing the number of contacts increases strength, density and tortuosity. In general, the more tortuous a pore network becomes, the lower its permeability. Secondary chemicals such as thickening and dispersant agents are typically substantially combusted away during the firing process. Alternately, multiple firing steps may be performed, such as to increase hardness of the substrate 100.

The variables in the drying and sintering processes can be adjusted to influence the physical properties of the green body (and the resultant fired body), including its density, strength, porosity, permeability, thermal stability, melting point, and the like. The curing process can incorporate a plurality of curing steps and/or can vary in the heating/cooling times and rates. The billet may also be rapidly cooled to quench or temper the billet (in the case of predominantly metallic fibers 101).

Physical Modification

The substrate 100 has a relatively high calculated gross surface area; for one composition, the gross surface area is about 33 cm.$^2$/cm.$^3$. Thus, the substrate 100 has a relatively high (compared to a cordierite monolith, for example) reactive surface area per unit volume available for supporting catalyst materials. Further, the gross surface area calculation does not include the density, porosity, and permeability factors introduced by materials variables; thus, the difference in catalyst uptake potential is likely even greater.

Mechanical Drilling

Once an embodiment of a substrate 100 is cut from the billet and machined, it can be inserted into a drilling holder for drilling. A plurality of channels can be drilled into the substrate 100 in the direction substantially parallel to the major axis of the cylinder and the flow of exhaust emission. The smaller the channel diameter, the more channels can fit into the substrate 100.

In one embodiment, computer number control ("CNC") drilling is used. However, CNC drilling is slow and thus is not very economical. Nonetheless, CNC drilling is precise and accurate. CNC drilling forms channels by making multiple passes with the drill bit, drilling a little further into the substrate 100 on each pass and removing fibrous material each time the bit comes out. Typically, the drill bit is tungsten carbide (both hard and tough); alternately, the bit may be any convenient material. Typically, the drill bit penetrates at a feed rate of about three meters per minute. The slow feed rate helps prevent the drill bit from overheating and melting. Also, due to the tremendous pore space, the drill bit has a tendency to "walk" or move around; the slower penetration rate addresses this problem. Also, it is desirable to rotate the drill bit as slowly as possible, such as around approximately 200 revolutions per minute. Alternately, wet or water cutting may be used for forming channels. Water cutting uses a fine spray of very high pressure water to cut holes in the substrate 100. However, it is difficult to control the water jet to leave a blind hole (i.e., a channel that does not go through the substrate 100 completely). Still alternately, a gas jet, laser, comb with a plurality of tines, or the like could be used to drill the channels in the substrate 100.

Broaching

In another embodiment, the channels are formed or shaped using a comb process. The comb is typically a metal device with a plurality of tines that can be forced into e.g., broaching) the substrate 100. The combs used for broaching comprise a plurality of tines. Tine length, width, thickness, and shape may be varied according to the desired properties, configurations, and dimensions of the channels. In general, the comb process comprises repeatedly forcing the comb into the substrate material a plurality of times until most or all of the channel 120 is shaped ("pecking"). The comb is typically removed from the channel 120 after each peck so that excess substrate material may be cleared from the channel 120.

Figure 7:
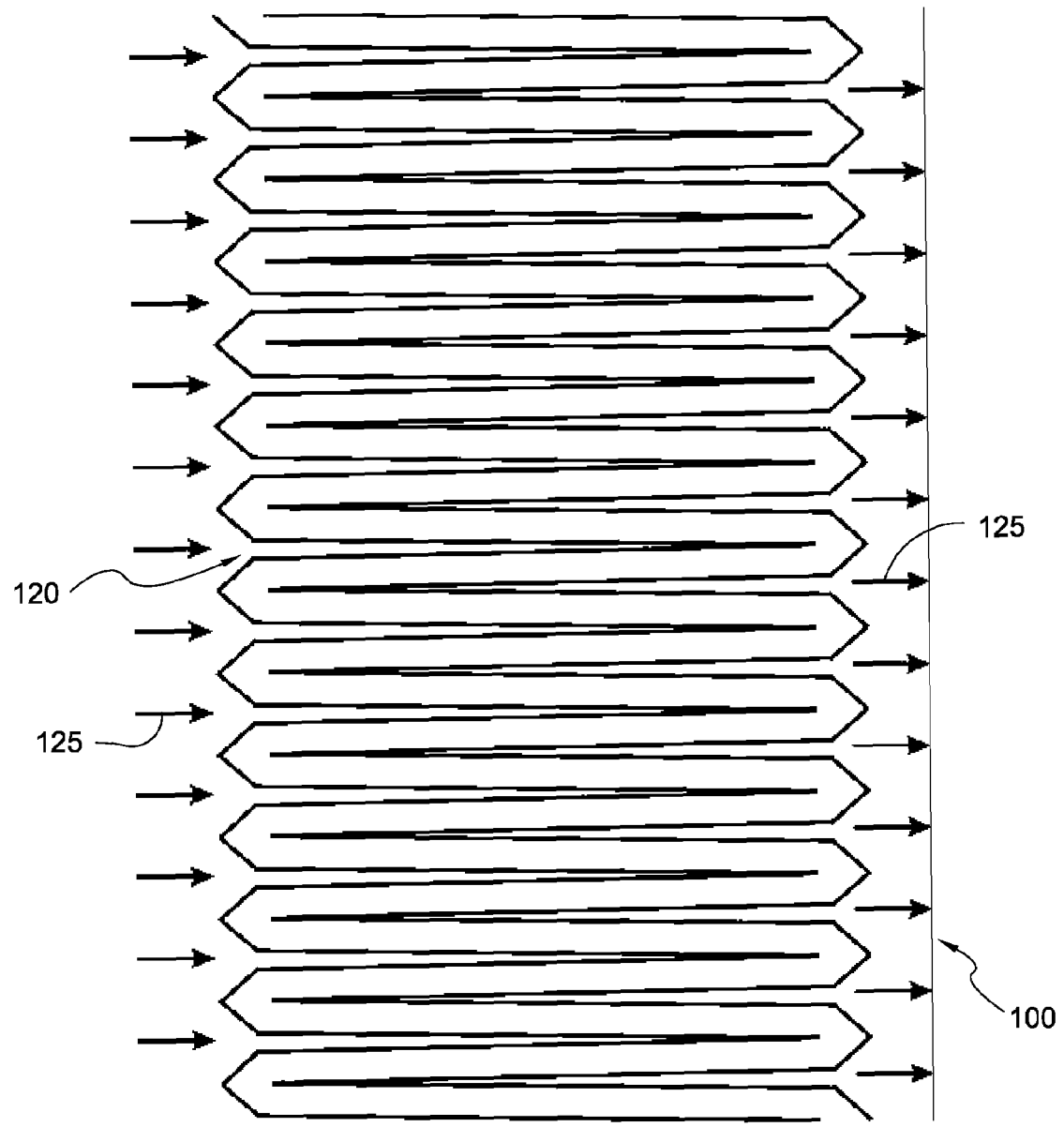
FIG. 7 schematically illustrates a plurality of channels formed in the substrate of FIG. 5.

The shape of the tines dictates the shape of the channels 120. For example, a rectangular-shaped tine on the comb is used to create rectangular-shaped channels with a rectangular-shaped channel opening. A wedge-shaped tine on the comb is used to create wedge-shaped channels. Utilizing a wedge-shaped tine produces channels 120 wherein the walls are parallel with a square-shaped opening. As shown in FIG. 7, a substrate 100 incorporates parallel wedge-shaped "blind" channels 120, i.e., channels 120 with no exit hole. The blind channels 120 force gases 125 to pass through the pore structure of the channels 120 prior to exit. A four-sided pyramid-shaped tine on the comb 130 is used to create a typically pyramidal-shaped channel 120 (see FIGS. 8A and 8B). The walls are typically parallel and opening is typically substantially square-shaped. However, the wall thickness at the channel opening is minimal as the channels 120 meet at a point, rather than being adjoined by a wall with a flat front. This results in a decrease in frontal surface area, and thus a decrease in backpressure. With four-sided pyramid-shaped tines, shims are not needed to separate the combs.

Molding Holes

As mentioned above, the substrate 100 may alternately be molded with channels 120 preformed in the billet, such as by molding the billet around channel formers such as needles or rods. The channel formers have a suitable size and shape to form a desired channel when the green billet is formed around them. Once the green billet or the final billet is formed, the rods are removed to leave the channels 120. The channels 120 may be further machined as described above. Alternatively, the rods may be made of a material that can evaporate or disintegrate upon exposure to predetermined chemical or physical conditions, such as radiation, heat, acid, or the like.

Applications

Various embodiments and applications of the invention are discussed below. These example applications are discussed for illustrative purposes only and are not limiting of the scope of the invention. Any of the embodiments of the catalytic substrate 100 and filtering substrate 100 described above can be used in the various applications.

Catalytic Converter

A catalytic converter incorporating a substrate 100 is illustrated as FIG. 9. The catalytic converter 140 includes a catalyst-coated substrate 100 positioned in a canister housing 142 with matting 144 packed between the substrate 100 and the canister 142. The substrate 100 typically includes a washcoat 146 to assist in adhering the catalyst 148 thereto. The catalytic converter 140 is typically positioned in the exhaust stream of an engine, and more typically is positioned adjacent the exhaust manifold. The substrate 100 is typically a nonwoven fibrous refractory monolith as described above.

In one specific configuration, the 140 includes a fibrous mullite monolithic substrate 100, an aluminum oxide washcoat 146, and at least one catalyst 148 adhered to the washcoat 146. Typically, the catalyst 148 includes a noble metal, more typically platinum and/or palladium. Typically, the catalytic substrate 100 has a porosity of between about 60 and about 95%, more typically about 97%. Typically, the cell density is between about 100 and about 600 cpsi with a wall thickness of about 6-30 mils.

In another specific configuration, the converter 140 has a wall-flow configuration. The converter 140 is capable of catalyzing both oxidation and reduction of pollutants, e.g., it has a catalyst 148' capable of oxidizing pollutants and it has a catalyst 148" capable of reducing pollutants (see FIG. 11). In this embodiment, the converter 140 includes two substrate units 100, each having a porosity of between about 70 and about 99%, more typically about 97%, and a cell density of about 600 cpsi with a wall thickness of about 6-30 mils. The catalyst composition is a 5:1 Pt/Pd mixture.

Figure 12:
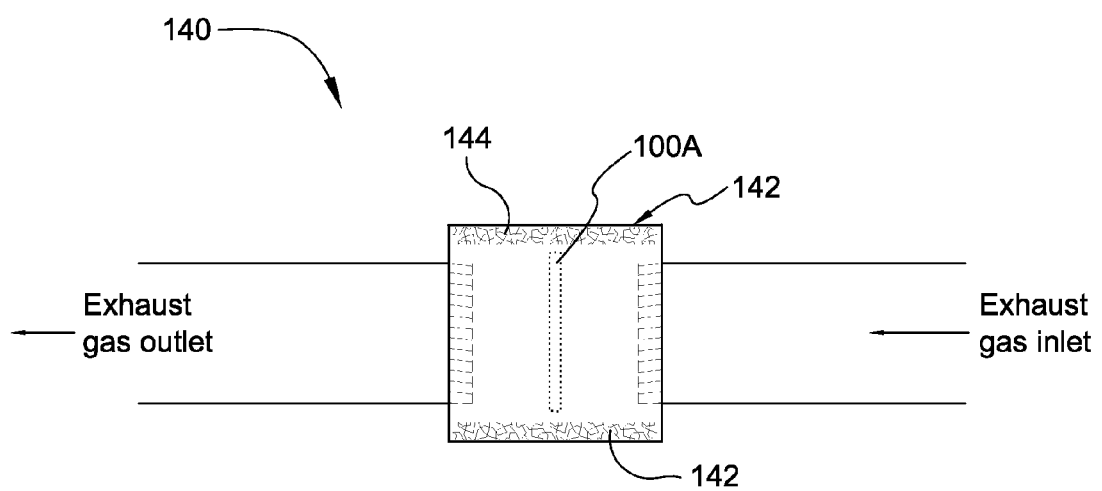
FIG. 12 illustrates a third embodiment catalytic converter/exhaust gas filter system of the present invention.

In still another configuration (see FIG. 12), the converter 140 incorporates a membrane-type substrate 100A having a catalyst coating 148. The membrane 100A is relatively thin, but otherwise functions as described above.

In yet another configuration (see FIG. 13) the converter 140 includes an nSiRF-C monolith 100 supporting at least one (typically noble metal) catalyst 148 for positioning partially or totally within the head of an engine. The catalytic substrate 100 typically has a density of about 0.2 gm/cm$^3$, has a porosity of about 97%, has a cell density of about 600 cpsi, and a wall thickness of about 0.15 mm. The substrate 100 typically has wall-flow configuration, characterized by substantially pyramidal channels 120 terminating in substantially square openings. The substrate 100 typically supports two catalyst materials 148 or oxidizing and reducing pollutants, respectively (see FIG. 7).

Figure 13:
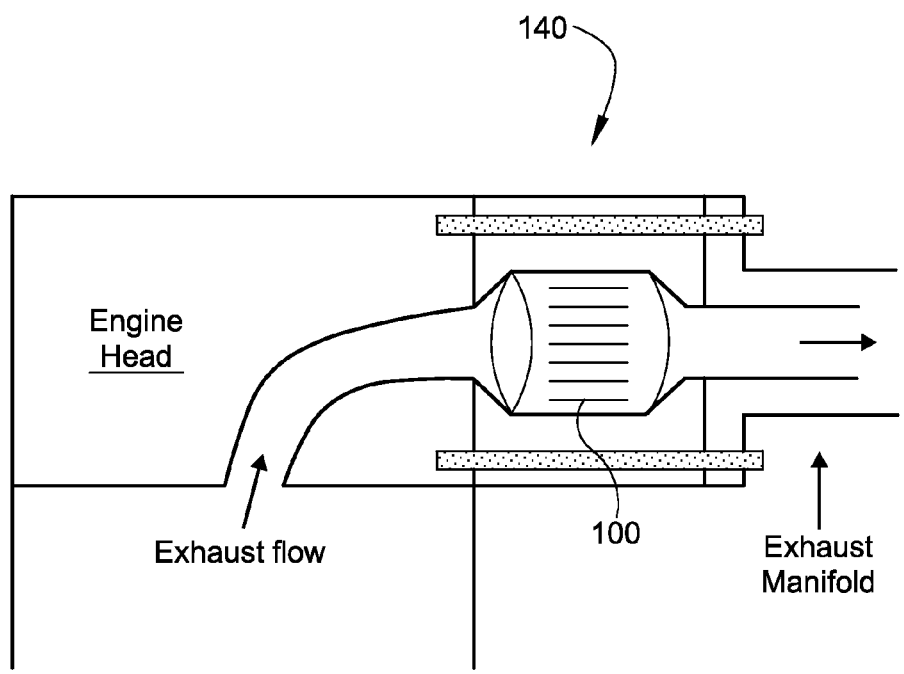
FIG. 13 schematically illustrates a first embodiment automotive exhaust system of the present invention.

In operation, a catalytic converter 140 could be placed in the exhaust stream between the head and the exhaust manifold as shown in FIG. 13. Typically, the catalytic converter section 140 is placed between the engine head and the exhaust manifold, more typically very close to the combustion chamber to increase pollutant removal efficiency. Alternately, a second catalytic converter 140 could be located downstream of the first catalytic converter. Generally, the second converter is placed near the muffler location, although other locations are possible. Alternately, the second converter 140 is integrated into a muffler or even replaces the muffler.

Particulate Filter (DPF, DPT)

Figure 14:
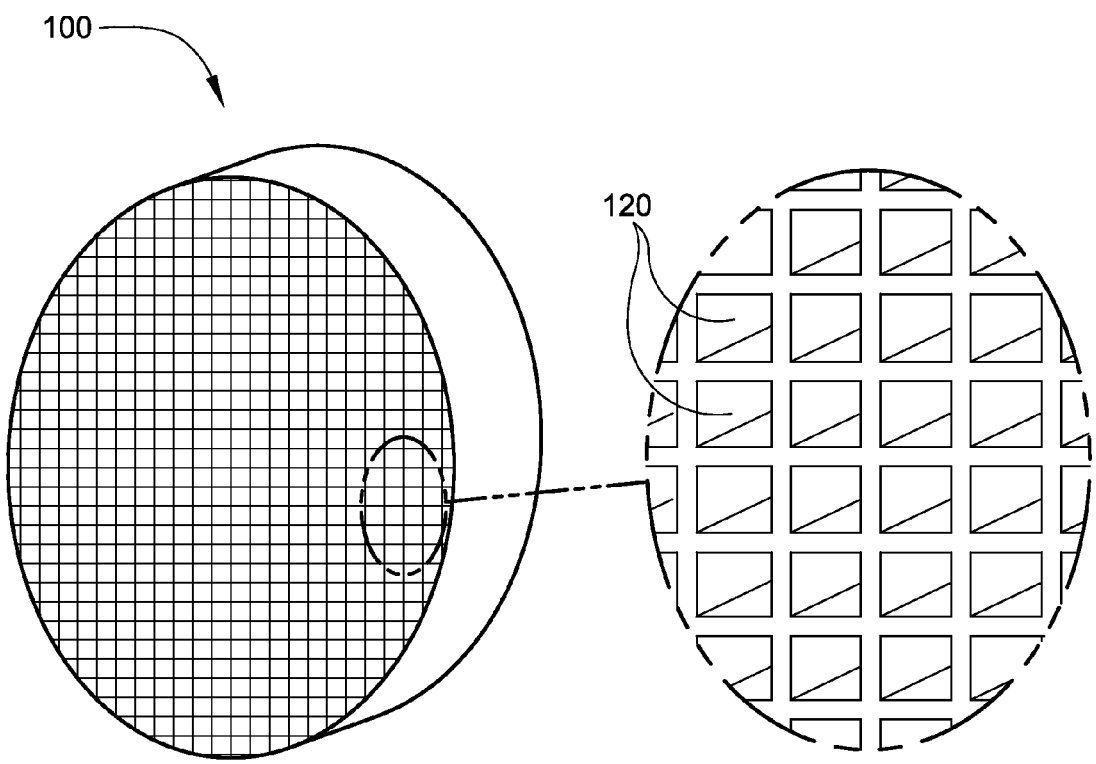
FIG. 14 is a perspective view of a substrate of the present invention.

FIG. 14 illustrates a typically catalytic substrate 100 for use in a particulate filter application having a plurality of channels 120 extending thereinto (and optionally therethrough). The configuration of the channels 120 can vary as provided for above. The substrate 100 is typically a nonwoven fibrous refractory monolith as described above. The substrate 100 typically has between about 100 to about 1000 channels 120 formed thereinto/therethrough, more typically about 600 channels 120 extending partially through the substrate 100; the filter typically has a wall-flow configuration although it could have a flow through configuration as well. Typically, the substrate 100 includes a metal oxide washcoat 146. The filtering substrate 100 typically has a density of about 0.2 gm/cm$^3$, has a porosity of about 85%, has a cell density of about 600 cpsi, and a wall thickness of about 30 mils.

Heated Filter

Alternately, the filter or catalytic converter 140 could include the addition of a heating source, such as one or a series of electric resistance heaters connected in thermal communication with the substrate 100. In operation, the heating elements are typically energized prior to starting the engine as a pre-warmer and remain in operation, either partially or in full, until the exhaust temperature exceeds the temperatures achieved by auxiliary heating elements. Alternately, the heating elements operate to increase the temperature inside of the filter foundation and/or to evenly distribute additional heat throughout the filter foundation. The filter foundation may support one or more electric heating elements in thermal communication therewith. The heating elements may be energized simultaneously, independently, and in a cycled, patterned, or random series. Typically, the heating elements are rods or wire mesh and are connected during or after the filter foundation formation, although any convenient heater type may be employed, including infra-red and/or microwave heat heating elements. The various heat sources may be connected inside of the filter foundation or to the exterior.

The filter foundation is typically housed in a casing 142 sufficiently durable to protect the filter foundation from normal vibration and impact encountered with vehicle transportation. Such a casing may be stainless steel, steel, metal alloy, or non-metallic (including plastic and ceramic-based). The filter foundation is typically encapsulated in insulation or batting 144 prior to being enclosed in the casing. More typically, a heat shield is operationally connected to the casing 142.

The entry and exit tubes of the filter foundation are typically coated with an oxidation catalyst 148. The catalyst 148 contributes to the pollution removal process, resulting in the system as a whole treating the exhaust more quickly. The catalyst 148 may be applied directly to the filter foundation surface. The presence of an oxidation catalyst 148 promotes the ignition of the particulate matter at a lower temperature. In addition, the catalyst 148 may function as a supplemental heater within the filter foundation itself.

Typically, the exhaust filter system 140 is integrated with the engine exhaust path, more typically positioned inside the exhaust manifold of the engine. The ability of the substrate 100 to withstand high heat and increased vibrational stress allows placement of the substrate 100 much closer to the engine and thus provides an advantage over conventional exhaust filters or catalytic converters.

Exhaust Systems

Figure 15:
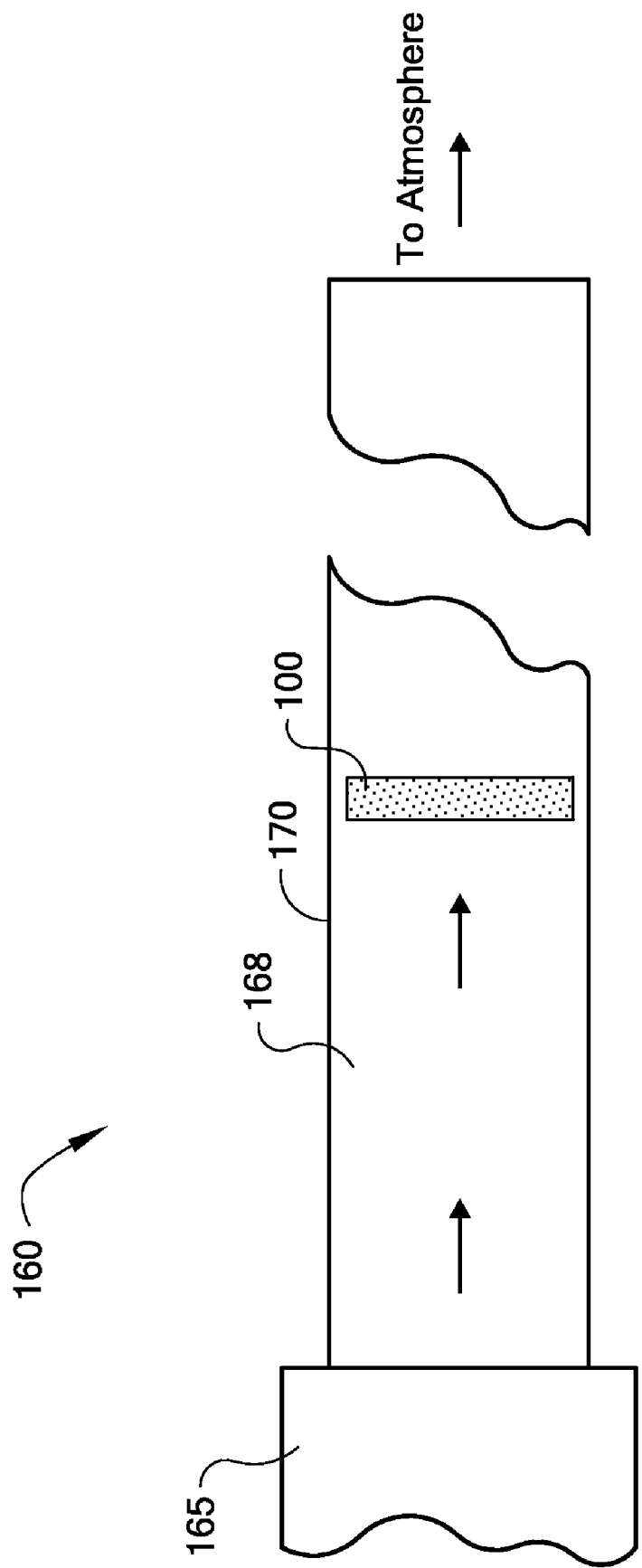
FIG. 15 is a partial schematic view of a substrate of the present invention in position in an exhaust gas stream.

FIG. 15 relates to another embodiment of the present invention, an exhaust system 160 incorporating an nSiRF-C catalytic substrate 100. The exhaust system generally includes an engine 165, and exhaust stream 168 generated thereby and a conduit 170 for directing the exhaust stream 168 away therefrom; the conduit 170 may include an exhaust manifold, a muffler, and a tailpipe. The catalytic substrate 100 is positioned in the conduit 170.

Typically, the exhaust system includes one or more additional aftertreatment devices operationally connected thereto, such as CRT, EGR, SCR, DeNox, DOCm, and the like. For example, the exhaust system may include a catalytic converter and a CRT in fluid communication therewith. Alternately, the exhaust system may include an SCR system in fluidic communication with the substrate 100. Still alternately, the substrate 100 includes an NOx adsorber coated thereupon or operationally connected thereto.

EXAMPLES

Example 1

Figure 16:
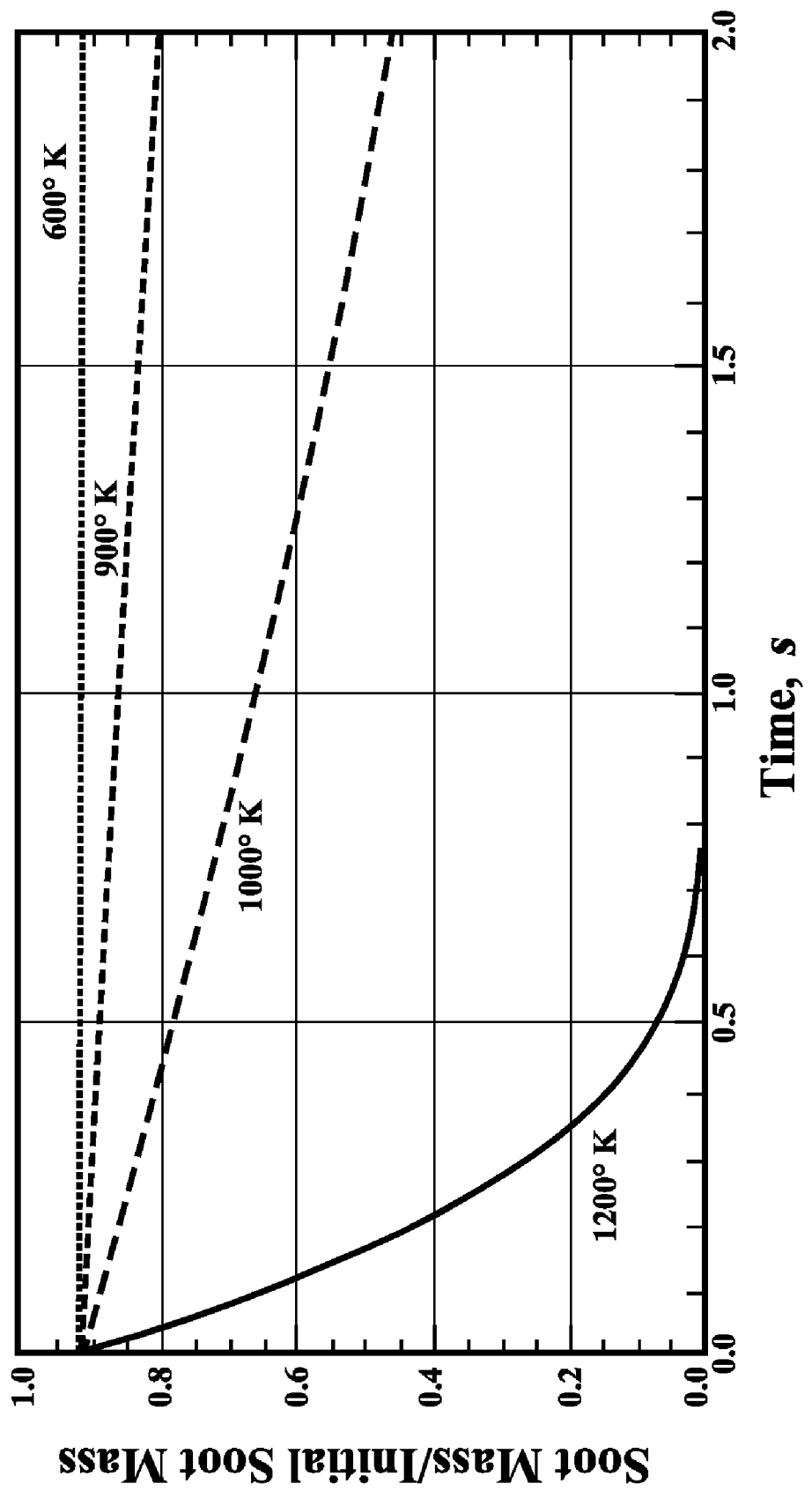
FIG. 16 is a graphical display of the residence time required to oxidize particulate matter at varying temperatures.

Residence time, or born off time, is the amount of time for hydrocarbons form the exhaust emissions to abide within the emission filter to complete combustion or oxidation. The residence time of the present invention is significantly better than conventional systems. FIG. 16 provides a graph of the residence times required to combust or burn soot at temperatures 600 Kelvin, 900 Kelvin, 1000 Kelvin, and 1200 Kelvin, respectively. The more kinetic energy possessed by particles, the higher likelihood of a successful reaction. As shown in FIG. 16, the residence time to combust or burn soot having 0.9 soot mass at 600 degrees Kelvin is much longer than the residence time at 1200 degrees Kelvin. The longer the residence time, the smaller the allowable through-put volumes and the greater the risk of more particulate accumulating on and clogging the filter pores. Clogging can also be a result of the ceramic material overheating to the point of melting, thereby blocking or clogging the pores. The 600, 900 and 1000 Kelvin residence time values are indicative of cordierite samples. Residence times range from about two minutes to twenty hours to complete combustion. The 1200 Kelvin residence time value represents an nSiRF-C substrate 100 and requires only about 0.75 seconds to complete combustion.

Example 2

Substrates

Substrates 1-7 were prepared as described herein. AETB-12 was used as the nSiRF-C material of choice with a density of 12 lbs/ft$^3$. The substrate/filter was machined from AETB-12 billets measuring 8×8×4 using standard carbide drill bits tipped machining methods described in this patent. The substrate 100 was machined in a cylindrical shape with the following dimensions: radius of 2 inches, longitudinal length of 1 inch.

Flow-through, wall-flow and mixed flow-through/wall-flow channels were drilled into the substrate 100 using standard CNC drilling methods described above. A 0.042" diameter stainless steel drill bit was used at 10,000 RPM to drill the channels. During the drilling process, it was observed that due to the high thermal emissivity and conductivity of the material, the drill bit was exposed to high temperature environments that led to damage and eventual melting of the drill-bits. Wall thickness was not measured.

Substrates 1 and 2 had a flow through configuration. Substrates 3-6 had a wall flow configuration. Substrate 3 had about 25% of the channels as flow through and about 75% as wall flow. Substrate 4 had about 50% of the channels as flow through and about 50% as wall flow. Substrate 5 and 6 had about 75% of the channels as flow through and about 25% as wall flow.

Some of the substrates were coated with an alumina washcoat, followed by a 5:1 Pt:Rh ratio catalyst coating. Specifically, Substrates 1, 2, and 7 were not coated with any chemical. Substrates 3, 4, 5, and 6 were given a uniform washcoating utilizing standard techniques known in the prior art. The mass of washcoat applied to each substrate 100 is given in the column titled Mass of Washcoat. Following the washcoating, a catalyst mixture comprising 5:1 Pt/Rh was applied to the substrates 3, 4, 5, and 6 using standard methods. The mass of catalyst mixture applied to each substrate/filter is given in the column titled Mass of Catalyst (g/ft$^3$). The substrates with washcoat and precious metal catalyst loadings were canned using techniques known in the prior art.

| Substrate Number | Weigh of Dry Substrate (grams) | WET washcoat GMS | WET washcoat NET | Estimated amount of washcoat g/in3 | FIRED (grams) | Mass of Washcoat (G/IN3) | H2O ABS. WET WT. (GMS) | H2O ABS. H2O ABS (GMS/IN3) | WET (GMS) | Mass of Catalyst (grams) |
|---|---|---|---|---|---|---|---|---|---|---|
| 1 | 29.0 | 178.5 | 149.4 | 2.91 | 63.0 | 2.71 | | | | |
| 2 | 28.9 | 182.0 | 153.1 | 2.99 | 65.3 | 2.90 | | | | |
| 3 | 30.0 | 158.0 | 128.0 | 2.50 | 61.0 | 2.50 | 167.4 | 8.47 | 164.9 | 24.3 Pt 4.8 Rh |
| 4 | 30.4 | 163.3 | 132.9 | 2.59 | 61.9 | 2.51 | 168.4 | 8.50 | 155.1 | 21.8 Pt 4.4 Rh |
| 5 | 30.3 | 165.7 | 135.4 | 2.64 | 62.0 | 2.52 | 169.8 | 8.58 | 170.4 | 25.3 Pt 5.1 Rh |
| 6 | 30.9 | 184.6 | 153.7 | 3.00 | 67.3 | 2.90 | | | 202.5 | 31.6 Pt 6.3 Rh |
| | | | | | | | | Ave = 8.52 S/D = 0.23 N = 3 | | Ave = 30.9 S/D = 5.0 N = 4 |
| 7 | 24.3 | 105.1 | 80.8 | 2.47 | 44.6 | 2.54 | | | 99.7 | 20.2 Pt 4.0 Rh |

Example 3

Preparation of Catalytic and Filtering Substrates

Substrates/Filters were prepared exactly as described in Example 2 unless mentioned explicitly.

Figure 17:
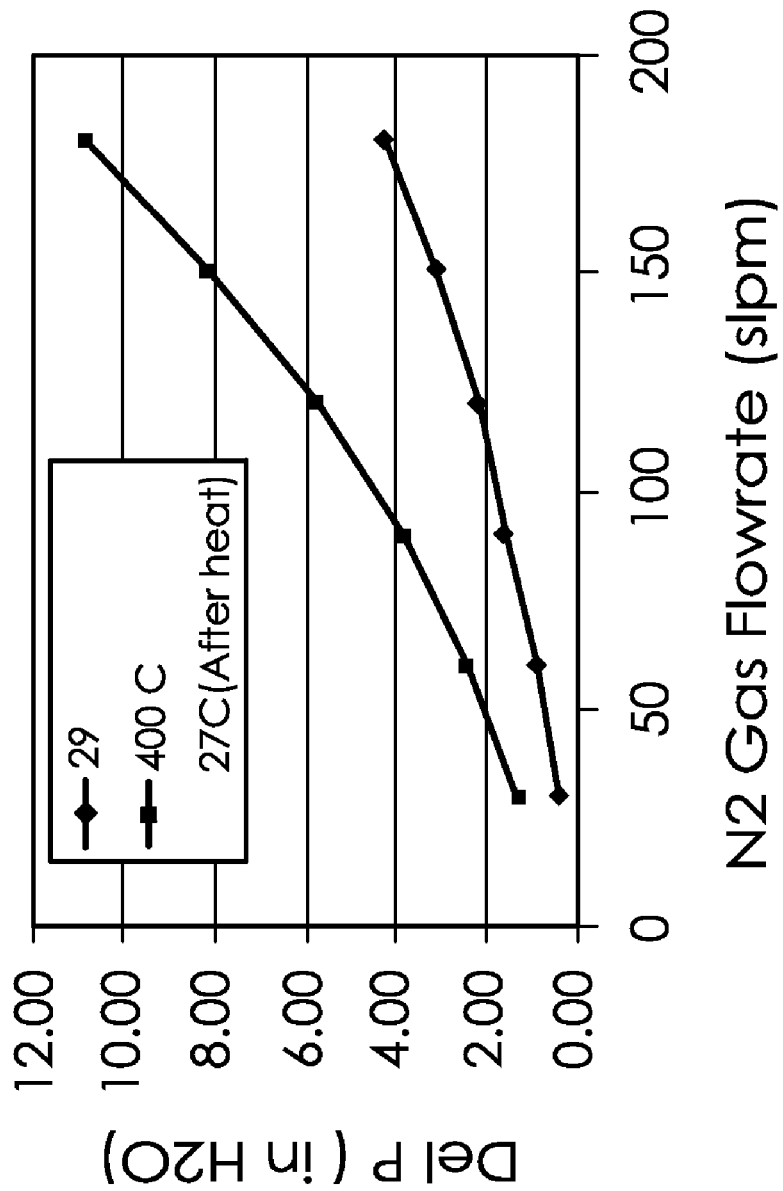
FIG. 17 graphically illustrates pressure drop as a function of gas flow rate for various substrate temperatures.
Figure 18:
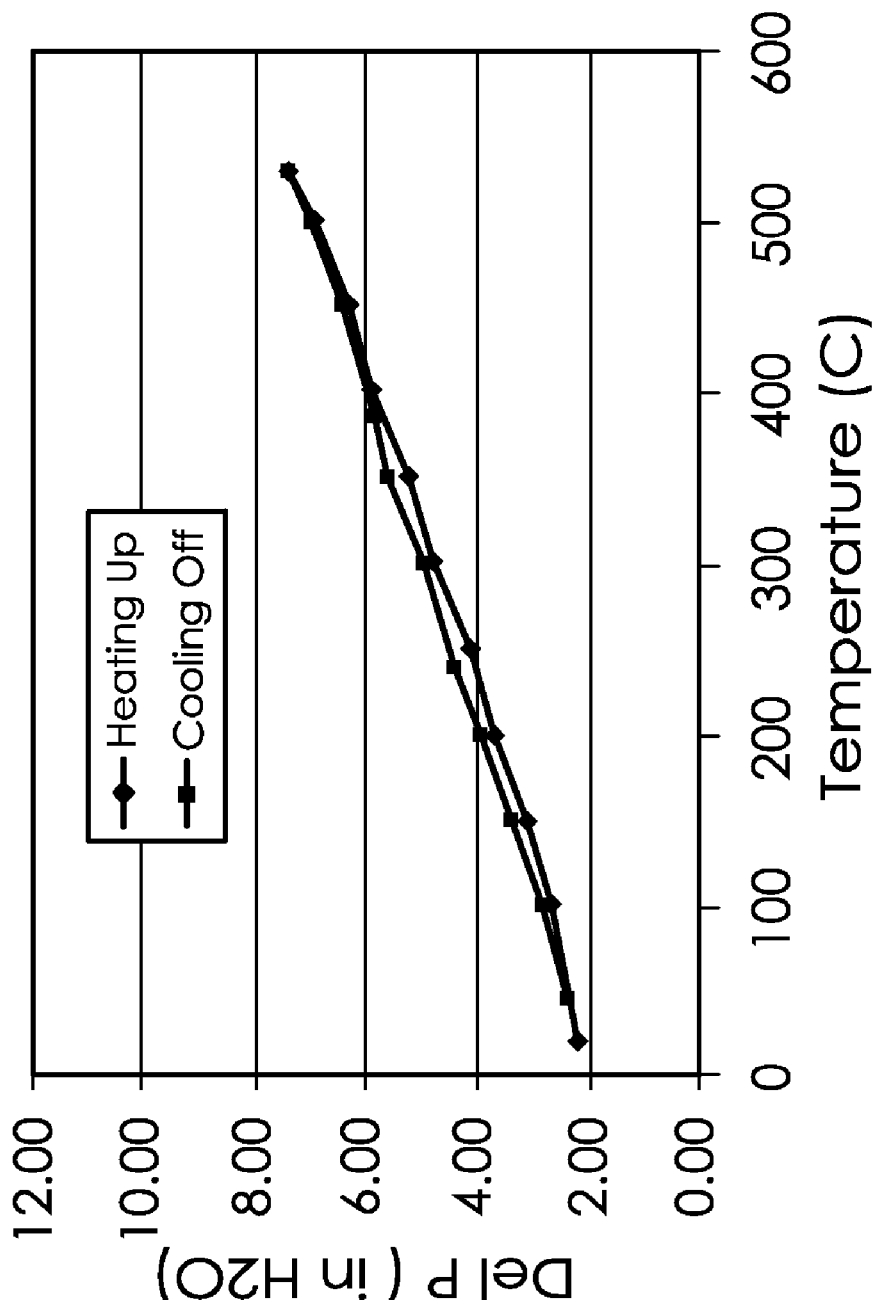
FIG. 18 graphically illustrates pressure drop as a function of temperature for a substrate at constant gas flow rate.

In a marked difference from the substrate/filters in Example 1, the final depth of ¾ inches into the 1 inch slug the comb assembly was removed from the CNC and the opposite (mirror image) comb assembly was mounted onto the CNC punch and the same process for pecking method of broaching was employed. The end result this machining methodology is a 600 cpsi with 6 mil walls and ½ inch wall flow overlap. The dimensions of the substrate/filter in wall-flow configuration were 1" diameter by 1" thickness and the pattern inside that slug was 0.8" by 0.8" square. This substrate 100 was used to conduct an early-stage successful Delta P-test to observe the drop in pressure observed in a $N_2$ gas flow due to the obstruction in flow caused by wall-flow configuration. FIG. 17 demonstrates the drop in pressure measured in a reactor-tube flow-measurement system as a function of gas flow rate for temperatures of 27° C., 29° C. and 400° C. FIG. 18 demonstrates the drop in pressure measured in the same reactor as a function of temperature at a constant flow rate of 125 SLPM. These initial results were positive and indicative that the nSiRF-C substrates/filters do not generate high back-pressure in the wall-flow configuration.

Example 4

Preparation of Catalytic and Filtering Substrates

Substrates/Filters were prepared exactly as described in Example 1 unless mentioned explicitly.

In a marked difference from the substrates in Example 1, three different substrates were generated using AETB-11, AETB-12, and AETB-16 billets purchased from COI Ceramics with densities of 11, 12, and 16 lbs/ft³ respectively.

For the substrate/filter created from AETB-11, the final depth of ¾ inches into the 1 inch slug the comb assembly was removed from the CNC and the opposite (mirror image) comb assembly was mounted onto the CNC punch and the same process for pecking method of broaching was employed. The end result this machining methodology is a 600 cpsi with 6 mil walls and ½ inch wall flow overlap. For the substrates/filters created from AETB-12 and AETB-16, the final depth of ⅞ inches into the 1 inch slug the comb assembly was removed from the CNC and the opposite (mirror image) comb assembly was mounted onto the CNC punch and the same process for pecking method of broaching was employed. The end result this machining methodology is a 600 cpsi with 6 mil walls and ¾ inch wall flow overlap.

Figure 19:
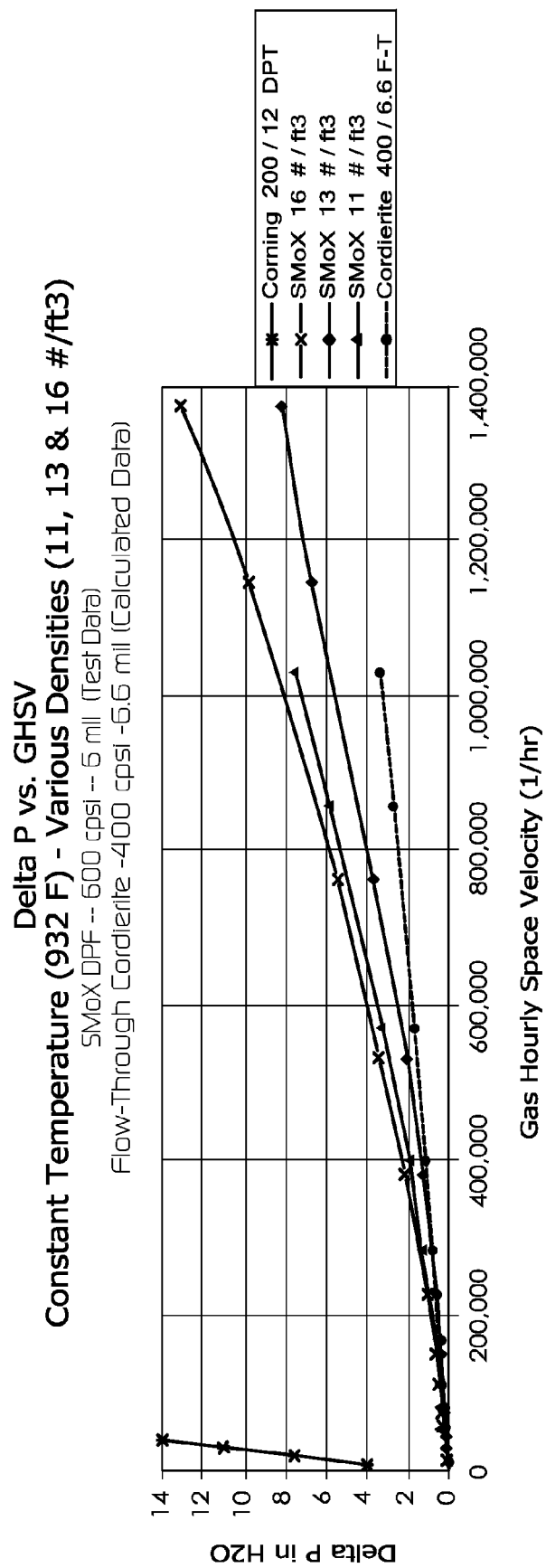
FIG. 19 graphically illustrates pressure drop as a function of gas space velocity for various substrates.
Figure 20:
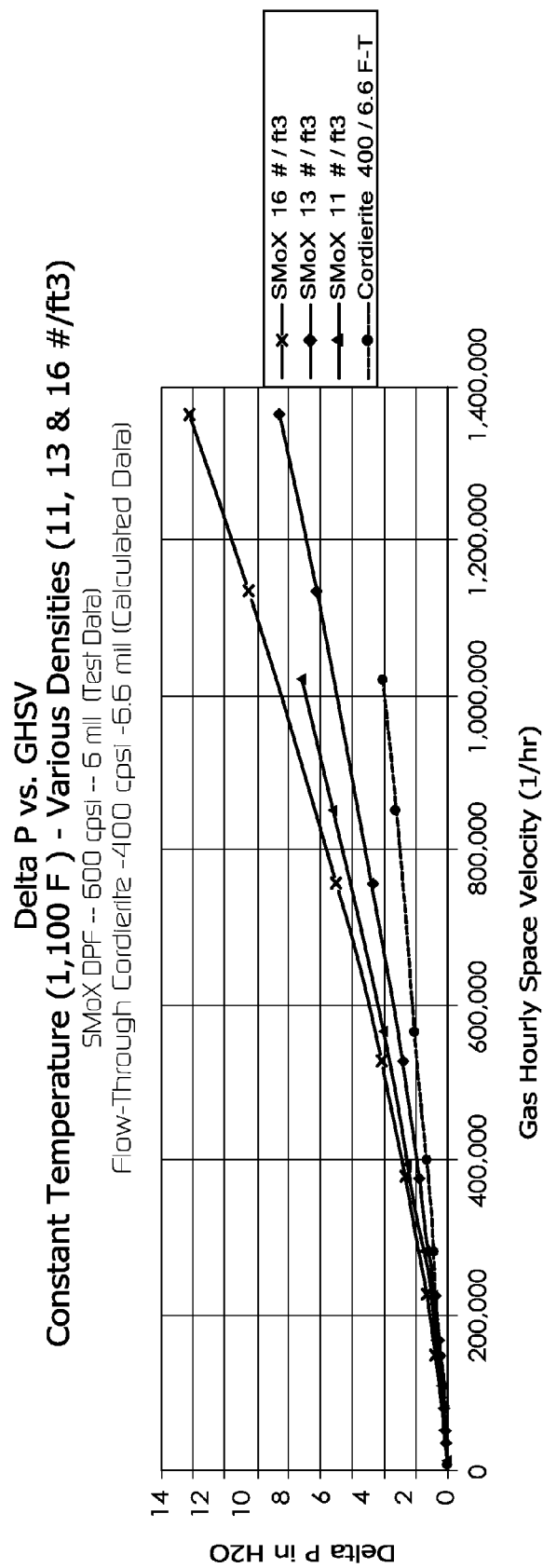
FIG. 20 graphically illustrates pressure drop as a function of gas space velocity for various substrates.

The dimensions of the all substrates/filters tested in this stage were 1" diameter by 1" thickness. The substrates were exposed to another early-stage Delta P-test to observe the drop in pressure observed for substrates material density and wall-flow configuration as a function of space hourly velocity. This particular test was conducted at 932 Fahrenheit temperature. The results of our tests are summarized in FIG. 19. In addition to the data observed for our AETB-11, AETB-12 and AETB-16 substrates/filters, the results reported by Corning for their 400/6.6 flow-through cordierite substrates/filters and 200/12 cordierite DPT (wall-flow configuration). Corning data was obtained through Corning Technical Reports. Our results indicate that while Corning DPT in wall flow configuration causes excessive backpressure compared to cordierite flow-through filter, our nSiRF-C filters generate back-pressure equivalent to the cordierite flow-through substrate 100 even when they are used in a wall-flow configuration. It can be inferred that since backpressure had been a big problem in wall-flow DPTs, as observed in FIG. 20, using wall-flow DPTs made of nSiRF-C materials, as invented in this patent, leads to an excellent alternative. Additionally it is also observed that a comparison of back-pressures observed with AETB-11 substrate/filter versus the AETB-12 and AETB-16 substrates/filters allows us to infer that increasing the 'overlap' channel length leads to better back-pressure performance.

FIG. 32 is the same test performed at an operating temperature of 1100 Fahrenheit and the trends in results are almost identical.

Example 5

Preparation of Catalytic and Filtering Substrates

Substrates/filters were prepared as described in Example 2 unless mentioned explicitly.

AETB-12 was used as the nSiRF-C material of choice with a density of 12 lbs/ft³. A laser-based channel drilling technique was tested to generate holes at 3000 cpsi and 30000 cpsi. The holes were drilled using a DPSS laser system as described in this patent and in related prior art elsewhere. The holes generated using a pulsed, high-energy laser system were square in shape and due to the particular configuration, presented a high frontal surface area. The presence of a high frontal surface area (caused by a large value for wall thickness of channels) was obvious in the Delta-P tests carried out using the same test-flow reactor as described in Example 3. It was observed that for the early-stage prototype created using laser-based drilling techniques to be a success, the Delta back-pressure had to be brought to a value less than 10 inches of water. Further modifications can be done to decrease (or increase) the cell density and to alter the wall thickness as prescribed by the need of the application.

Figure 21:
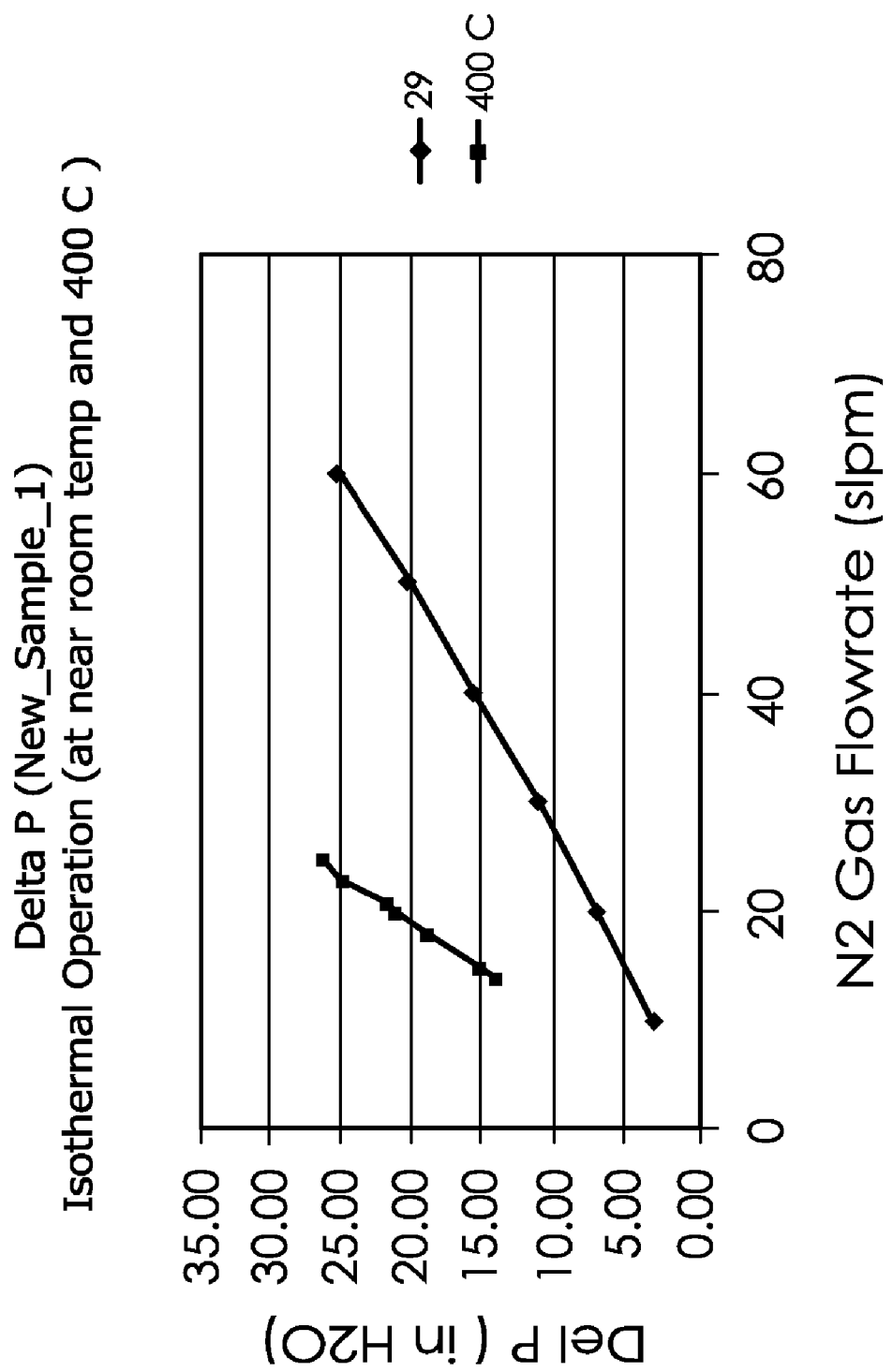
FIG. 21 graphically illustrates pressure drop as a function of gas flow rate for various substrate temperatures.
Figure 22:
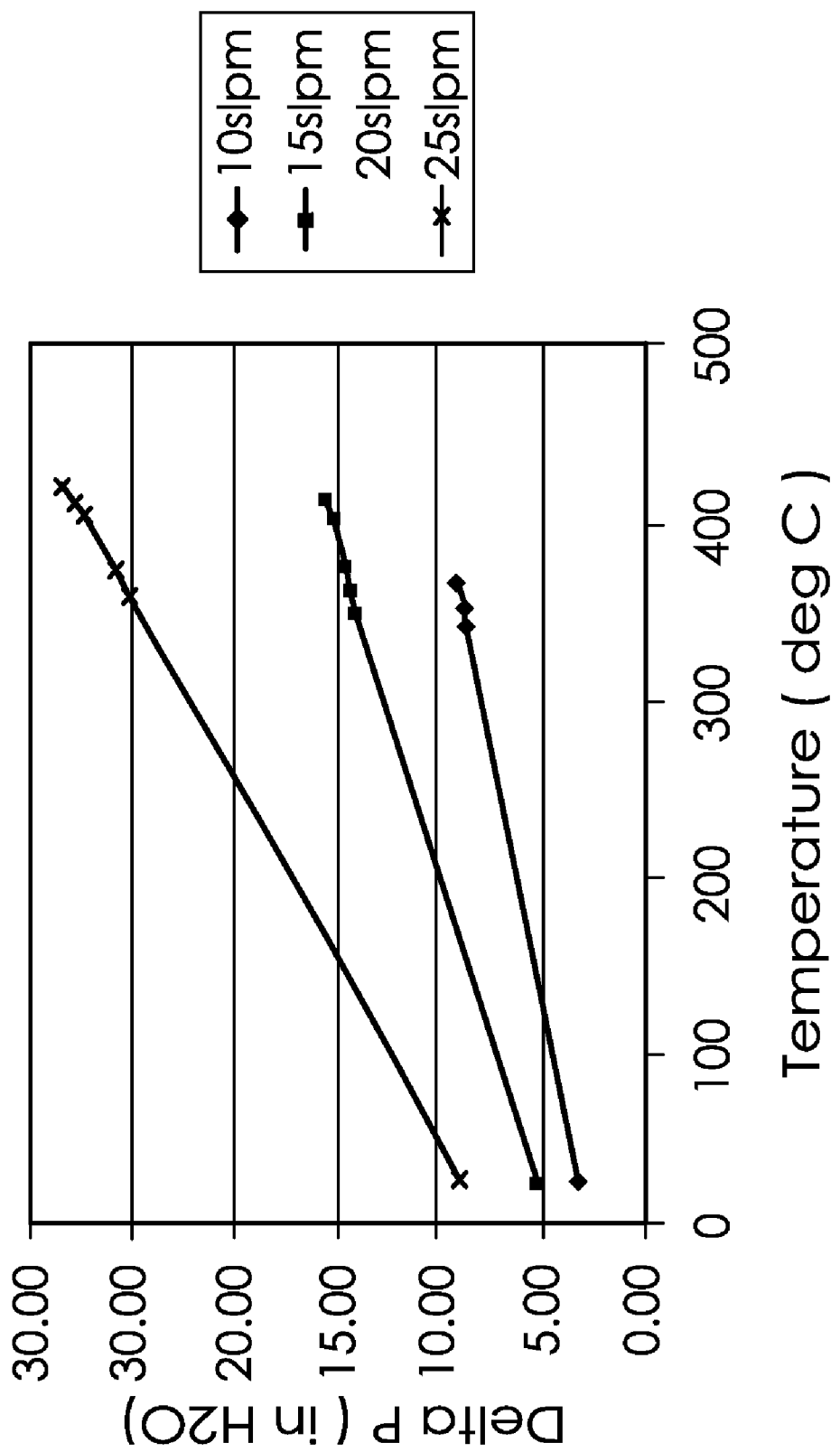
FIG. 22 graphically illustrates pressure drop as a function of temperature for a substrate at various gas flow rates.

FIG. 21 shows the change in pressure as a function of N2 gas flow-rate for the AETB-12 substrate/filter with 30000 cpsi cell density at 27° C. and 400° C. FIG. 22 shows the change in pressure as a function of operating temperature for various $N_2$ gas flow-rates for AETB-12 substrate/filter with 30000 cpsi cell density.

Figure 23:
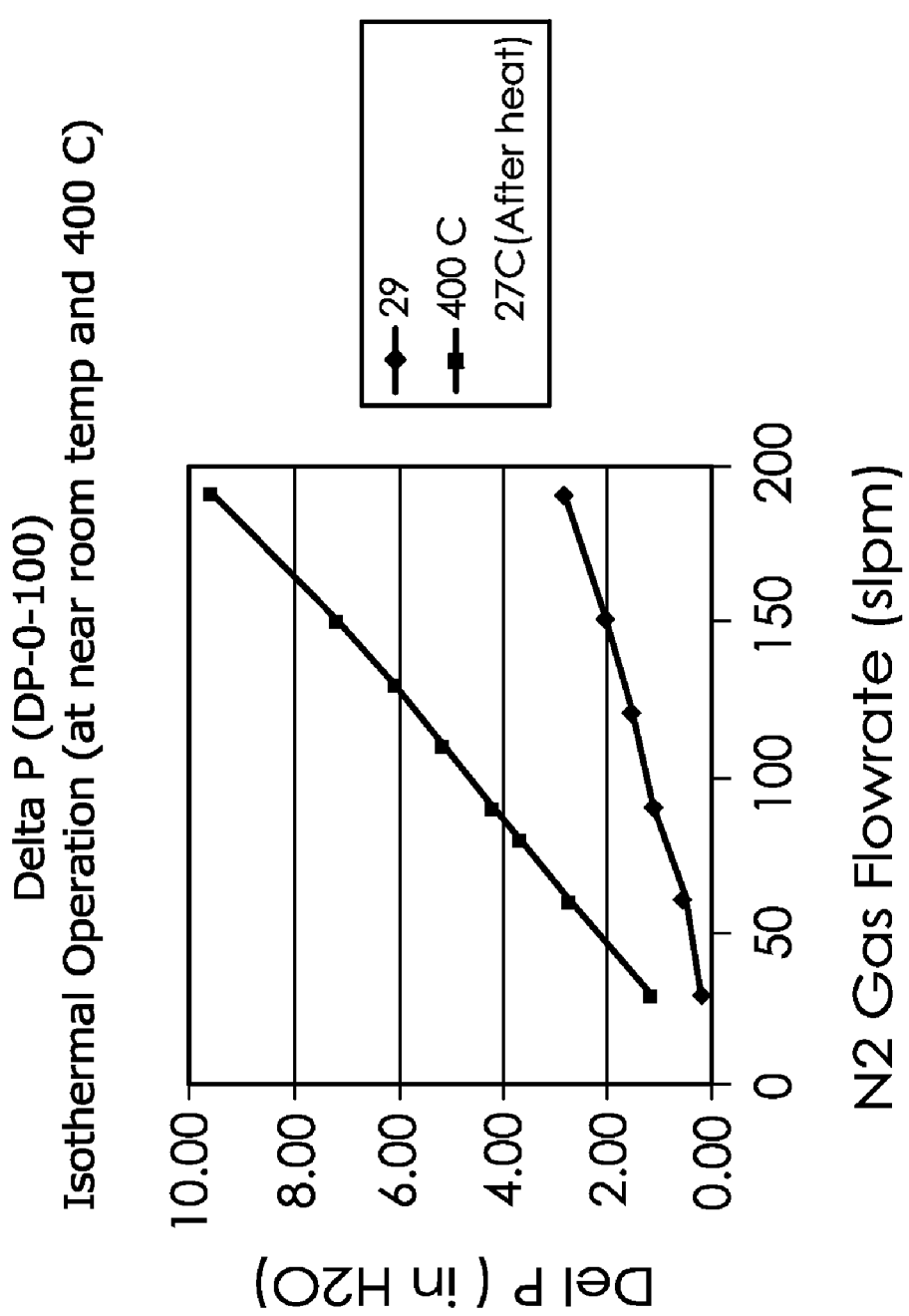
FIG. 23 graphically illustrates pressure drop as a function of temperature for a substrate at various gas flow rates.

FIG. 23 shows the change in pressure as a function of $N_2$ gas flow-rate for the AETB-12 substrate/filter with 3000 cpsi cell density at 29° C. and 400° C.

Example 6

Diesel Particulate Filter

The substrate is created using the AETB formulation and formed into a billet having the dimensions of about 13 inches x about 13 inches×about 5 inches with a density of about between 8 pounds per cubic foot. From the billet, a five inch tall cylinder slug which is about six inches in diameter is cut from the billet using a diamond tipped saw. This substrate is further machined to exact tolerances (within 0.001 inches) on a spinning lathe.

Then a plurality of channels are formed in the substrate to form a substrate containing 600 channels per square inch and having a wall flow configuration. The channels are formed using the combined drilling and comb techniques described herein. The channels are square shape having a dimension of about 6 mils by 6 mils. The adjacent walls of adjacent channels are substantially parallel to each other. The channels do not extend through the entire length of the substrate but are approximately 4.9 inches in length.

Example 7

Measurement of Gross Surface Area

The first and second cordierite samples have a gross surface area of 33.2 and 46.97 square inches per cubic inch, respectively. Thus, in a one inch cube of the first cordierite sample, there is 33.20 square inches of surface to put the precious metal loadings. A sample of a substrate of the present invention has a gross surface area of 83.58 square inches per cubic inch.

The gross wall volumes for both the first and second cordierite samples are 0.311 $in^3/in^3$ (cubic inches per cubic inch). The gross wall volume of the substrate of the present invention is 0.272 cubic inches per cubic inch. While this value is less than the first and second cordierite samples, the present invention has a much higher porosity and permeability, making the smaller gross wall volume more efficient.

Example 8

Activity Test

Figure 24:
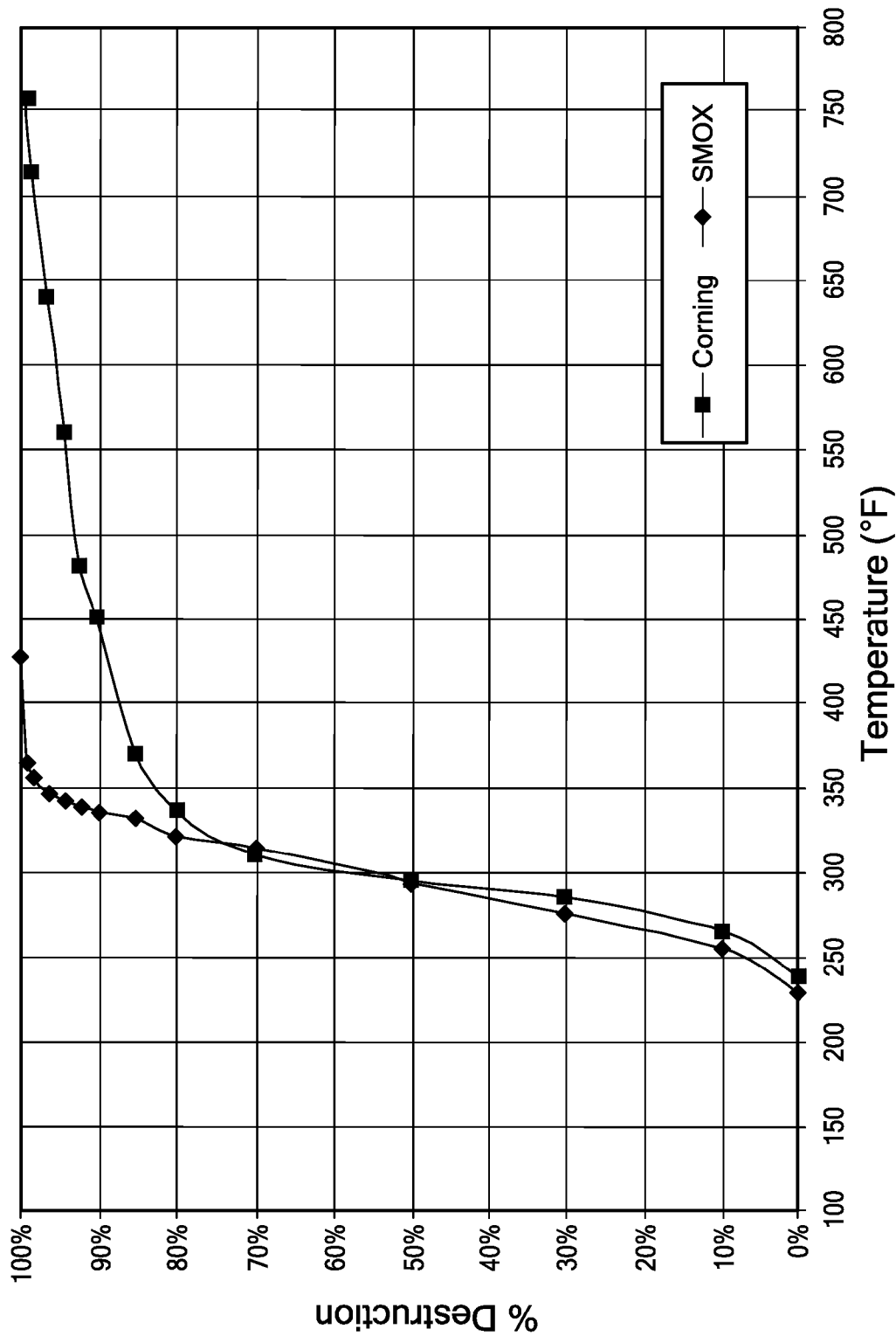
FIG. 24 graphically illustrates pollutant consumption as a function of temperature for various substrate compositions.

An activity test measures the amount of pollutants entering and exiting the filter. In an activity test, a sample filter is placed in a reactor and gases of a known flow rate and temperature are pumped through the material. The activity test then measures the amount of pollutants exiting the filter. Referring to FIG. 24, an activity test of an exemplary substrate 100 of the present invention and a sample of cordierite is shown. The test measured the activity of toluene at a concentration of 500 ppm and space velocity of 40,000 per hour. The cell density of the two samples were both 400 cpsi.

The test illustrates that the substrate 100 has a faster light off time and at a significantly lower temperature than the cordierite sample. Substrate 100 achieved 85% destruction at a temperature about 335 degrees Fahrenheit (which corresponds to about 4 seconds under a typical 4 liter SUV). Cordierite achieved 85% destruction at about 380 degrees Fahrenheit. Substrate 100 then achieved 90% destruction at about 360 degrees Fahrenheit (equivalent to about 5 seconds under a typical SUV). Cordierite achieved 90% destruction at about 450 degrees Fahrenheit (equivalent to about 8 seconds). Substrate 100 achieved substantially 100% destruction at about 425 degrees Fahrenheit (equivalent to about 6 seconds). Cordierite is projected to achieve substantially 100% destruction at about 800 degrees Fahrenheit (equivalent to about 28 seconds).

Example 9

Permeability of a Catalytic Substrate

The permeability of an exemplary embodiment of Example 2 of the present invention is approximately 1093 cd (centidarcies). Other testing values were over the maximum number measured by the testing equipment. In comparison to conventional systems, a sample of cordierite has a permeability of about 268 cd.

Example 10

Testing a Catalytic Converter of Example 2

Similar to an activity test, the EPA utilizes a test known as Federal Test Procedure ("FTP") 75 that actually mounts the filter on the tailpipe of a car and drives the car under specified conditions. The EPA uses this test for emission certification of vehicles. FTP 75 tests the conditions of the vehicle in three phases. The first phase includes crank and non-idle hold and driving for 505 seconds. This phase reflects conditions experienced at the beginning of a trip when the engine and the emission control system begin operation at ambient temperature and are not performing at optimum levels (i.e., the catalyst 148 is cold and has not reached the "light off" temperature needed to efficiently control emissions coming from the engine) until part way through the trip. The second phase includes 864 seconds of driving with a non-idle hold, shutdown, and five extra sampling seconds. This phase reflects the condition of the engine when the vehicle has been in continuous operation long enough for all systems to have attained stable operating temperatures. The vehicle then has a soak time between 540 seconds and 660 seconds. This soak time reflects the condition of an engine that has been turned off and has not cooled to ambient conditions. The third phase is a crank and non-idle hold and driving for 505 seconds. Under these circumstances, the engine and catalyst 148 are warm and, although not at peak operating efficiency when started, still have significantly improved emissions performance relative to the cold start mode.

Example 11

Thermal Testing of a Catalytic Substrate

The thermal conductivity of an exemplary embodiment of the present invention is approximately 0.0604 W/m-K (Watts of energy per meter thick and Kelvin changed). By comparison, a sample of cordierite is about 1.3 to 1.8 W/m-K. These results indicate that, if 1000 Watts of heat energy is lost from a given volume of cordierite material, only 33 Watts would be lost from the same volume of the material from the present invention. Thus, the material of the present invention has a thermal conductivity thirty times greater than cordierite.

The specific heat of an exemplary embodiment of the present invention is approximately 640 J/kg-K (Joules per kilogram-Kelvin). A sample of cordierite is about 750 J/kg-K. Even though the cordierite has a greater specific heat, cordierite filters have a greater mass to heat up. The result is more heat energy is needed to reach operating temperature making the cordierite less efficient.

A multiple use temperature limit is the maximum temperature in which a substance can be subjected a plurality of times without any degradation. The higher the temperature a substrate can continue to operate without micro-fractures or spallation, the less chance of the substrate breaking or cracking over time. This in turn means the substrate is more durable over a wider temperature range. A higher temperature limit is preferred.

The multiple use temperature limit of an exemplary embodiment of the present invention is 1500 degrees Celsius. A sample of cordierite is about 1,100 degrees Celsius. Thus, the material of the present invention can withstand more than twice the temperature than cordierite before breaking down. This permits the material to function in a greater range of exhaust environments.

The coefficient of thermal expansion is a ratio of the increase of the length (linear coefficient), area (superficial), or volume of a body for a given rise in temperature (usually for zero to one degree Celsius) to the original length, area, or volume, respectively. These three coefficients are approximately in the ratio 1:2:3. When not specifically expressed, the cubical coefficient is usually intended. The less a substrate will expand when heated, the less chance of leaking, fracturing, or damage to filter assembly due to thermal shock. A lower thermal expansion is preferred to ensure higher thermal shock resistance and that the substrate keeps its dimensions even when heated or cooled.

The coefficient of thermal expansion for an exemplary embodiment of the present invention is approximately $2.65 \times 10^{-6}$° C. A sample of cordierite is about $2.5 \times 10^{-6}$° C.

The coefficient of thermal expansion of the substrate is typically, in one embodiment, compatible with the coefficient of thermal expansion of the washcoat. If the coefficient of thermal expansion is not similar, the washcoat will spallate, delaminate, "flake" or peel off the substrate, resulting in the precious metals being blown away or plugging the pore spaces. This would eventually lead to increased backpressure, overheating and system failure.

Example 12

Structural Integrity

The tensile modulus of AETB-12 is approximately 2.21 Mpa (mega-Pascal of pressure which equals approximately 22 times the pressure of one atmosphere of pressure). A sample of cordierite is about 25.0 Mpa. Although the cordierite is about ten times stronger, the material of the present invention can withstand 22 atmospheres of pressure before rupture. This value is sufficient for uses described herein due to its unique fracture characteristics under load.

Example 13

Acoustical Testing

Acoustic attenuation may be defined as either the diminution of thickness, thinness, emaciation; diminution of density; diminution of force or intensity; or weakening. In one embodiment of the present invention, the acoustic attenuation is the substrate's ability to attenuate or dampen acoustic energy in engine exhaust. A substrate of the present invention can replace or complement an engine's muffler assembly, as disclosed herein, thus decreasing exhaust noise and exhaust system costs. A higher acoustic attenuation is preferred, especially if the goal is to reduce the size of, or eliminate entirely, the muffler assembly.

Currently, there are no accredited laboratory tests that have been applied to the present invention in any configuration. Most American Society for Testing and Materials ("ASTM") acoustical tests are applied to a large space such as a sound-proofed room and not a material. However, in simple test using a sound meter, the noise from a test automobile was found to be at least 25 decibels less than conventionally muffled vehicles when a substrate of the present invention was placed in the exhaust system. For reference, 110 decibels is the level that will cause permanent damage to human ears, and 60 decibels is the amount of noise in a luxury automobile at idle with the windows rolled up.

Example 14

Comparison to Prior Art Substrates

A sample of a suitable nSiRF-C (AETB-12) was compared to cordierite and SiC, measuring a number of attributes.

| | AETB-12 | Cordierite | Silicon Carbide (SiC) |
|---|---|---|---|
| Thermal Conductivity | $6.04 \times 10_{-2}$ W/m-K | 1.3-1.8 W/m-K | 20 W/mK |
| Specific Heat | 640 J/kg-K | 750 J/kg-K | 950 J/kg-K |
| Density | 0.2465 gm/cc | 2-2.1 gm/cc | 3.2 gm/cc |
| Emissivity | 0.88 | .13 | .90 |
| Axial Strength | 2.21 Mpa | 2.5 Mpa | 18.6 Mpa |
| Noise Attenuation at 3500 rpm | 74 db | 100 db | 100 db |
| Porosity | 97.26% | 18-42% | 30-40% |
| Permeability | 1093 - ∞ cd | 268 cd | 6.65 cd |
| Regeneration Time | 0.75 sec | 2 min-20 hrs | 50 sec-20 hrs |
| Surface Area | 88,622 in$^2$ | 847 in$^2$ | 847 in$^2$ |
| Melting Point | 1500° C. | 1,400° C. | 2400° C. |
| Thermal Expansion (CTE) | $0.25 \times 10^{-6}$/C | $0.7 \times 10^{-6}$/C | $4-5 \times 10^{-6}$/C |

In one embodiment, the substrate of the present invention has 600 cpsi with 6 mil walls. The cell density of a sample substrate of the present invention is compared with two samples of cordierite. In comparison, the first and second cordierite samples are 100 cpsi with 17 mil wall thickness and 200 cpsi with 12 mil wall thickness, respectively. In comparison, the substrate of the present invention in this embodiment has 600 cpsi with 6 mil walls.

In this exemplary embodiment, the substrate is drilled with 0.04 inch diameter channels spaced every 0.06 inches across the entire filter. These channels are smaller than conventional cordierite channels. The result is vastly increased surface area as compared to cordierite, even without taking into consideration the surface area existing in the massive pore space of the substrate material. The channels are typically "blind" channels. Exhaust emission is forced to pass through the channel walls, rather than flowing in and out of the channels without reacting with the catalyst 148.

The channels are drilled using a CNC drill, which is computer controlled to maintain uniformity. The drilling process is performed under a constant water shower to prevent dust from becoming airborne, which is an OSHA hazard, and may get into the bearings of the drill and destroy it.

The drilled substrate is oven dried to drive or bake off any water or other liquid that may reside in the pore space before any catalytic applications. Baking time is not variable and evaporation of the water can be determined by simply weighing the substrate. Baking time primarily speeds up the dewatering process. After heating the filter element for several different intervals, the weight will level off and the substrate is ready for any catalyst or coating application.

While the invention has been illustrated and described in detail in the drawings and foregoing description, the same is to be considered as illustrative and not restrictive in character. It is understood that the embodiments have been shown and described in the foregoing specification in satisfaction of the best mode and enablement requirements. It is understood that one of ordinary skill in the art could readily make a nigh-infinite number of insubstantial changes and modifications to the above-described embodiments and that it would be impractical to attempt to describe all such embodiment variations in the present specification. Accordingly, it is understood that all changes and modifications that come within the spirit of the invention are desired to be protected.

We claim:

1. A process for preparing a catalytic filtering substrate, comprising:
   mixing a plurality of ceramic fibers of at least one predetermined length with a liquid;
   blending the fibers into a flowable mixture;
   forming the flowable mixture into a body;
   forming a plurality of honeycomb channels in the body;
   drying the body; and
   firing the body to provide a fired body;
   wherein the fired body comprises bonded ceramic fibers forming a rigid non-woven matrix having a porosity of at least 60%.

2. The process of claim 1 wherein the fired body is used in a diesel engine.

3. The process of claim 1 wherein the fired body is used in a gasoline engine.

4. The process of claim 1 wherein the ceramic fibers comprise alumina and silica.

5. The process of claim 1 wherein the fired body further comprises from about 5% to about 50% of alumina.

6. The process of claim 1 wherein the fired body further comprises from about 50% to about 90% of silica.

7. The process of claim 1 wherein the ceramic fibers comprise amorphous aluminosilicate fiber.

8. The process of claim 1 wherein the step of firing the body to provide a fired body comprises sintering the ceramic fibers.

9. The process of claim 1 wherein the ceramic fibers comprise at least a plurality of material compositions.

10. The process of claim 1 further comprising adapting the fired body into a wall-flow configuration.

11. The process of claim 1 further comprising coating the fired body with a catalyst.

12. The process of claim 11 wherein the catalyst is selected from the group consisting of palladium, platinum, rhodium, and mixtures thereof.

13. The process of claim 11 wherein the catalyst is present in an amount of between about 1 g/ft3 to about 50 g/ft3.

14. The process of claim 11 wherein the catalyst is at least partially coating the channels.

* * * * *